(12) United States Patent
Nagao et al.

(10) Patent No.: US 7,369,488 B2
(45) Date of Patent: May 6, 2008

(54) WIRELESS LAN APPARATUS FOR CHANGING PACKET LENGTH ACCORDING TO CHANGING CONDITIONS

(75) Inventors: Akifumi Nagao, Kyoto (JP); Tomoharu Kawada, Osaka (JP); Hiroaki Ishii, Osaka (JP); Keiichiro Wada, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 616 days.

(21) Appl. No.: 10/786,074

(22) Filed: Feb. 26, 2004

(65) Prior Publication Data
US 2004/0170152 A1   Sep. 2, 2004

(30) Foreign Application Priority Data
Feb. 27, 2003   (JP)   ............ P2003-050471

(51) Int. Cl.
*G01R 31/08* (2006.01)
*H04B 7/185* (2006.01)
(52) U.S. Cl. .................. 370/216; 370/318
(58) Field of Classification Search ........... 370/318, 370/333, 216; 455/561
See application file for complete search history.

(56) References Cited

U.S. PATENT DOCUMENTS

| 4,771,391 | A | 9/1988 | Blasbalg |
|---|---|---|---|
| 5,103,447 | A | 4/1992 | Takiyasu et al. |
| 5,247,518 | A | 9/1993 | Takiyasu et al. |
| 6,252,887 | B1 | 6/2001 | Wallace |
| 6,370,163 | B1* | 4/2002 | Shaffer et al. ......... 370/519 |
| 6,434,154 | B1 | 8/2002 | Stacey et al. |
| 6,487,603 | B1 | 11/2002 | Schuster et al. |
| 6,886,040 | B1* | 4/2005 | Fitzgerald ............. 709/224 |
| 6,956,867 | B1* | 10/2005 | Suga ..................... 370/465 |

(Continued)

FOREIGN PATENT DOCUMENTS

JP   64-071360   3/1989

(Continued)

OTHER PUBLICATIONS

Japanese Office Action, issued in corresponding Japanese Patent Application No. JP 2003-050471, dated on Aug. 20, 2007.

*Primary Examiner*—Joseph Feild
*Assistant Examiner*—Michael Faragalla
(74) *Attorney, Agent, or Firm*—McDermott Will & Emery LLP

(57) ABSTRACT

A packet synthesizing unit packetizes transmit data and thereby creates a transmit packet data, and more specifically, synthesizes the number of the transmit data indicated by a packet-length information from a packet length controlling unit into a transmit packet data. A frame synthesizing unit appends the packet-length information for transmission to a header of the transmit packet data to thereby create a transmit frame. A wireless transmit unit converts the transmit frame into a wireless transmit signal and wirelessly transmits the wireless transmit signal. In the wireless transmission, the packet length controlling unit controls the packet length of the transmit data according to a transmit rate in the wireless transmit unit. The packet length controlling unit reduces the packet length when the transmit rate is relatively high and extends the packet length when the transmit rate is relatively low. This improves the transmission efficiency and communication quality.

7 Claims, 34 Drawing Sheets

U.S. PATENT DOCUMENTS

| | | |
|---|---|---|
| 2002/0122413 A1 | 9/2002 | Shoemake |
| 2002/0191559 A1 | 12/2002 | Chen et al. |
| 2003/0169769 A1 | 9/2003 | Ho et al. |

FOREIGN PATENT DOCUMENTS

| | | |
|---|---|---|
| JP | 03-058543 | 3/1991 |
| JP | 06-141020 | 5/1994 |
| JP | 07-046202 | 2/1995 |
| JP | 07-307768 | 11/1995 |
| JP | 09-261273 | 10/1997 |
| JP | 11-098149 | 4/1999 |
| JP | 11-331175 | 11/1999 |
| JP | 11-331949 | 11/1999 |
| JP | 2001-024575 | 1/2001 |
| JP | 2001-094574 | 4/2001 |
| JP | 2001-326648 | 11/2001 |
| JP | 2002-101151 | 4/2002 |
| WO | WO 01-39423 | 5/2001 |

* cited by examiner

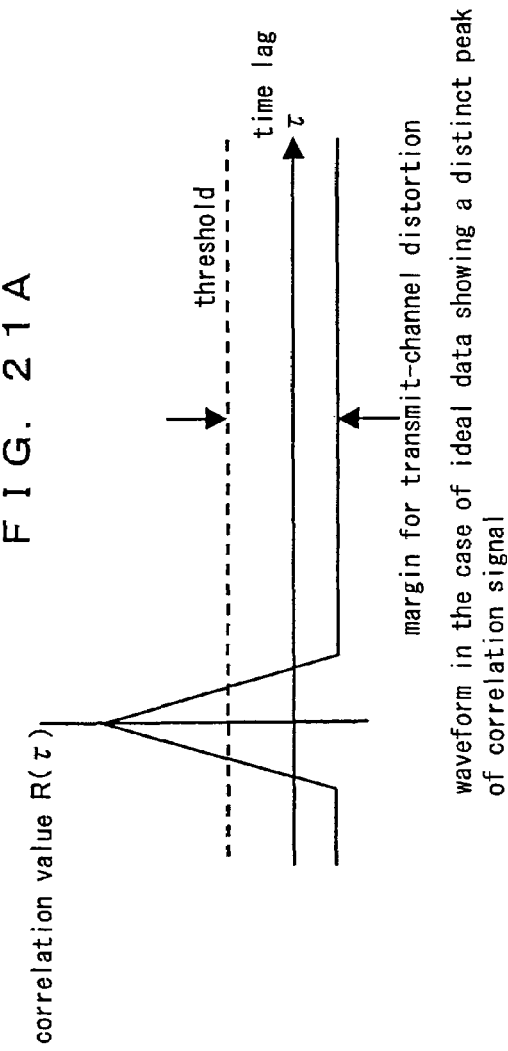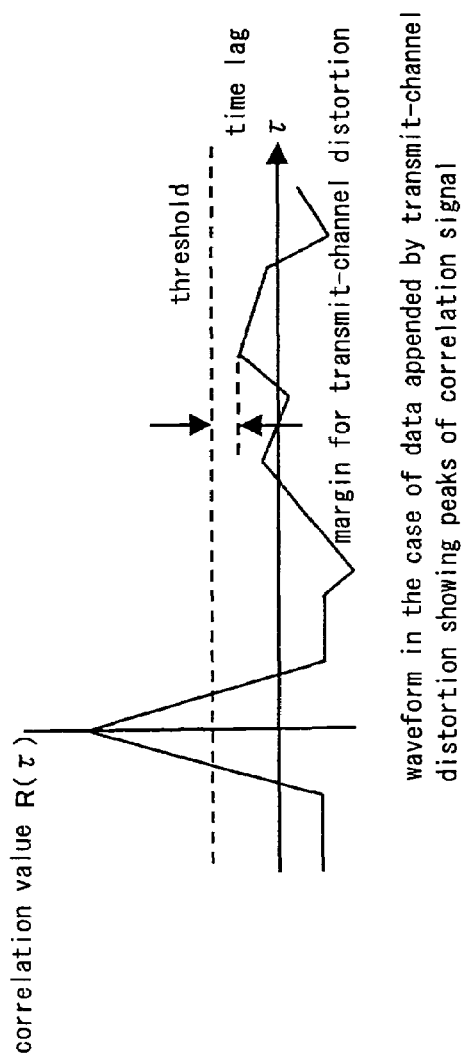

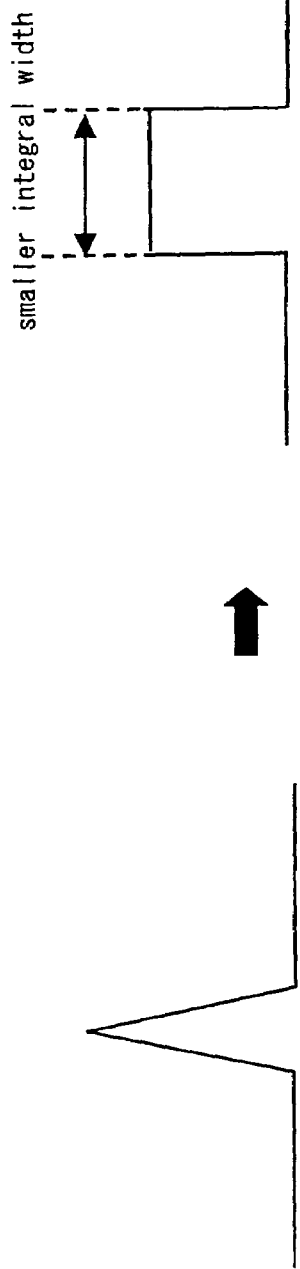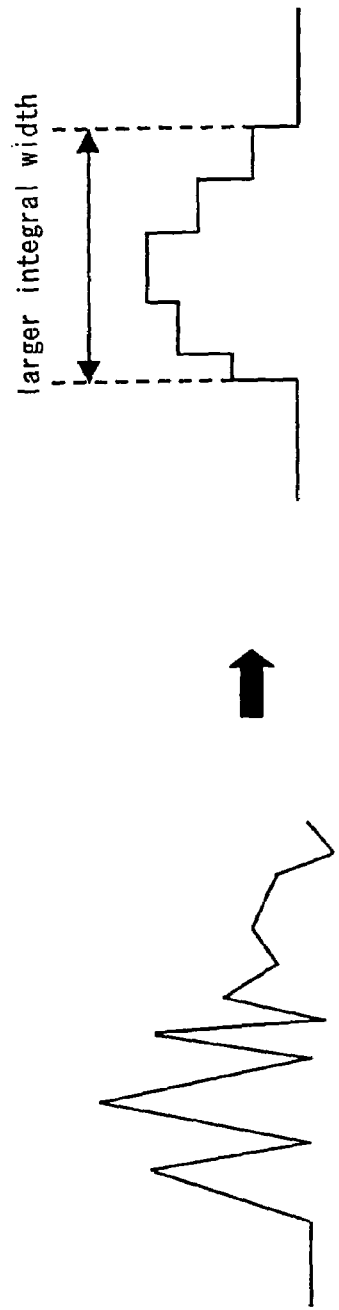

F I G. 30
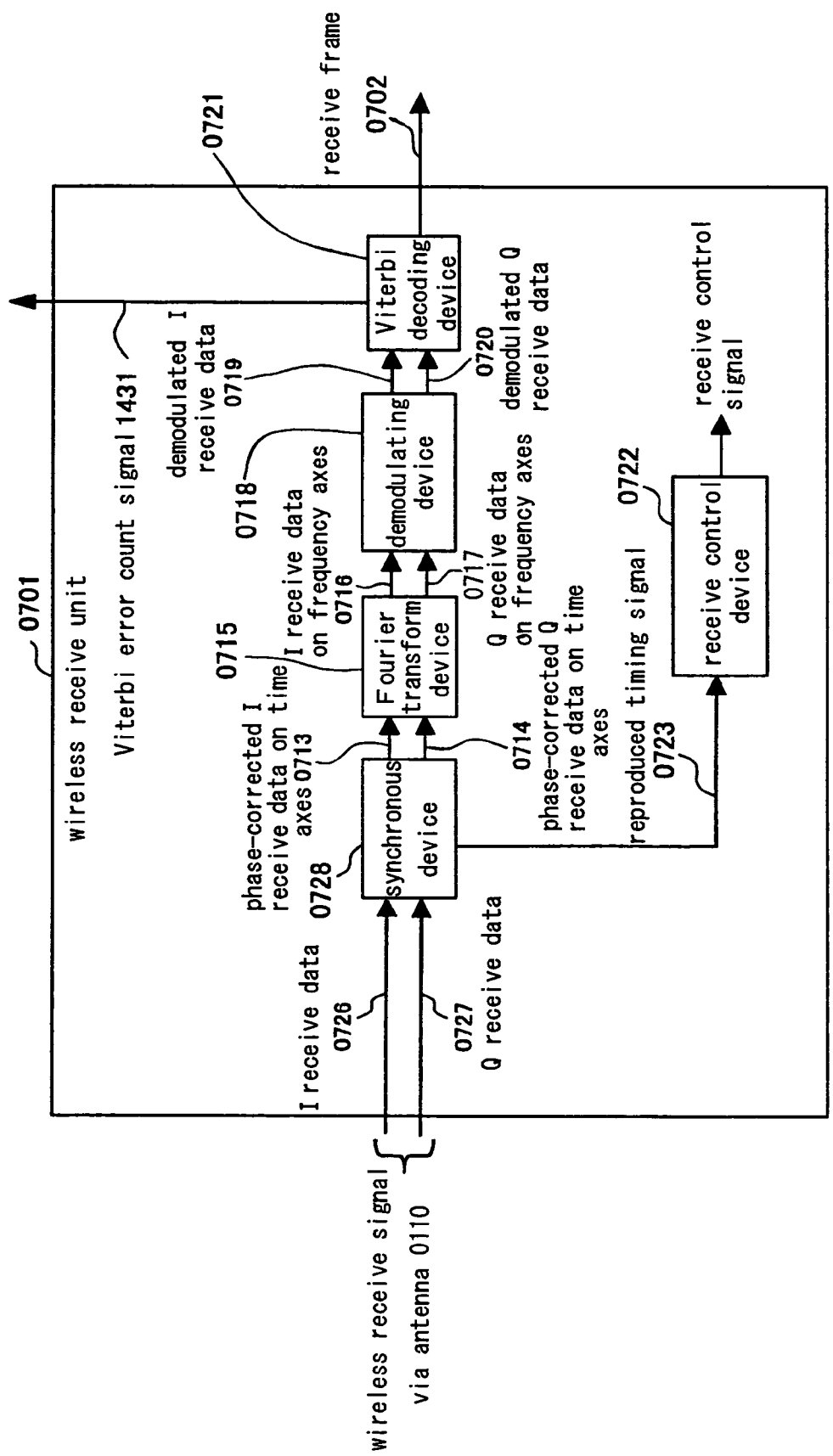

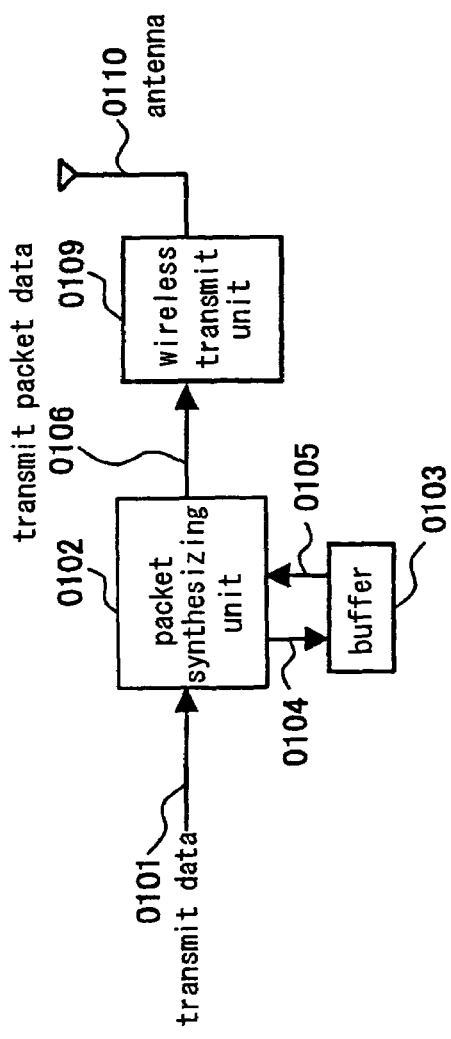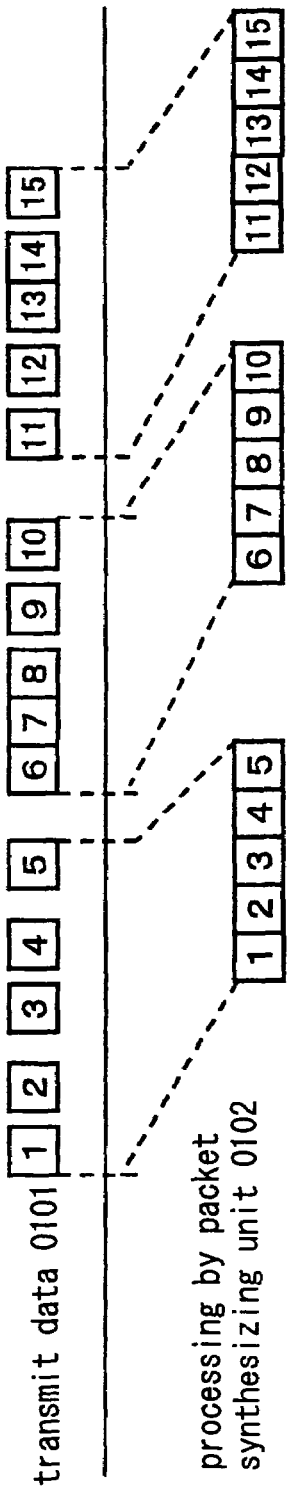

WIRELESS LAN APPARATUS FOR CHANGING PACKET LENGTH ACCORDING TO CHANGING CONDITIONS

FIELD OF THE INVENTION

This invention relates to a wireless LAN apparatus for wireless data transmission.

BACKGROUND OF THE INVENTION

In recent years, in response to an ever-increasing speed in a wireless-data transmission, apparatuses utilizing a wireless LAN have been realized for practical use as an apparatus capable of ensuring a high-speed and stable transmission of image data, and the like.

Hereinafter is described a conventional wireless LAN apparatus. FIG. 34 is a block diagram illustrating the configuration of the conventional wireless LAN apparatus, which is disclosed in No. H11-239155 of the publication of unexamined patent applications. In the figure, a numeral 0101 denotes transmit data, which is input to a packet synthesizing unit 0102. The packet synthesizing unit 0102 sends the transmit data 0101 together with a buffer write signal 0104 to a buffer 103. A certain quantity of the data in the buffer 103 is read by a buffer read signal 0105 and sent to the packet synthesizing unit 0102. The packet synthesizing unit 0102 synthesizes the read data to there by create a transmit packet data 0106. The created transmit packet data 0106 is sent to a wireless transmit unit 0109 and transmitted as a wireless transmit signal via an antenna 0110.

The operation of the conventional wireless LAN apparatus configured in the foregoing manner is described referring to FIG. 35.

First, a packetization number in the packet synthesizing unit 0102 is set at "5". The transmit data 0101 is now input per data block to the packet synthesizing unit 0102 at random times. The packet synthesizing unit 0102 writes the input transmit data 0101 together with the buffer write signal 0104 in the buffer 0103. When five data are stored in the buffer 0103, the packet synthesizing unit 0102 reads the data from the buffer 0103 for packetization and send the packet data to the wireless transmit unit 0109 as a transmit packet data 0106. These steps are repeated for data transmission.

However, in operating the conventional wireless LAN apparatus, a data volume for one packet is determined prior to the commencement of data communication between transmitting and receiving sides, while no particular change is made thereto in order to gain an optimum value after the communication commenced. Therefore, when a transmit rate in a wireless communication is changed, a packet length still remains the same.

In general, a communication rate in a wireless transmission channel is subject to changes according to a modulation system at a time of transmission. When the communication rate is high, an error rate is correspondingly high. The conventional method, however, does not allow the packet length to be extended despite the communication rate being low with fewer errors. Further, the packet length cannot be reduced either despite the communication rate being high with more errors. Thus, it is difficult to effectively use the transmission channel.

One of the measures to control errors when the transmission channel for wireless-communication is in bad shape is to reduce the packet length. The conventional method, however, does not allow the packet length to be changed, thereby making it impossible to select a suitable packet length depending on the status of transmission channel. Thus, the conventional method undergoes a load of errors resulting in quite a possible failure to maintain a required transmit rate.

Moreover, because the packet length cannot be changed in the conventional method when the input transmit data is temporarily slowed down, more time is required before the transmission. This is inadequate for the transmission of real-time data.

Also, it is necessary, in the conventional method, for the receiving side to prepare a receive buffer based on the assumption of a maximum rate and maximum packet length of the data to be received. This requires an excessively large buffer size creating another problem that the hardware increases.

The present invention is presented in light of the mentioned problems and designed to realize a constantly stable communication quality through an adaptive packet-length adjustment in response to changing conditions in connection with a wireless communication.

SUMMARY OF THE INVENTION

Therefore, a main object of the present invention is to realize a constantly stable communication quality through an adaptive packet-length adjustment in response to changing conditions in connection with a wireless communication.

In order to achieve the main object, a wireless LAN apparatus according to the present invention comprises, as a transmitting-side configuration thereof, a packet length controlling unit, the packet length controlling unit controlling a packet length of transmit data, a packet synthesizing unit, the packet synthesizing unit synthesizing the number of the transmit data in response to the packet length controlled by the packet length controlling unit into a transmit packet data and outputting the transmit packet data, a frame synthesizing unit, the frame synthesizing unit appending the packet-length information to a header information of the transmit packet data synthesized by the packet synthesizing unit and outputting the information-appended transmit packet data as a transmit frame, and a wireless transmit unit, the wireless transmit unit transmitting wirelessly the transmit frame output by the frame synthesizing unit.

The operation of the apparatus configured in the foregoing manner is described. When the transmit data is input to the packet synthesizing unit, the packet synthesizing unit packetizes the input transmit data to thereby create the transmit packet data. The packet synthesizing unit, referring to the packet-length information from the packet length controlling unit, assembles the number of the transmit data indicated by the packet-length information into one transmit packet data. The created transmit packet data is sent out to the frame synthesizing unit. The frame synthesizing unit creates the transmit frame by appending the packet-length information for transmission to the header of the input transmit packet data and sends out the transmit frame to the wireless transmit unit. The wireless transmit unit converts the transmit frame into a wireless transmit signal and transmits the signal wirelessly. Here, the packet length of the transmit data is controlled in the packet length controlling unit according to the transmit rate in the wireless transmit unit. More specifically, when the transmit rate is relatively high, the packet length is accordingly reduced because errors are more likely to occur in the wireless transmission. On the contrary, when the transmit rate is relatively low, the packet length is accordingly extended because errors are not very likely to occur in the wireless transmission. Having the packet length subject to adjustments depending on the circumstances as described, the transmission can be more efficient, and a communication of higher quality can be achieved.

It is preferable for the packet length controlling unit to be comprised of a packet length register capable of externally controlling the packet-length information.

The packet length controlling unit comprises, a timer, the timer restarting in response to an input of a reset signal, a timer termination register, the timer termination register indicating a count-termination value of the timer, and a force-transmit instructing device, the force-transmit instructing device outputting a transmit instructing signal to the packet synthesizing unit when a count value counted by the timer agrees with the count termination value indicated by the timer termination register.

It is preferable that the packet synthesizing unit output the reset signal to the timer based on an output of the transmit packet data. It is also preferable that the packet synthesizing unit, when the transmit instructing signal from the force-transmit instructing device is input thereto, prioritizes the transmit packet data over the packet-length information from the packet length register to thereby output the transmit packet data.

The operation of the apparatus configured in the foregoing manner is described. The packet synthesizing unit outputs the reset signal to the packet length controlling unit when the previously-input transmit data is packetized and the packet data is output. The timer of the packet length controlling unit, to which the reset signal is input, is reset to "0" and restarts. The count value counted by the timer is sent to the force-transmit instructing device. The count termination value of the timer is preset in the timer termination register and is provided for the force-transmit instructing device. When the count value of the timer reaches the termination value, the force-transmit instructing device provides the packet synthesizing unit with the transmit instructing signal. The transmit instructing signal is prioritized over the packet-length information. The packet synthesizing unit, when the transmit instructing signal is input thereto, discontinues the control based on the packet-length information and immediately creates the packet data, and thereby output the packet data to the frame synthesizing unit. In this manner, when the input of the transmit data is temporarily slowed down resulting in a more delayed transmission of the transmit frame, time management by means of the timer, timer termination register and force-transmit instructing device serves to maintain a time delay through the stages, from the data input through packetization, at a constant level or below. Thus, real-time data can be more advantageously communicated.

The apparatus preferably further comprises, as the transmitting-side configuration thereof, a data rate detecting unit, the data rate detecting unit detecting a transmit rate of the transmit data to be input to the packet synthesizing unit and outputting the detection result as a data rate detection signal.

The packet length controlling unit preferably further comprises, a packet-length rate controlling device, the packet-length rate controlling device increasing or decreasing the packet-length information of the packet length register based on the data rate detection signal from the data rate detecting unit.

The operation of the apparatus configured in the foregoing manner is described. The data rate detecting unit detects the data rate of the transmit data to be input to the packet synthesizing unit and outputs the detected data rate as the data rate detection signal to the packet-length rate controlling device of the packet length controlling unit. The packet-length rate controlling device, when the data rate detection signal is smaller than a current packet length indicating that the input of the transmit data is slowed down, decreases a value of the packet-length information. On the other hand, the packet-length rate controlling device, when the data rate detection signal is larger than the current packet length indicating that the input of the transmit data is accelerated, increases the value of the packet-length information. Thus, the packet length is extended or reduced depending on the data rate of the transmit data so that time required for storing the transmit data in the buffer is reduced to the minimum necessary. This enables a time delay resulting from the buffer to be reduced.

Further, it is preferable for the apparatus to be configured as follows. The apparatus further comprises, as a receiving-side configuration thereof, a wireless receive unit, the wireless receive unit receiving the transmit frame transmitted wirelessly by another wireless LAN apparatus configured likewise, and an error detecting unit, the error detecting unit judging whether or not the transmit frame is normally received.

The wireless transmit unit, as the receiving-side configuration of the apparatus, wirelessly transmits a receive data indicating the judgment result with respect to the wireless receive unit to the another wireless LAN apparatus.

The apparatus further comprises, as the transmitting-side configuration thereof, a retransmit controlling unit, the retransmit controlling unit requesting the wireless transmit unit to retransmit the same transmit frame when judging that an transmission error occurred based on the receive data.

The packet length controlling unit further comprises, as the transmitting-side configuration of the apparatus, a retransmit counting device, the retransmit counting device counting the number of the retransmission requests from the retransmit controlling unit, a retransmit-count upper limit register, the retransmit-count upper limit register setting an upper-limit value for the count by the retransmit counting device, and a retransmit-packet length controlling device, the retransmit-packet length controlling device maintaining a value of the packet-length information when the number of the retransmission requests counted by the retransmit counting device is smaller than the upper-limit value set by the retransmit-count upper limit register and decreasing the value of the packet-length information when the number of the retransmission requests counted by the retransmit counting device agrees with the upper-limit value set by the retransmit-count upper limit register.

The operation of the apparatus configured in the foregoing manner is described. When the presence of a communication error is confirmed in a wireless communication between the wireless LAN apparatus according to the present invention and a wireless LAN apparatus of the opposite party by a returned data from the opposite end, the retransmit controlling unit requests to retransmit the same transmit frame. The retransmit counting device of the packet length controlling unit counts the number of the retransmission requests. As long as the count value is smaller than the value of the retransmit-count upper limit register, the retransmit-packet length controlling device maintains the packet-length information at a current level. When the count value reaches the value of the retransmit-count upper limit register, the retransmit-packet length controlling device reduces the value of the packet-length information and provides the packet synthesizing unit with the reduced value. As a result, the packet synthesizing unit packetizes the transmit data based on a packet-length information smaller than the packet-length information already undergoing the communication error. Thus, the wireless communication is implemented by means of the shorter transmit frame so as to avoid communication errors. As described, the packet length is changed in response to the number of the error-caused retransmission requests so that communication errors occur less frequently even when the transmission channel is in bad shape. Hence, the decrease of the communication speed can be controlled.

It is preferable for the apparatus to be configured as follows. The apparatus further comprises, as the receiving-side configuration thereof, a wireless receive unit, the wireless receive unit receiving the transmit frame transmitted wirelessly by another wireless LAN apparatus configured likewise, and an error detecting unit, the error detecting unit judging whether or not the transmit frame is normally received.

The wireless transmit unit, as the receiving-side configuration of the apparatus, wirelessly transmits a receive data indicating the judgment result with respect to the wireless receive unit to the another wireless LAN apparatus on the opposite end.

The apparatus further comprises, as the transmitting-side configuration thereof, a retransmit controlling unit, the retransmit controlling unit requesting the wireless transmit unit to retransmit the same transmit frame as a most-recently-transmitted transmit frame when it is judged that an error occurred in the transmission based on the receive data and judging whether or not the retransmission is successfully implemented.

The packet length controlling unit further comprises, as the transmitting-side configuration of the apparatus, a retransmit counting device, the retransmit counting device counting the number of retransmission requests from the retransmit controlling unit, a retransmit count averaging device, the retransmit count averaging device calculating an average value of the number of retransmission requests when the retransmit controlling unit judges that the retransmission is successful, a retransmit-count upper limit register, the retransmit-count upper limit register setting an upper-limit value for the count by the retransmit counting device, and a retransmit-packet length controlling device, the retransmit-packet length controlling device maintaining a packet length of the most-recently-transmitted transmit frame as the packet length of the transmit data to be transmitted when the average value calculated by the retransmit count averaging device is smaller than the count upper-limit value set by the retransmit-count upper limit register and setting a decreased value of the packet length of the most-recently-transmitted transmit frame as the packet length of the transmit data to be retransmitted when the average value calculated by the retransmit count averaging device agrees with the count upper-limit value set by the retransmit-count upper limit register.

The operation of the apparatus configured in the foregoing manner is described. When the presence of a communication error is confirmed in a wireless communication between the wireless LAN apparatus according to the present invention and an opposite-end wireless LAN apparatus by a returned data from the opposite end, the retransmit controlling unit requests to retransmit the same transmit frame. The retransmit counting device of the packet length controlling unit counts the number of the retransmission requests and is reset when the transmission is successfully implemented. The retransmit count averaging device retains the number of the retransmission requests counted by the retransmit counting device from the time when the retransmission is requested until the retransmission is successfully implemented. The retransmit count averaging device then adds the previously accumulated values to the number of the retransmission requests to figure out an average value. As long as the average value is smaller than the value of the retransmit-count upper limit register, the retransmit-packet length controlling device maintains the packet-length information at a current level. When the average value reaches the value of the retransmit-count upper limit register, the retransmit-packet length controlling device decreases the value of the packet-length information and provides the packet synthesizing unit with the decreased packet-length information. As a result, the packet synthesizing unit packetizes the transmit data according to a packet-length information smaller than the packet-length information already undergoing the communication error. In consequence of that, the wireless communication is implemented by means of the shorter transmit frame so as to avoid communication errors. Thus, when the transmission channel is in bad shape, the occurrence of communication errors is controlled to be less frequent and the decrease of the communication speed can be controlled. In particular, the packet length is changed according to the average value based on the previously accumulated values of the number of the error-caused retransmission requests. This means that the value of the packet-length information, in which the transmission status of the previously-transmitted data is reflected, is used. Therefore, when the data is, for example, consistently transmitted to the same party, the decrease of the communication speed is even more effectively controlled.

It is preferable for the apparatus to be configured as follows.

The wireless transmit unit, as the receiving-side configuration of the apparatus, creates a packet length control frame enabling the packet length of the transmit frame transmitted by another wireless LAN apparatus configured likewise to be designated by the receiving-side wireless LAN apparatus of the present invention and wirelessly transmits the packet length control frame to the another wireless LAN apparatus.

The apparatus further comprises, as the transmitting-side configuration thereof, a wireless receive unit, the wireless receive unit receiving the packet length control frame transmitted wirelessly by another wireless LAN apparatus configured likewise, a packet length control frame detecting unit, the packet length control frame detecting unit judging the packet length control frame received by the wireless receive unit and outputting a packet length request-to-reduce signal when the packet length control frame instructs the packet length to be reduced and a packet length request-to-extend signal when the packet length control frame instructs the packet length to be extended.

The packet length controlling unit, as the transmitting-side configuration of the apparatus, reduces the value of the packet-length information when the packet length request-to-reduce signal is input thereto and increases the value of the packet-length information when the packet length request-to-extend signal is input thereto.

The operation of the apparatus configured in the foregoing manner is described. In a wireless communication with the opposite party, the packet length control frame detecting unit, when judging that a frame sent from the opposite party and received by the wireless receive unit is a packet length control frame and further judging that the packet length control frame requests the packet length to be reduced, outputs the packet length request-to-reduce signal to the packet length controlling unit. On the contrary, the packet length control frame detecting unit, when judging that the packet length control frame requests the packet length to be extended, outputs the packet length request-to-extend signal to the packet length control unit. The packet length controlling unit reduces the value of the packet-length information when the packet length request-to-reduce signal is input thereto and increases the value of the packet-length information when the packet length request-to-extend signal is input thereto. As described, the packet length in compliance with a receiving-side buffer size is realized by automatically adjusting the packet length to be transmitted depending on the requests from the receiving side. Thus, the receiving-side buffer size can be advantageously reduced.

It is preferable for the apparatus to be configured as follows.

The apparatus comprises, as the transmitting-side configuration thereof, a wireless transmit unit, the wireless transmit unit synthesizing one or a plurality of transmit data into a transmit packet data, appending a packet-length information indicating the number of the transmit data synthesized into the transmit packet data to the header information of the transmit packet data, and transmitting wirelessly the information-appended transmit packet data as a transmit frame.

The apparatus comprises, as the receiving-side configuration thereof, a wireless receive unit, the wireless receive unit receiving the transmit frame transmitted wirelessly by another wireless LAN apparatus on the transmitting side configured likewise, a packet extracting unit, the packet extracting unit separating the received transmit frame into the transmit packet data and the header information, a packet length detecting unit, the packet length detecting unit detecting the packet-length information included in the transmit frame in the header information separated from the transmit frame by the packet extracting unit, and a packet dividing unit, the packet dividing unit dividing the transmit packet data separated from the transmit frame by the packet extracting unit based on the packet-length information detected by the packet length detecting unit and outputting the divided transmit packet data.

The configuration of the foregoing configuration is described. Wireless data from an opposite-end wireless terminal received by the wireless receive unit is sent to the packet extracting unit. The packet extracting unit separates the received data into a receive packet data and a header information, and sends out the receive packet data to the packet dividing unit, and the header information to the packet length detecting unit. The packet length detecting unit detects the packet-length information in the header information. The packet dividing unit divides the input receive packet data based on the packet-length information and outputs the divided data. Because the receive packet data is thus divided based on the packet-length information detected in the header information, data can be retrieved even from a variable-length receive data with a header information (packet-length information) separated therefrom. As a result, precise handling can be done when data is incoming in a variable packet length adaptively set depending on the status of transmission channel, thereby achieving an improved efficiency in transmission.

It is preferable for the apparatus to be configured as follows.

The apparatus comprises, as the receiving-side configuration thereof, a buffer capacity detecting unit the buffer capacity detecting unit detecting a buffer remaining capacity indicating a free space of the buffer for receiving packets, a buffer capacity comparing unit, the buffer capacity comparing unit comparing the buffer remaining capacity detected by the buffer capacity detecting unit to a first buffer-capacity comparison value indicating that the remaining capacity of the buffer is too small and comparing the buffer remaining capacity detected by the buffer capacity detecting unit to a second buffer-capacity comparison value indicating that there is a sufficient buffer remaining capacity, a buffer control frame creating unit, the buffer control frame creating unit outputting a buffer limit frame when the buffer remaining capacity larger than the first buffer-capacity comparison value decreases to be equal thereto according to the buffer capacity comparing unit, and outputting a buffer limit releasing frame when the buffer remaining capacity smaller than the second buffer-capacity comparison value increases to be equal thereto, and a wireless transmit unit, the wireless transmit unit wirelessly transmitting the buffer limit frame or buffer limit releasing frame output by the buffer control frame creating unit.

The packet-length control unit, as the transmitting-side configuration of the apparatus, controls the packet length of the transmit data in response to the buffer limit frame or buffer limit releasing frame transmitted by another wireless LAN apparatus configured likewise.

The operation of the apparatus configured in the foregoing manner is described. In a wireless communication with the opposite party, a remaining capacity of a packet-receive buffer changes in real time. The buffer capacity detecting unit detects the remaining capacity of the buffer and provides the detection result for the buffer capacity comparing unit. The buffer capacity comparing unit compares the remaining capacity of the buffer to the first buffer-capacity comparison value and second buffer-capacity comparison value. When the remaining capacity of the buffer is equal to the first buffer-capacity comparison value, the buffer control frame creating unit outputs the buffer limit frame to the wireless transmit unit. On the contrary, when the remaining capacity of the buffer is equal to the second buffer-capacity comparison value, the buffer control frame creating unit outputs the buffer limit releasing frame to the wireless transmit unit. The buffer limit frame and buffer limit releasing frame are wirelessly transmitted by the wireless transmit unit. The buffer limit frame or buffer limit releasing frame is thus transmitted to the terminal on the opposite end in response to the remaining capacity of the buffer. This enables the transmit packet length to be limited on the transmitting side in response to the remaining capacity of the buffer on the receiving side. The receive buffer can be consequently reduced in size.

It is preferable for the apparatus to be configured as follows.

The apparatus comprises, as the receiving-side configuration thereof, a wireless receive unit, the wireless receive unit receiving the transmit frame transmitted wirelessly by another wireless LAN apparatus configured likewise and detecting a transmit-channel distortion information in the incoming transmit frame, a packet extracting unit, the packet extracting unit separating the received transmit frame into the transmit packet data and the header information, a packet length detecting unit, the packet length detecting unit detecting the packet-length information included in the transmit frame in the header information separated from the transmit frame by the packet extracting unit, and a packet dividing unit, the packet dividing unit dividing the transmit packet data separated from the transmit frame by the packet extracting unit and outputting the divided transmit packet data based on the packet-length information detected by the packet length detecting unit.

As the transmitting-side configuration of the apparatus, the packet length controlling unit controls the packet length of the transmit data based on the transmit-channel distortion information detected by the wireless receive unit.

The operation of the apparatus configured in the foregoing manner is described. In a wireless communication with the opposite party, the wireless receive unit sends out a receive frame according to a wireless receive signal to the packet extracting unit. The packet extracting unit separates the receive frame into the receive packet data and the header information, and the packet length detecting unit detects the packet-length information in the header information. The packet dividing unit divides the receive packet data based on the packet-length information and outputs the divided data as the receive data. Meanwhile, the wireless receive unit detects the transmit-channel distortion information in the wireless receive signal. The packet length controlling unit controls the packet-length information for transmission according to the transmit-channel distortion information and sends out the controlled information to the packet synthesizing unit. The synthesizing unit, when packetizing the input transmit data to create the transmit packet data referring to the packet-length information from the packet length controlling unit, synthesizes the number of the transmit data, which is indicated by the packet-length information, into a transmit packet data. The packet synthesizing unit then sends out the created transmit packet data to the frame synthesizing unit. The frame synthesizing unit creates the transmit frame by appending the packet-length information for transmission to the header of the input transmit packet data and sends out the transmit frame to the wireless transmit unit. The wireless transmit unit converts the transmit frame into a wireless transmit signal and wirelessly transmits the signal wirelessly. As described, the transmit-channel distortion information is extracted by the wireless receive unit so that an optimum packet length can be set based on the transmit-channel distortion information. This achieves a significant improvement in the transmission efficiency.

It is preferable for the apparatus to be configured as follows.

The apparatus comprises, as the transmitting-side configuration of the apparatus, a RSSI judging unit, the RSSI judging unit judging an electric power of the incoming transmit frame based on the transmit-channel distortion information detected in the transmit frame by the wireless receive unit serving to receive the transmit frame transmitted wirelessly by another wireless LAN apparatus configured likewise, and a packet-length information creating unit, the packet-length information creating unit creating a packet length setting signal for the transmit frame transmitted wirelessly by the wireless LAN apparatus according to the present invention based on the judgment result by the RSSI judging unit and outputting the signal to the packet length controlling unit.

As the transmitting-side configuration of the apparatus, the packet length controlling unit controls the packet length of the transmit data based on the packet length setting signal.

The operation of the apparatus configured in the foregoing manner is described. Referring to currently-communicating wireless LAN apparatuses, the larger the electric power of the wireless receive signal is, the closer to each other in distance they are, enjoying a transmission channel in good shape. On the contrary, the smaller the electric power of the wireless receive signal is, the farther to each other in distance they are, leaving the transmission channel in bad shape. The RSSI judging unit serves to judge the foregoing aspect, and the packet-length information creating unit controls the packet length for transmission according to the judgment result. More specifically, an optimum packet length is set according to the judgment for the status of transmission channel based on the electric power of the wireless receive signal. The transmission efficiency is thereby significantly improved.

It is preferable for the apparatus to be configured as follows.

The wireless receive unit, as the receiving-side configuration of the apparatus, outputs a peak-value information indicating the status of a peak value of a correlation signal in connection with a synchronous reference symbol of the transmit frame received from another wireless LAN apparatus configured likewise.

The apparatus further comprises, as the receiving-side configuration thereof, a synchronous detection signal judging unit, the synchronous detection signal judging unit judging the status of transmission channel for transmitting wirelessly the transmit frame based on the peak-value information, and a packet-length information creating unit, the packet-length information creating unit creating a packet-length setting information for the transmit data based on the judgment result by the synchronous detection signal judging unit and outputting the setting information to the packet length controlling unit.

As the transmitting-side configuration of the apparatus, the packet length controlling unit controls the packet length of the transmit data based on the packet-length setting information.

The operation of the apparatus configured in the foregoing manner is described. When a difference between the peak value and the highest of non-peak ups of in the waveform of the correlation signal in connection with the synchronous reference symbol (margin for transmit-channel distortion) is small, the transmission channel is in bad shape: the smaller the difference is, the worse the status of transmission channel is. On the contrary, the larger the difference is, the better the status of transmission channel is. The synchronous detection signal judging unit serves to judge the foregoing aspect, and the packet-length information creating unit controls the packet length for transmission based on the judgment result. An optimum packet length is thus set according to the judgment for the status of transmission channel based on the peak value of the wireless receive signal, thereby achieving an improved efficiency in transmission.

It is preferable for the apparatus to be configured as follows.

As the receiving-side configuration of the apparatus, the wireless receive unit outputs an integral width of the correlation signal in connection with the synchronous reference symbol of the transmit frame received from another wireless LAN apparatus configured likewise.

The apparatus further comprises, as the receiving-side configuration of thereof, a synchronous detection signal judging unit, the synchronous detection signal judging unit judging the status of transmission channel for transmitting wirelessly the transmit frame based on the integral width, a packet-length information creating unit, the packet-length information creating unit creating the packet-length setting information for the transmit data based on the judgment result by the synchronous detection signal judging unit and outputting the setting information to the packet length controlling unit.

As the transmitting-side configuration of the apparatus, the packet length controlling unit controls the packet length of the transmit data based on the packet-length setting information.

The operation of the apparatus configured in the foregoing manner is described. When the integral width of the correlation signal in connection with the synchronous reference symbol is large, the transmission channel is in bad shape: the larger the difference is, the worse the status of transmission channel is. On the contrary, the smaller the difference is, the better the status of transmission channel is. The synchronous detection signal judging unit judges the foregoing aspect, and the packet-length information creating unit controls the packet length for transmission according to the judgment result. More specifically, an optimum packet length is thus set according to the judgment for the status of transmission channel based on the correlation-signal integral width in connection with the synchronous reference symbol of the wireless receive signal, thereby achieving an improved efficiency in transmission.

It is preferable for the apparatus to be configured as follows.

As the receiving-side configuration of the apparatus, the wireless receive unit outputs a constellation distortion signal based on a difference between an actual mapping value and an ideal mapping value of the transmit frame received from another wireless LAN apparatus configured likewise. The apparatus further comprises, as the receiving-side configuration thereof, a synchronous detection signal judging unit, the synchronous detection signal judging unit detecting the status of transmission channel for transmitting wirelessly the transmit frame based on the constellation distortion signal, and a packet-length information creating unit, the packet-length information creating unit creating the packet-length setting information for the transmit data based on the judgment result by the synchronous detection signal judging unit and outputting the setting information to the packet length controlling unit.

As the transmitting-side configuration of the apparatus, the packet length controlling unit controls the packet length of the transmit data based on the packet-length setting information. The operation of the apparatus configured in the foregoing manner is described. When a value of the distortion in the constellation is small, the transmission channel is in good shape: the smaller the difference is, the better the status of transmission channel is. On the contrary, the larger the difference is, the worse the status of transmission channel is. The synchronous detection signal judging unit judges the foregoing aspect, and the packet-length information creating unit controls the packet length for transmission according to the judgment result. Accordingly, an optimum packet length is set according to the judgment for the status of transmission channel based on the level of distortion occurring in the constellation, thereby achieving an improved efficiency in transmission.

It is preferable for the apparatus to be configured as follows.

As the receiving-side configuration of the apparatus, the wireless receive unit outputs a Viterbi error count signal based on a difference between a branch metric according to a maximum-likelihood path and a branch metric according to other than the maximum-likelihood path. The apparatus further comprises, as the receiving-side configuration thereof, a synchronous detection signal judging unit, the synchronous detection signal judging unit judging the status of transmission channel for transmitting wirelessly the transmit frame based on the Viterbi error count signal, and a packet-length information creating unit, the packet-length information creating unit creating the packet-length setting information for the transmit data based on the judgment result by the synchronous detection signal judging unit and outputting the setting information to the packet length controlling unit.

As the transmitting-side configuration of the apparatus, the packet length controlling unit controls the packet length of the transmit data based on the packet-length setting information.

The operation of the apparatus configured in the foregoing manner is described. When the Viterbi error count is small, the transmission channel is in good shape: the smaller the Viterbi error count is, the better the status of transmission channel is. On the contrary, the larger the Viterbi error count is, the worse the status of transmission channel is. The synchronous detection signal judging unit judges the foregoing aspect, and the packet-length information creating unit controls the packet length for transmission according to the judgment result. Accordingly, an optimum packet length is set according to the judgment for the status of transmission channel based on the Viterbi error count, thereby achieving an improved efficiency in transmission.

It is preferable for the apparatus to be configured as follows.

The apparatus further comprises, as the receiving-side configuration thereof, a wireless receive unit, the wireless receive unit receiving the transmit frame transmitted wirelessly by another wireless LAN apparatus configured likewise, a packet extracting unit, the packet extracting unit separating the received transmit frame into the transmit packet data and the header information, a packet length detecting unit, the packet length detecting unit detecting the packet-length information included in the transmit frame in the header information separated from the transmit frame by the packet extracting unit, a packet dividing unit, the packet dividing unit dividing the transmit packet data separated from the transmit frame by the packet extracting unit based on the packet-length information detected by the packet length detecting unit and outputting the divided transmit packet data, and a receive-accuracy information creating unit, the receive-accuracy information creating unit creating a receive-accuracy information signal based on the packet length setting signal used for controlling the packet length in the packet length controlling unit.

As the transmitting-side configuration of the apparatus, the wireless receive unit controls a bit width for receive processing and an accuracy for processing a retained volume of receive data based on the receive-accuracy information signal.

The operation of the apparatus configured in the foregoing manner is described. In place of judging the status of transmission channel by analyzing the wireless receive signal, the receive-accuracy information creating unit is provided. The receive-accuracy information creating unit controls the bit width for processing the wireless receive signal and the accuracy for processing the receive-data retained volume in a Viterbi decoding unit according to the packet-length information set on the transmitting side. Thus, an optimum receive-processing accuracy is autonomously set based on the transmit packet length. This successfully achieves a significant improvement both in the transmission efficiency and power consumption.

As thus far described, according to the present invention, the packet length is subject to adaptive changes depending on the wireless transmit rate, transmission-channel status, transmit-data rate, receiving-side buffer status, and the like. Therefore, a constantly stable quality in communication can be achieved, while the increase of the hardware in size relatively controlled.

BRIEF DESCRIPTION OF THE DRAWINGS

These and other objects as well as advantages of the invention will become clear by the following description of preferred embodiments and explicit in the appended claims of the invention. Many other benefits of the invention uncited in this specification will come to the attention of those skilled in the art upon implementing the present invention.

FIGS. 21A and B are descriptive diagrams of a training-sequence correlation in a matched filter portion of the wireless LAN apparatus according to the Embodiment 10 of the present invention.

FIGS. 23A and B are diagrams illustrating a moving integral in the wireless LAN apparatus according to the Embodiment 10 of the present invention.

FIG. 30 is a block diagram illustrating the configuration of a wireless receive unit of the wireless LAN apparatus according to the Embodiment 12 of the present invention.

FIG. 34 is a block diagram illustrating the configuration of a conventional wireless LAN apparatus.

FIG. 35 is a timing chart illustrating the operation of the conventional wireless LAN apparatus.

DETAILED DESCRIPTION OF THE INVENTION

Hereinafter, preferred embodiments of the present invention are described referring to the figures.

Embodiment 1

Figure 1:
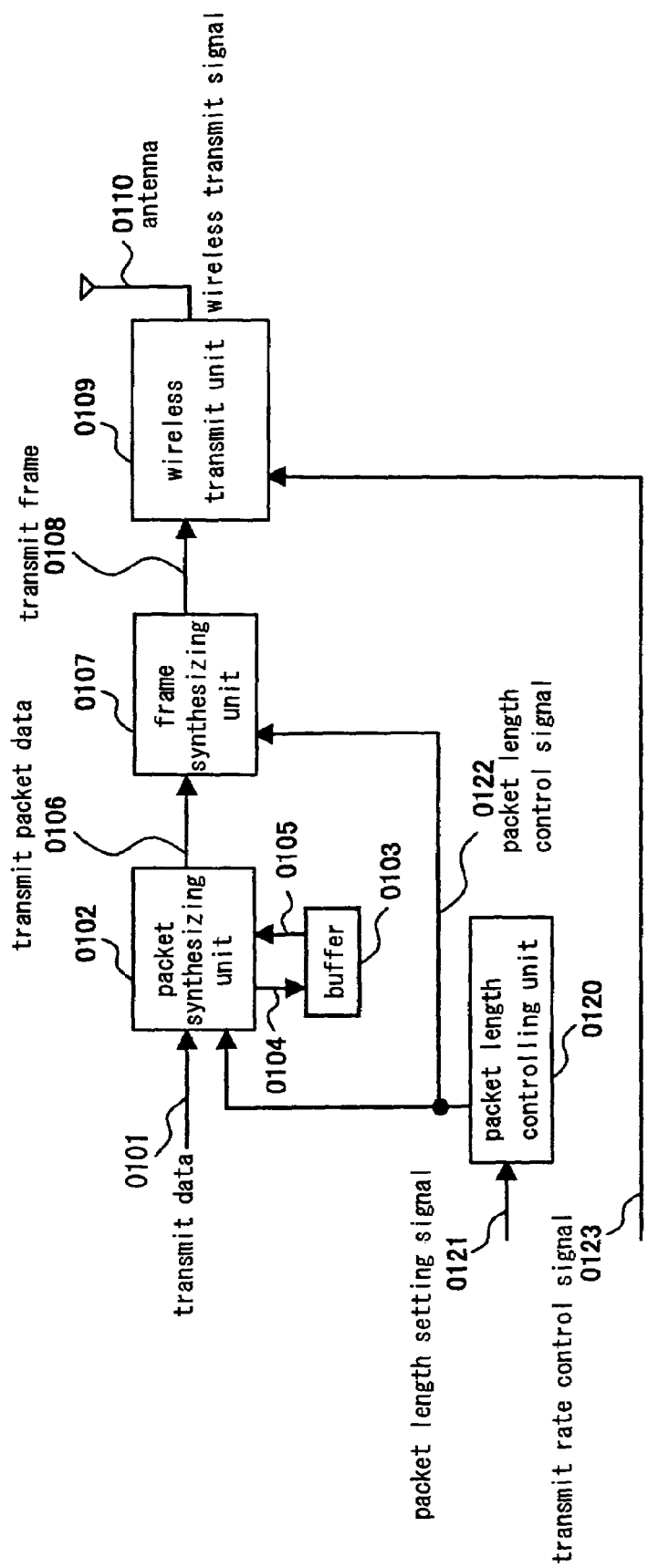
FIG. 1 is a block diagram illustrating the configuration of a wireless LAN apparatus according to an Embodiment 1 of the present invention.

FIG. 1 is a block diagram illustrating the configuration of a wireless LAN apparatus according to an embodiment 1 of the present invention. The wireless LAN apparatus according to this embodiment comprises, further to the configuration of a conventional apparatus shown in FIG. 34, a packet length controlling unit 0120. The packet length controlling unit 0120 inputs a packet length setting signal 0121 thereto to create a packet length control signal 0122 and outputs the created packet length control signal 0122 to a packet synthesizing unit 0102 and a frame synthesizing unit 0107. Further, the wireless LAN apparatus according to this embodiment is configured in the manner serving to input a transmit rate control signal 0123 to a wireless transmit unit 0109. The packet length controlling unit 0120, packet synthesizing unit 0102, frame synthesizing unit 0107 and wireless transmit unit 0109 function as the transmitting-side configuration of the apparatus.

The packet length controlling unit 0120 is comprised of a register settable according to the packet length control signal 0121. The transmit rate control signal 0123 instructs the wireless transmit unit 0109 on a transmission speed. The packet length controlling unit 0120, in compliance with the communication speed instructed by the transmit rate control signal 0123, rewrites data in the packet length controlling unit 0120 according to the packet length setting signal 0121 and outputs the packet length control signal 0122. The packet length control signal 0122 instructs the packet synthesizing unit 0102 and frame synthesizing unit 0107 on a packet-length information (the number of transmit data to be packetized).

Figure 2:
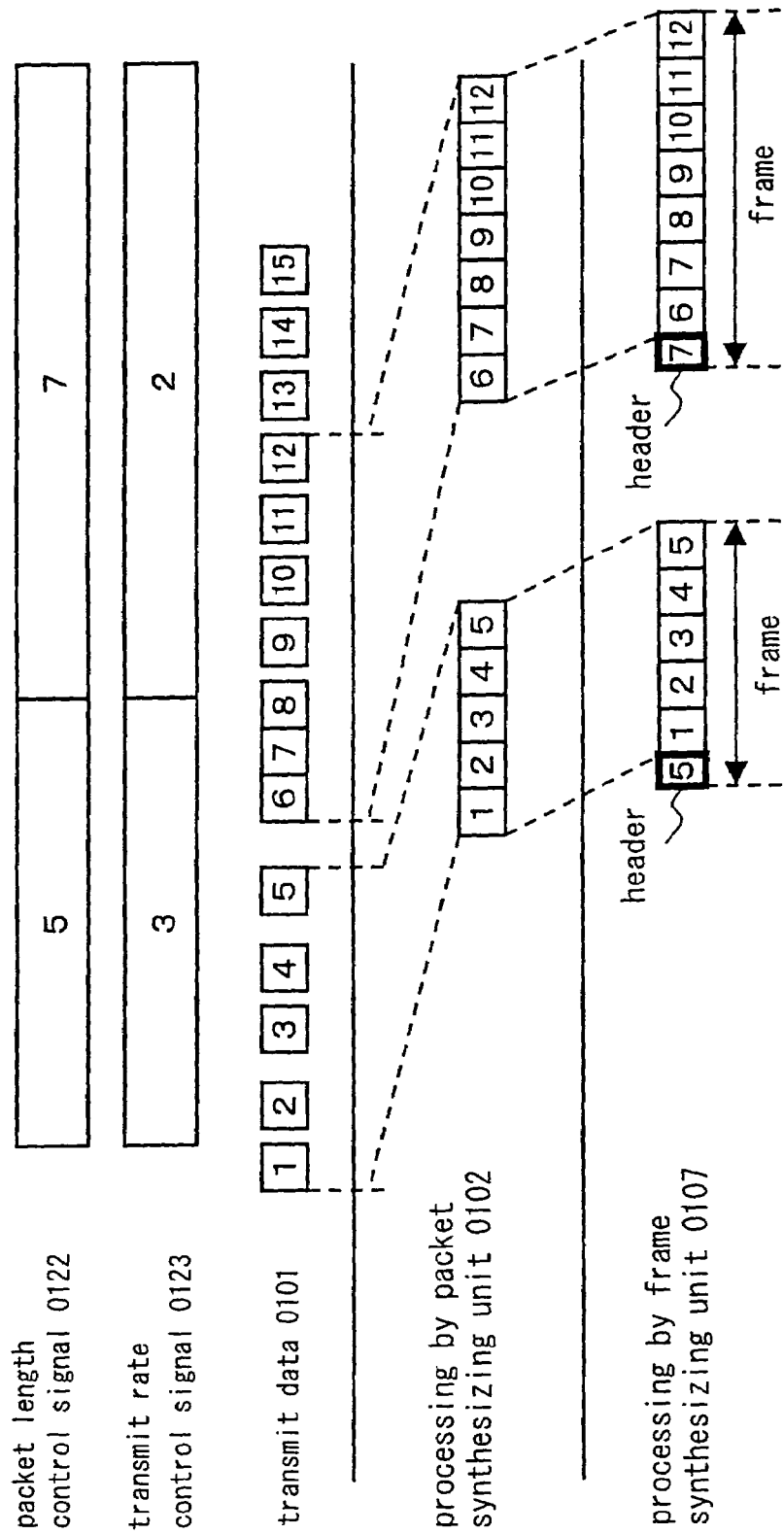
FIG. 2 is a timing chart illustrating the operation of the wireless LAN apparatus according to the Embodiment 1 of the present invention.

The wireless LAN apparatus according to this embodiment configured in the foregoing manner is described in terms of the operation thereof referring to a timing chart of FIG. 2.

The wireless transmit unit 0109 is capable of setting four transmit rates, "1", "2", "3" and "4", wherein the transmission speed is the lowest at "1" and becomes higher in the order of "2", "3" and "4".

The transmit rate "3" is now set in the transmit rate control signal 0123. In the packet length controlling unit 0120, a packet length "5" is set according to the packet length setting signal 0121. As a result, the packet length control signal 0122 indicating the packet length "5" is output from the packet-length control unit 0120.

When transmit data 0101 is input to the packet synthesizing unit 0102, the packet synthesizing unit 0102 writes the input transmit data 0101 in a buffer 0103 according to a buffer write signal 0104. Because the packet length "5" is set in the packet length control signal 0122, the packet synthesizing unit 0102, when five data from the transmit data 0101 are stored in the buffer 0103, reads the five data via a buffer read signal 0105 for packetization to thereby output the packetized data as a transmit packet data 0106. The frame synthesizing unit 0107 appends the packet-length information "5" in the packet length control signal 0122 to a header of the transmit packet data 0106 to thereby synthesize the data and outputs a transmit frame 0108 comprised of the synthesized data. The transmit frame 0108 is wirelessly transmitted by the wireless transmit unit 0109 at the transmit rate "3" instructed by the transmit rate control signal 0123.

The transmit rate control signal 0123 is reset to indicate the transmit rate "2" so that the transmission is slower. The slower the transmission is, the more unlikely the occurrence of errors is, thereby enabling the packet length to be extended. Therefore, a packet length "7" is set in the packet-length control unit 0120 according to the packet length control signal 0121, and the packet length "7" is output to the packet length control signal 0122.

Because the packet length "7" is set in the packet length control signal 0122, the packet synthesizing unit 0102, when seven data from the transmit data 0101 are stored in the buffer 0103, reads the seven data via the buffer read signal 0105 for packetization to thereby output the packetized data as the transmit packet data 0106. The frame synthesizing unit 0107 appends the packet-length information "7" according to the packet length control signal 0122 to the header of the transmit packet data 0106 to thereby synthesize the data and output the synthesized transmit frame 0108. The transmit frame 0108 is wirelessly transmitted by the wireless transmit unit 0109 at the transmit rate "2" instructed by the transmit rate control signal 0123.

As described, according to this embodiment, the packet length of the transmit data is controllable in response to the different transmit rates, thereby achieving an improvement in the transmission efficiency and communication quality.

Embodiment 2

The Embodiment 1 enables a packet length to be adjusted in response to different transmit rates, yet does not allow the packet length to respond to an input speed of transmit data.

When a packet-length information is once determined and the input of the transmit data is temporarily slowed down, it requires a longer time before the number of the input transmit data agrees with the packet-length information. This is, causing a large delay before the transmission, inadequate for real-time data communication. An Embodiment 2 serves to eliminate such an inconvenience.

Figure 3:
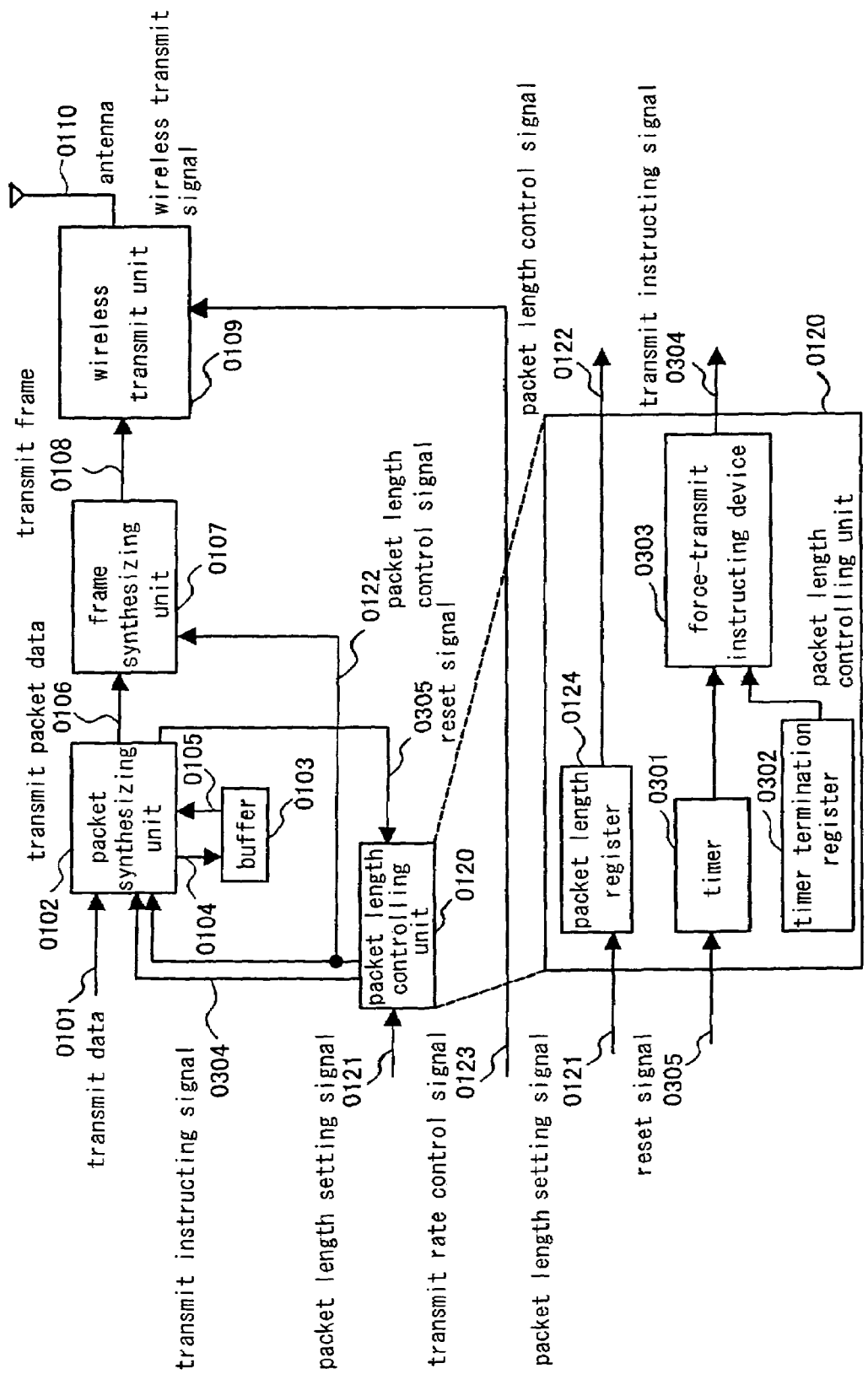
FIG. 3 is a block diagram illustrating the configuration of a wireless LAN apparatus according to an Embodiment 2 of the present invention.

FIG. 3 is a block diagram illustrating the configuration of a wireless LAN apparatus according to the Embodiment 2 of the present invention. In this embodiment, a minor modification is made to the configuration of the packet length controlling unit 0120 of the Embodiment 1, which is the transmitting-side configuration of the apparatus. FIG. 3 also includes an internal configuration of the packet length controlling unit 0120.

The packet synthesizing unit 0102, after outputting a transmit packet data 0106 to a frame synthesizing unit 0107, activates a reset signal 0305 when transmit data 0101 is first input thereto.

The packet length controlling unit 0120 comprises,
a timer 0301,
the timer 0301 periodically counting and being initialized to a packet length "0" according to the reset signal 0305,
a timer termination register 0302,
the timer termination register 0302 setting an upper limit for the count of the timer 0301, and
a force-transmit instructing device 0303,
the force-transmit instructing device 0303 comparing the count value of the timer 0301 and the count upper limit of the timer termination register 0302 and
activating a transmit instructing signal 0304 when the two counts agree with each other to thereby output the signal 0304.

The force-transmit instructing device 0303 outputs the created transmit instructing signal 0304 to the packet synthesizing unit 0102.

The packet synthesizing unit 0102, when the transmit instructing signal 0304 from the packet length controlling unit 0120 is activated, immediately packetizes data currently stored in a buffer 0103 irrespective of the packet length instructed by a packet length control signal 0122. The packet synthesizing unit 0102 then outputs the created transmit packet data 0106 to the frame synthesizing unit 0107.

Because any component other than the mentioned is the same as those shown in FIG. 1 of the Embodiment 1, the same reference numerals are attached thereto, thereby leaving them undescribed in this embodiment.

Figure 4:
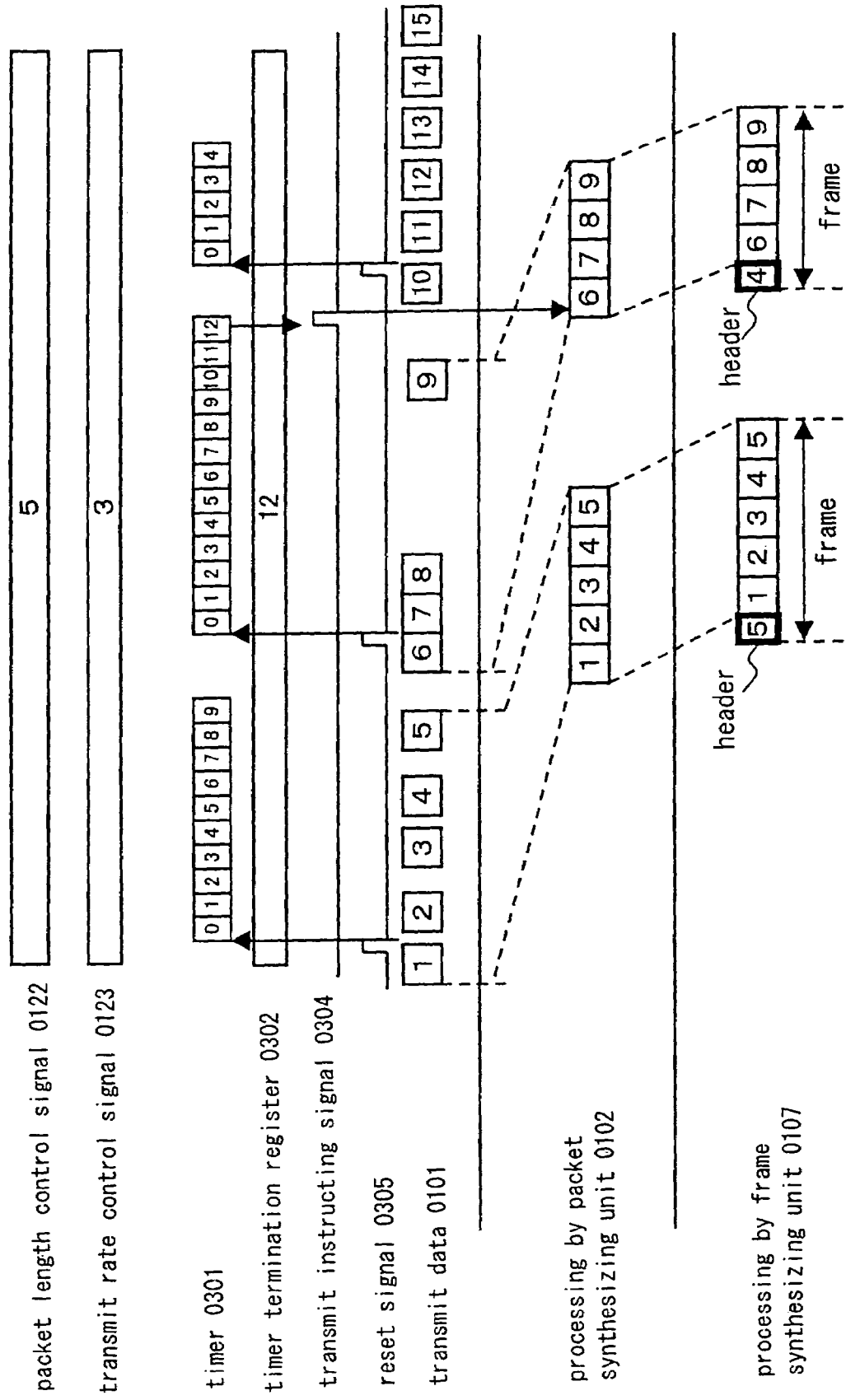
FIG. 4 is a timing chart illustrating the operation of the wireless LAN apparatus according to the Embodiment 2 of the present invention.

Next, the operation of the wireless LAN apparatus configured in the foregoing manner according to this embodiment is described referring to a timing chart of FIG. 4.

Currently, a packet length "5" is instructed by the packet length control signal 0122, and the count upper limit is set at "12" in the timer termination register 0302. The reset signal 0305 and transmit instructing signal 0304 are activated in HIGH state.

When the transmit data 0101 is input to the packet synthesizing unit 0102, the reset signal 0305 is in the HIGH state, the count value of the timer 0301 is reset to "0". The timer 0301 subsequently starts counting. Until the timer 0301 reaches the count upper limit "12" set in the timer termination register 0301, five data from the transmit data 0101 are stored in the buffer 0103. When the count value of the timer 0301 reaches the packet length "5" instructed by the packet length control signal 0122, the packet synthesizing unit 0102 reads five data from the buffer 0103 and outputs the read data to the frame synthesizing unit 0107.

The frame synthesizing unit 0107 appends the packet-length information "5" to a header of the data to thereby create a transmit frame 0108 and outputs the transmit frame 0108 to a wireless transmit unit 0109. The wireless transmit unit 0109 wirelessly transmits the transmit frame 0108 via an antenna 0110.

Then, a sixth data from the transmit data 0101 input. The sixth data is the first data to be input after the packet synthesizing unit 0102 outputs the transmit packet data 0106. Therefore, the reset signal 0305 is in the HIGH state, and the timer 0301 is reset to "0" to thereafter restart counting.

When the count value of the timer 0301 reaches the count upper limit "12" of the timer termination register 0302 until ninth and tenth data from the transmit data 0101 are input, the force-transmit instructing device 0303 arranges the transmit instructing signal 0304 to be HIGH. In this manner, the packet synthesizing unit 0102 prioritizes the transmit instructing signal 0304 over the packet length control signal 0122 so that four data currently stored in the buffer 0103 are immediately packetized, there by creating the transmit packet data 0106. The packet synthesizing unit 0120 then outputs the transmit packet data 0106 to the frame synthesizing unit 0107. The frame synthesizing unit 0107 appends the packet-length information "4" to the header of the transmit packet data 0106 to create the transmit frame 0108 and outputs the created transmit frame 0108 to the wireless transmit unit 0109. The wireless transmit unit 0109 wirelessly transmits the transmit frame 0108 via the antenna 0110.

As described, according to this embodiment, when the input of the transmit data is temporarily slowed down leading to a long delay in transmission of the transmit frame, time management by the timer 0301, timer termination register 0302 and force-transmit instructing device 0303 serves to control any delay from the data input through the packetization to a certain degree or below. This enables a real-time data communication to be advantageously implemented.

Embodiment 3

Figure 5:
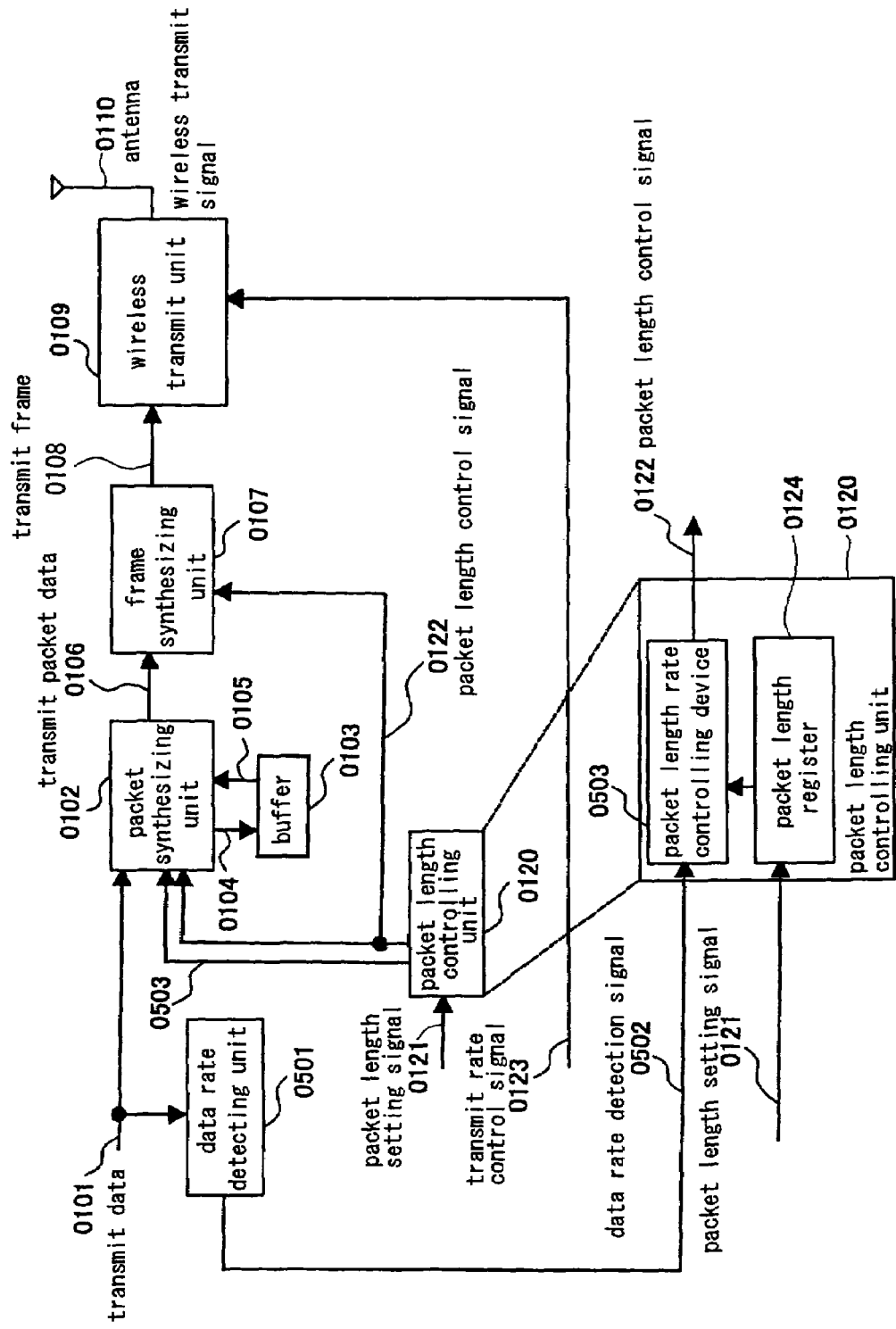
FIG. 5 is a block diagram illustrating the configuration of a wireless LAN apparatus according to an Embodiment 3 of the present invention.

FIG. 5 is a block diagram illustrating the configuration of a wireless LAN apparatus according to an Embodiment 3 of the present invention. In this embodiment, further to the configuration of the Embodiment 1, the apparatus comprises a data rate detecting unit 0501 as the transmitting-side configuration thereof, and a packet length controlling unit 0120 comprises a packet-length rate controlling device 0503.

The data rate detecting unit 0501 periodically measures a transmit rate of transmit data 0101 being input to a packet synthesizing unit 0102 and counts up how many transmit data 0101 are input within a periodical time frame to thereby output a data rate detection signal 0502.

To the packet-length rate controlling unit 0503 further included in the packet length controlling unit 0120 is input a packet-length information from a packet length register 0124 and the data rate detection signal 0502 from the data rate detecting unit 0501. The packet-length rate controlling unit 0503 increases or decreases a value of the packet-length information depending on a value of the data rate detection signal 0502. In this case, a value according to the packet length register 0124 is a maximum value.

More specifically, when the value of the data rate detection signal 0502 is smaller than a current value of a packet length control signal 0122 and input of the transmit data 0101 is slowing down, the value of the packet-length information instructed by the packet length control signal 0122 is decreased by one. On the contrary, when the value of the data rate detection signal 0502 is larger than the current value of the packet length control signal 0122 and the input of the transmit data 0101 is accelerated, the value of the packet-length information instructed by the packet length control signal 0122 is increased by one.

Because any component other than the mentioned is the same as those shown in FIG. 1 of the Embodiment 1, the same reference numerals are attached thereto, thereby leaving them undescribed in this embodiment.

Figure 6:
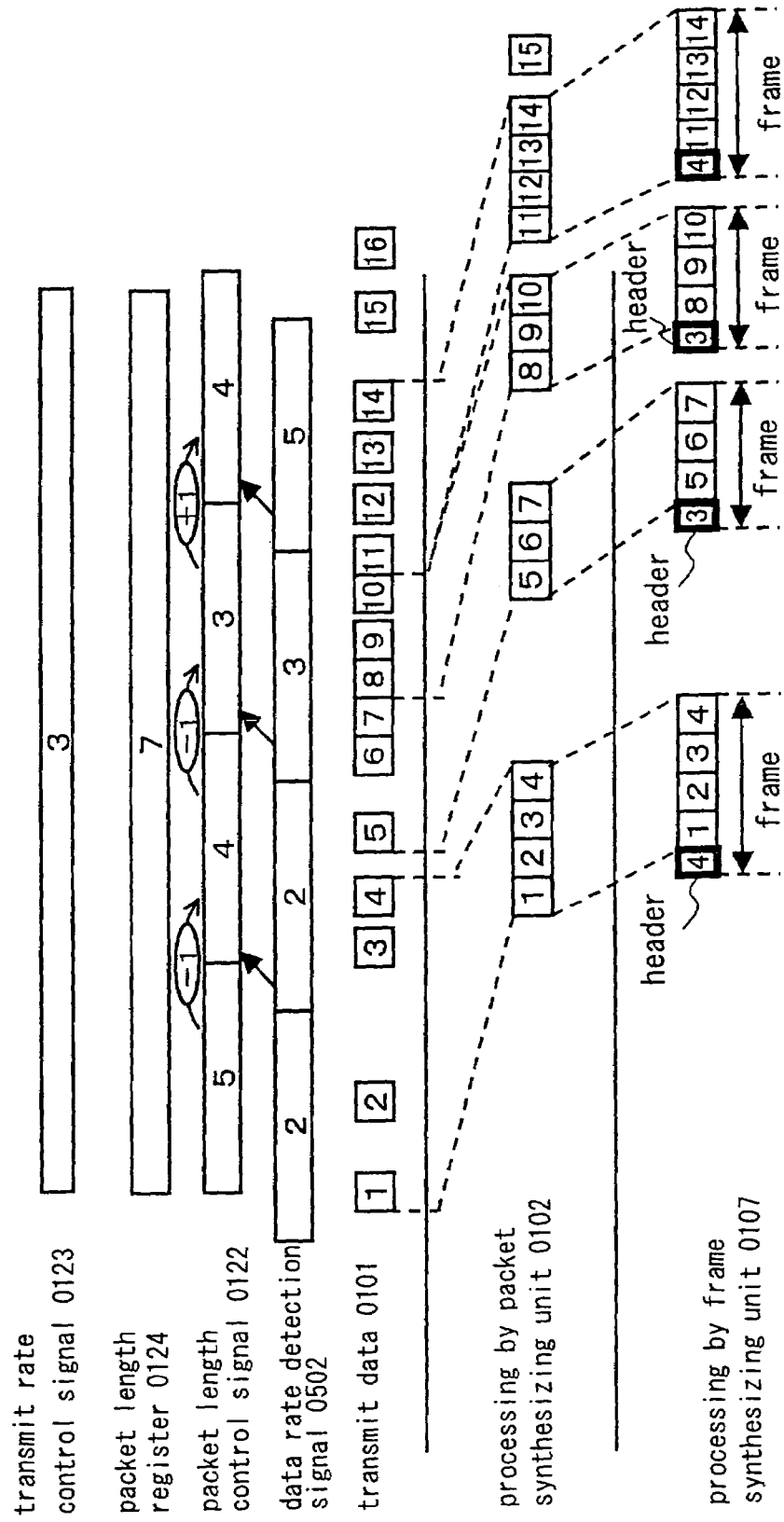
FIG. 6 is a timing chart illustrating the operation of the wireless LAN apparatus according to the Embodiment 3 of the present invention.

Next, the operation of the wireless LAN apparatus configured in the foregoing manner according to this embodiment is described referring to a timing chart of FIG. 6.

An initial value "5" is set as the packet length in the packet-length rate controlling unit, and a maximum value for packetization "7" is set in the packet length register 0124.

A first and second data from the transmit data 0101 are now input. Before a third data is input, the data rate detecting unit 0501 outputs "2" to the data rate detection signal 0502 upon the arrival of a periodical detecting time. As a result, the packet-length rate controlling unit 0503, because the data rate detection signal 0502 is smaller than the current packet-length information "5", decreases the value of the output value by one and outputs "4" to the packet length control signal 0122. The packet synthesizing unit 0102, when a fourth data from the transmit data 0101 is stored in the buffer 0103, packetizes the data to thereby output the transmit packet data 0106. The frame synthesizing unit 0107 appends the packet-length information "4" to the header of the transmit packet data 0106 to thereby outputs the transmit frame 0108. The transmit frame 0108 is wirelessly transmitted by the wireless transmit unit 0109 via the antenna 0110.

Before a six data from the transmit data 0101 is input, the data rate detecting unit 0501 outputs "3" to the data rate detection signal 0502 upon the arrival of the periodical detecting time. In this case, the packet-length rate controlling unit 0503, because the data rate detection signal 0502 is smaller than the current packet-length "4", decreases the output value by one to thereby output "3" to the packet length control signal 0122. The packet synthesizing unit 0102 packetizes fifth, sixth and seventh data from the transmit data 0101 to thereby create the transmit packet data 0106. The frame synthesizing unit 0107 appends the packet-length information "3" to the header of the transmit packet data 0106 to thereby output the transmit frame 0108. The transmit frame 0108 is wirelessly transmitted by the wireless transmit unit 0109 via the antenna 0110.

Eighth, ninth and tenth data from the transmit data 0101 are input before the periodical detecting time arrives at the data rate detecting unit 0501. Then, the packet synthesizing unit 0102 packetizes the eighth, ninth and tenth data from the transmit data 0101 to thereby create and output the transmit packet data 0106. The frame synthesizing unit 0107 appends the packet-length information "3" to the header of the transmit packet data 0106 to there by output the transmit frame 0108. The transmit frame 0108 is wirelessly transmitted by the wireless transmit unit 0109 via the antenna 0110.

The periodical detecting time arrives at the data rate detecting unit 0501 before an 11th data from the transmit data 0101 is input. In this case, the data rate detecting unit 0501 outputs "5" to the data rate detection signal 0502. Therefore, the packet-length rate controlling unit 0503, because the data rate detection signal 0502 is larger than the current packet-length information "3", increases the output value by one and outputs the packet-length "4" to the packet length control signal 0122. The packet synthesizing unit 0122 packetizes 11th, 12th, 13th and 14th data from the transmit data 0101 to thereby create and output the transmit packet data 0106. The frame synthesizing unit 0107 appends the packet-length information "4" to the header of the transmit packet data 0106 to thereby output the transmit frame 0108. The transmit frame 0108 is wirelessly transmitted by the wireless transmit unit 0109 via the antenna 0110.

As described, according to this embodiment, the number of data to be packetized is increased or decreased according to the data rate of the transmit data so that time required for storing the transmit data in the buffer. This realizes a reduction in the buffer capacity for storing the transmit data and a time delay resulting from the buffer.

Embodiment 4

Figure 7:
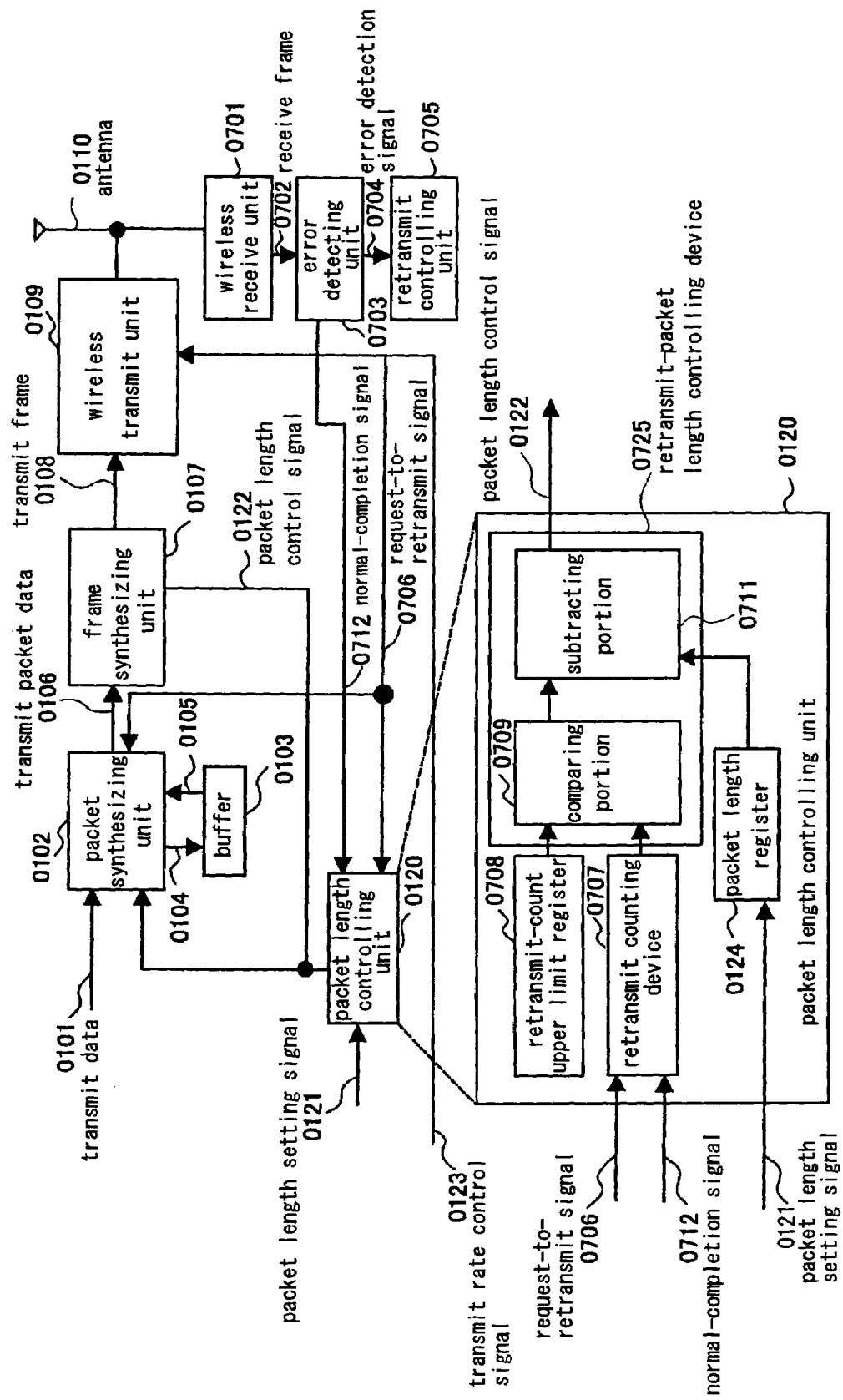
FIG. 7 is a block diagram illustrating the configuration of a wireless LAN apparatus according to an Embodiment 4 of the present invention.

FIG. 7 is a block diagram illustrating the configuration of a wireless LAN apparatus according to an Embodiment 4 of the present invention. The wireless LAN apparatus according to this embodiment, in order to confirm a transmission, creates an ACK frame when data is normally received by a receiving side and a NACK frame when the data is not normally received by the receiving side to accordingly send either of the frames back to a transmitting side.

The wireless LAN apparatus according to this embodiment comprises, further to the configuration of the Embodiment 1, as the receiving-side configuration thereof, a wireless receive unit 0701 and an error detecting unit 0703, and as a result of a minor modification made to the conventional configuration of a wireless transmit unit 0109, as the transmitting-side configuration thereof, a retransmit controlling unit 0705, wherein the configuration of a packet length controlling unit 0120 is modified.

The wireless receive unit 0701, when receiving a wireless receive signal via radio waves and an ACK signal for confirming the normal delivery of a transmitted data from a wireless LAN apparatus on the opposite end, outputs a receive frame 0702. The error detecting unit 0703 analyzes the content of the receive frame 0702 and activates an error detection signal 0704 in case of a NACK signal, and activates a normal-completion signal 0712 in case of the ACK signal. When the error detection signal 0704 is activated, the retransmit controlling unit 0705 activates a request-to-retransmit signal 0706 output to a packet synthesizing unit 0102. The request-to-retransmit signal 0706 serves to request the same data to be retransmitted.

The packet synthesizing unit 0102, when the request-to-retransmit signal 0706 from the retransmit controlling unit 0705 is activated, again outputs the same data as a transmit packet data 0106 of a packet length according to a packet length control signal 0122.

A retransmit counting device 0707 in the packet length controlling unit 0120 serves to count the request-to-retransmit signal 0706 and is initialized in response to the normal-completion signal 0712 from the error detecting unit 0703. A comparing portion 0709 compares a count upper limit set in a retransmit-count upper limit register and a count value of the retransmit counting device 0707.

A subtracting portion 0711 retains a current value according to a packet length register 0124 when the count value of the retransmit counting device 0707 is smaller than the other in the comparison result by the comparing portion 0709. The subtracting portion 0711, when the count value of the retransmit counting device 0707 is equal to or larger than the other in the comparison result, reduces a value of the packet-length information instructed by the packet length control signal 0122 and outputs the value as the packet length control signal 0122. A retransmit-packet length controlling device 0725, which is cited in the appended claims, is comprised of the comparing portion 0709 and the subtracting portion 0711.

Because any component other than the mentioned is the same as those shown in FIG. 1 of the Embodiment 1, the same reference numerals are attached thereto, thereby leaving them undescribed in this embodiment.

Figure 8:
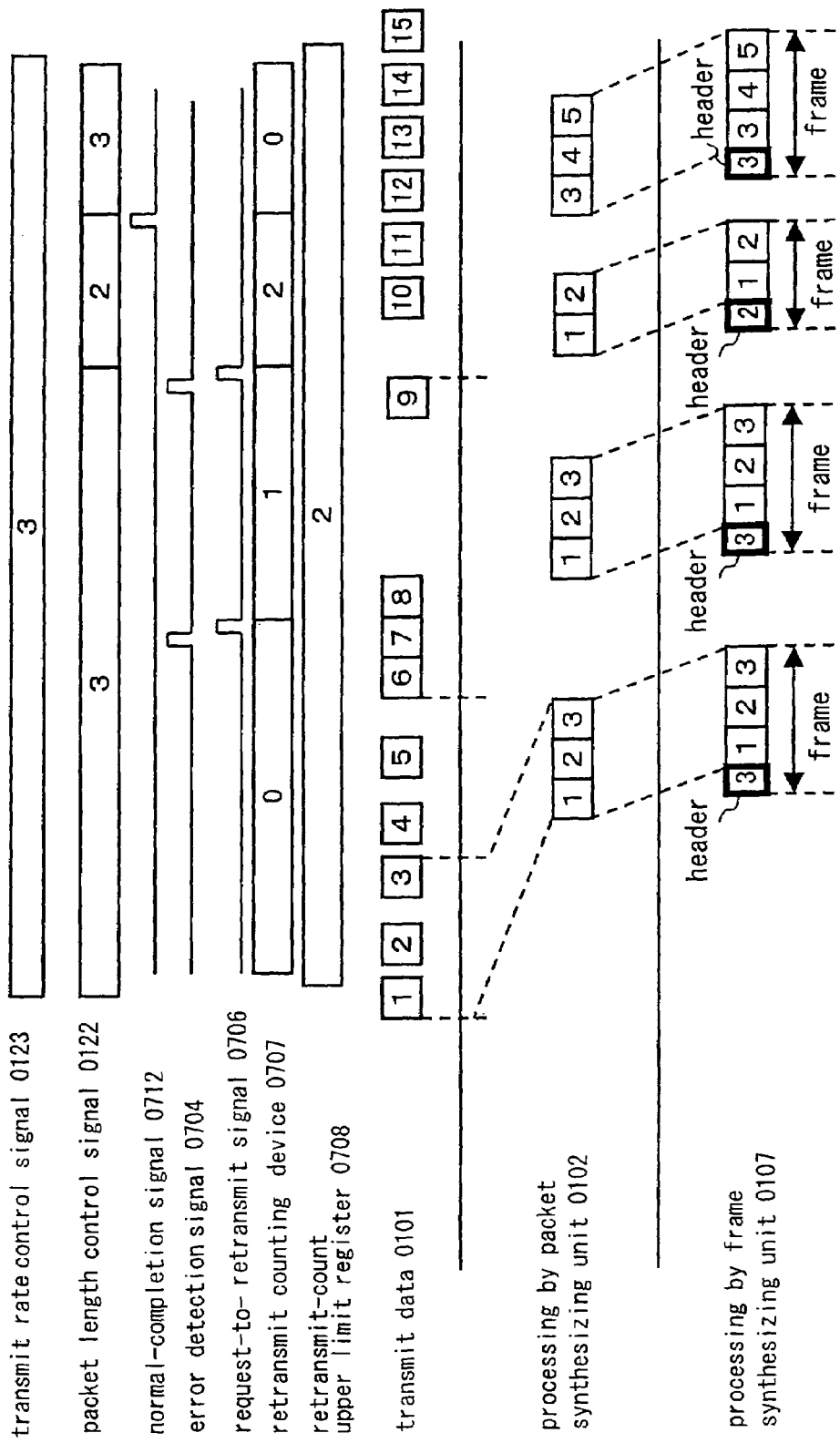
FIG. 8 is a timing chart illustrating the operation of the wireless LAN apparatus according to the Embodiment 4 of the present invention.

The wireless LAN apparatus according to this embodiment configured in the foregoing manner is described in terms of the operation thereof referring to a timing chart of FIG. 8.

A count upper limit "2" is input to the retransmit-count upper limit register 0708, and a packet length "3" is set in the packet length register 0124.

When the transmit data 0101 is input, the packet synthesizing unit 0102 packetizes data 1, 2, and 3 according to the packet length control signal 0122 to thereby output the transmit packet data 0106. The frame synthesizing unit 0107 appends the packet-length information "3" to a header of the transmit packet data 0106 to thereby create and output a transmit frame 0108. The transmit frame 0108 is wirelessly transmitted by the wireless transmit unit 0109 via an antenna 0110.

A receiving-side wireless LAN apparatus, which received the transmit frame 0108, sends the NACK frame to a transmitting-side wireless LAN apparatus in a failure to normally receive the transmit frame 0108. The error detecting unit 0703 of the transmitting-side wireless LAN apparatus, which received the NACK frame, activates the error detection signal 0704. In response to this, the retransmit controlling unit 0705 activates the request-to-retransmit signal 0706. Because the request-to-retransmit signal 0706 is activated, the count value of the retransmit counting device 0707 is "1". The comparing portion 0709 of the retransmit-packet length controlling device 0725 compares the count upper limit of the retransmit-count upper limit register 0708 and the count value of there transmit counting device 0707. In the comparison, the value of the retransmit counting device 0707 is smaller than the other. Therefore the subtracting portion 0711 retains the current value, the packet-length information instructed by the packet length control signal 0122 remains "3". The packet synthesizing unit 0102, because the request-to-retransmit signal 0706 is activated, uses the value of the packet-length information instructed by the packet length control signal 0122 to packetize the data 1, 2, and 3 from the transmit data 0101, which are the same as the previously-sent data. The packet synthesizing unit 0102 thereby creates and outputs the transmit packet data 0106. The frame synthesizing unit 0107 appends the packet-length information "3" to the header of the transmit packet data 0106 to thereby create and output the transmit frame 0108. The transmit frame 0108 is wirelessly transmitted by the wireless transmit unit 0109 via the antenna 0110.

The receiving-side wireless LAN apparatus, which received the transmit frame 0108, creates and resends the NACK frame to the transmitting-side wireless LAN apparatus in response to the second failure to normally receive the transmit frame 0108 due to the transmission channel in bad shape. The error detecting unit 0703 of the transmitting-side wireless LAN apparatus, which received the NACK frame, reactivates the error detection signal 0704. In response to this, the retransmit controlling unit 0705 reactivates the request-to-retransmit signal 0706. Because the request-to-retransmit signal 0706 is reactivated, the count value of the retransmit counting device 0707 accumulates to "2". The comparing portion 0709 of the retransmit-packet length controlling device 0725 compares the counter upper limit of the retransmit-count upper limit register 0708 and the count value of the retransmit counting device 0707. In this case, the retransmit counting device 0707 and retransmit-count upper limit register 0708 share the same value, therefore the subtracting portion 0711 subtracts "1" from the current value to thereby output a packet length "2" to the packet length control signal 0122. The packet synthesizing unit 0102, because the request-to-retransmit signal 0706 is activated, uses the value of the packet-length information instructed by the packet length control signal 0122 to packetize the data "1" and "2" from the transmit data 0101, the same as the previously-sent data. The packet synthesizing unit 0102 thereby creates and outputs the transmit packet data 0106. The frame synthesizing unit 0107 appends the packet-length information "2" to the header of the transmit packet data 0106 to thereby create and output the transmit frame 0108. The transmit frame 0108 is wirelessly transmitted by the wireless transmit unit 0109 via the antenna 0110 to the receiving-side wireless LAN apparatus.

The receiving-side wireless LAN apparatus, which received the transmit frame 0108, sends the ACK frame to the transmitting-side wireless LAN apparatus when failing to normally receive the transmit frame 0108 again due to the bad status of transmission channel. The error detecting unit 0703 of the transmitting-side wireless LAN apparatus, which received the ACK frame, activates the normal-completion signal 0712 signal 0704. In response to this, the count value of the retransmit counting device 0707 is cleared to be set at "0".

The receiving-side wireless LAN apparatus may be configured not to transmit the ACK frame to the transmitting-side wireless LAN apparatus when the failure to receive the transmit frame is known by the confirmation of the transmission. In this case, the error detecting unit 0703 of the transmitting-side wireless LAN apparatus activates the error detection signal 0704 when failing to receive the ACK frame during a certain period of time after transmitting the transmit frame 0108. The operation of the receiving-side wireless LAN apparatus when normally receiving the transmit frame 0108 is as described earlier.

As described, according to this embodiment, the packet length is changed according to the count of the error-caused retransmissions. In this manner, the packet length is controllable to be shorter even in the bad transmission status. This successfully enables the reduction of the communication speed to be controlled.

Embodiment 5

Figure 9:
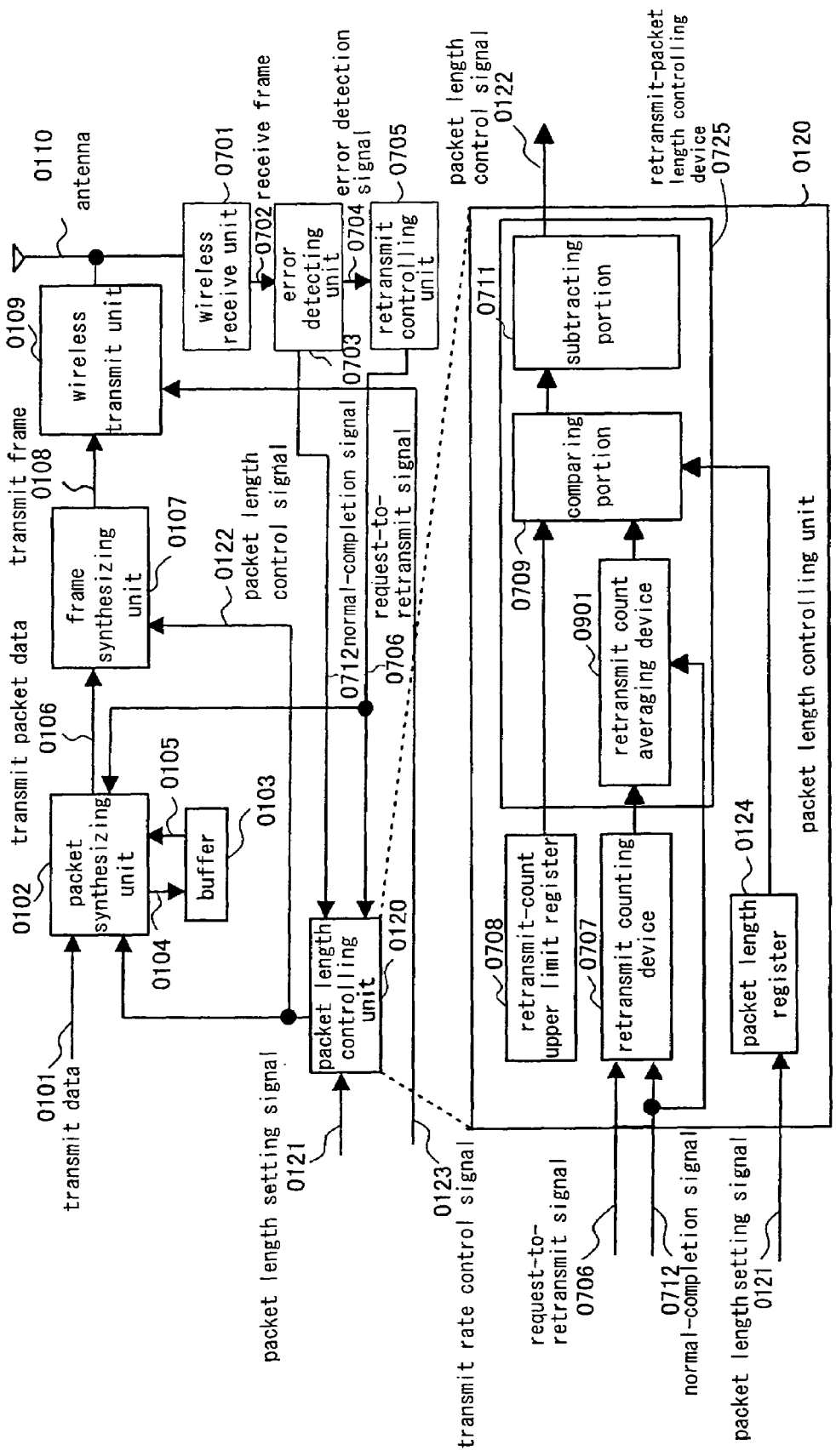
FIG. 9 is a block diagram illustrating the configuration of a wireless LAN apparatus according to an Embodiment 5 of the present invention.

FIG. 9 is a block diagram illustrating the configuration of a wireless LAN apparatus according to an Embodiment 5 of the present invention.

The configuration of the apparatus in the Embodiment 5 includes, as the transmitting side configuration of the apparatus, a retransmit count averaging device 0901 for averaging an output of a retransmit counting device 0707 of a packet length controlling unit 0120 further to the configuration of the Embodiment 4. Moreover, a comparing portion 0709 is modified so as to compare a count upper limit of a retransmit-count upper limit register 0708 and a count value of the retransmit count averaging device 0901. The retransmit count averaging device 0901 averages the number of retransmissions until it is known that data is normally received from a normal-completion signal 0712.

Referring to the configuration of the apparatus, a changing process of the retransmit counting device 0707 in FIG. 8 of the Embodiment 4 is adopted to a changing process of the retransmit count averaging device 0901.

The rest of the configuration and operation are same as described in the Embodiment 4, thereby leaving them undescribed in this embodiment.

As described, according to this embodiment, the packet-length, in which the transmission status of the previously-transmitted data is reflected, is used. Therefore, when the data is consistently transmitted to the same party, the decrease of the communication speed is even more effectively controlled.

Embodiment 6

Figure 10:
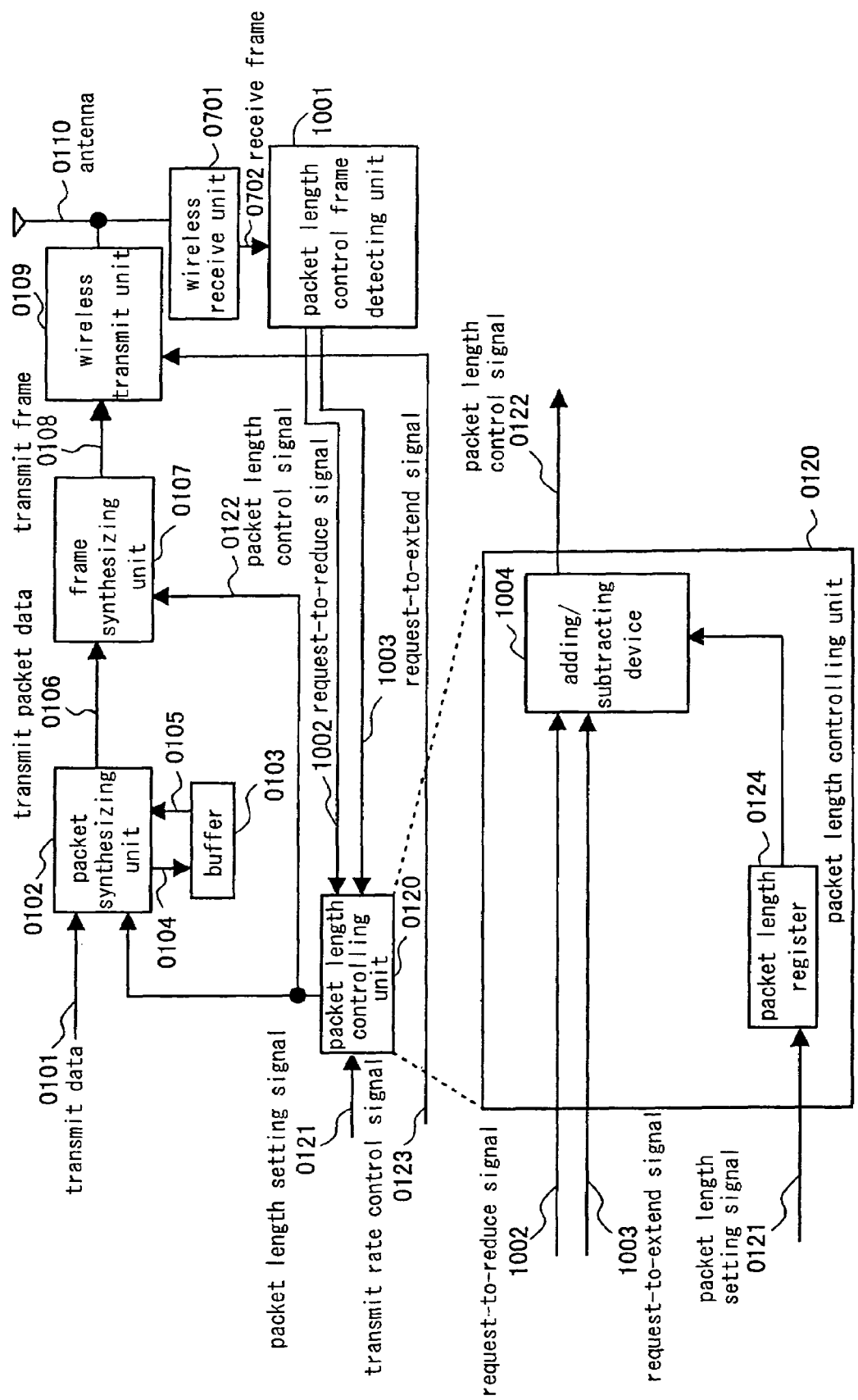
FIG. 10 is a block diagram illustrating the configuration of a wireless LAN apparatus according to an Embodiment 6 of the present invention.

FIG. 10 is a block diagram illustrating the configuration of a wireless LAN apparatus according to an Embodiment 6 of the present invention.

In the wireless LAN apparatus of this embodiment, as the receiving-side configuration of the apparatus, a wireless transmit unit 0109 serves to create a packet-length controlling frame for controlling a packet length and wirelessly transmit the packet-length controlling frame. Also in this embodiment, as the transmitting-side configuration of the apparatus, a wireless receive unit 0701 and a packet length control frame detecting unit 1001 are further included in the configuration of the Embodiment 1, wherein a packet length controlling unit 0120, as the transmitting-side configuration of the apparatus, is modified.

The wireless transmit unit 0109 further serves to create a packet length control frame, whereby a packet length of a transmit frame transmitted by another wireless LAN apparatus is designated by the receiving-side wireless LAN apparatus of the present invention, and wirelessly transmit the packet length control frame to the another wireless LAN apparatus.

The wireless receive unit 0701 receives a wireless receive signal via radio waves transmitted by the another wireless LAN apparatus configured likewise and outputs a receive frame 0702 based on the receipt. The packet length control frame detecting unit 1001 detects that the receive frame 0702 is the packet length control frame. The packet length control frame detecting unit 1001, when detecting that the received receive frame 0702 is the packet length control frame requesting a reduced packet length, activates a packet length request-to-reduce signal 1002. The packet length control frame detecting unit 1001, when detecting that the received receive frame 0702 is the packet length control frame requesting an extended packet length, activates a packet length request-to-extend signal 1003.

An adding/subtracting portion 1004 of the packet length controlling unit 0120, using a count value of a packet length register 0124 as an initial value thereof, counts a count value set in a packet length control signal 0122. More specifically, the adding/subtracting portion 1004, when the packet-length request-to-reduce signal 1002 is activated, reduces the count value of the packet length control signal 0122 by "1", and increases the count value of the packet length control signal 0122 by "1" when the packet-length request-to-extend signal 1003 is activated.

Because any component other than the mentioned is the same as those shown in FIG. 1 of the Embodiment 1, the same reference numerals are attached thereto, thereby leaving them undescribed in this embodiment.

Figure 11:
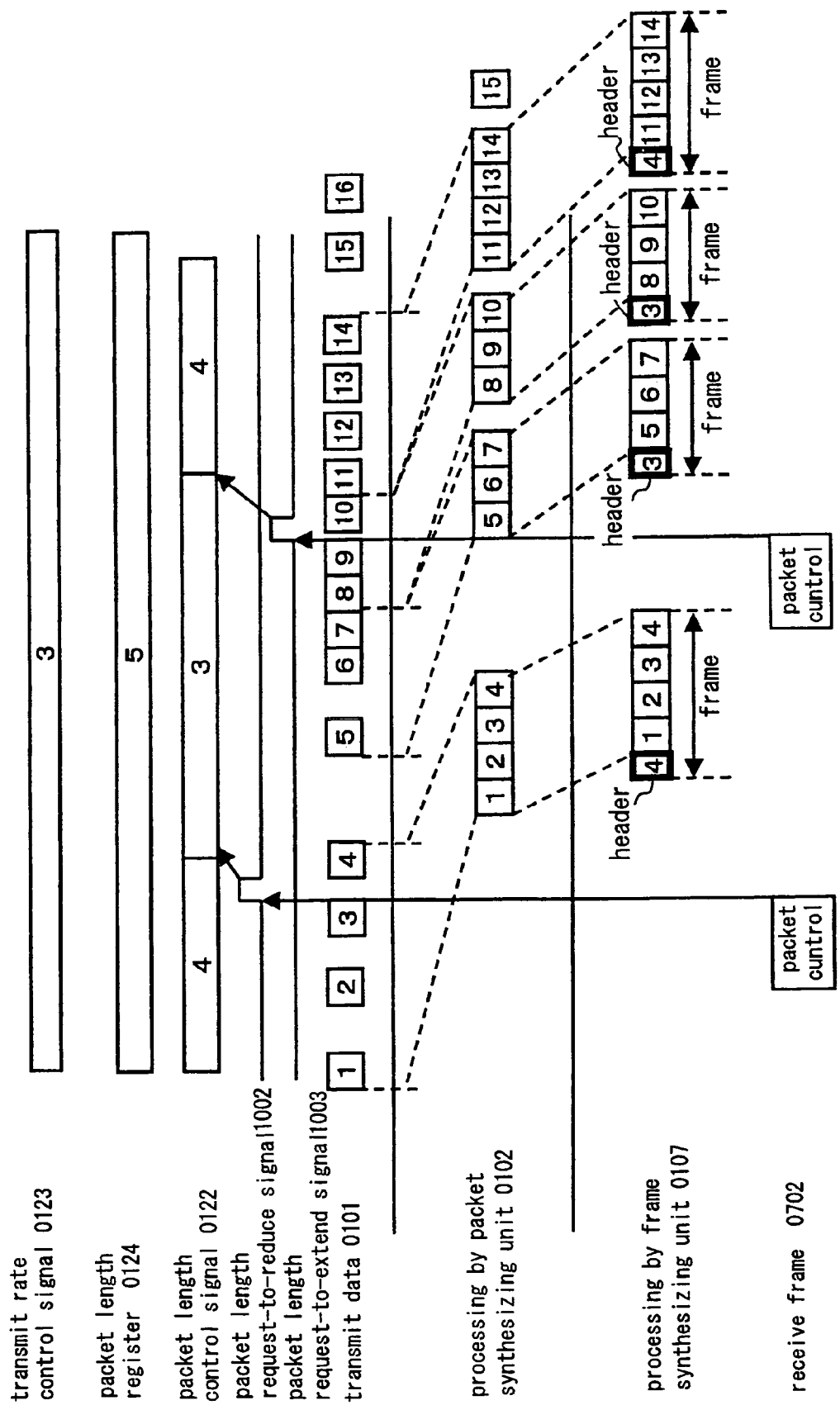
FIG. 11 is a timing chart illustrating the operation of the wireless LAN apparatus according to the Embodiment 6 of the present invention.

The wireless LAN apparatus according to this embodiment configured in the foregoing manner is described in terms of the operation thereof referring to a timing chart of FIG. 11.

A packet length "5" is set in the packet length register 0124 as the initial value. "4" is set for the packet-length information instructed by the packet length control signal 0122.

Transmit data 0101 is now input. When up to a third data from the transmit data 0101 are input, the receiving-side wireless LAN apparatus sends out the packet length control frame including a request to reduce the packet-length. The packet length control frame is received by the wireless receive unit 0701 of the transmitting-side wireless LAN apparatus. A packet synthesizing unit 0102 packetizes data 1, 2, 3 and 4 according to the packet length control signal 0122 to thereby create and output a transmit packet data 0106. A frame synthesizing unit 0107 appends the packet-length information "4" to a header of the transmit packet data 0106 to thereby create and output a transmit frame 0108. The transmit frame 0108 is wirelessly transmitted to the receiving-side wireless LAN apparatus via the wireless transmit unit 0109 and an antenna 0110 of the transmitting-side wireless LAN apparatus.

A next transmit frame transmitted by the receiving-side wireless LAN apparatus, which received the transmit frame 0108, is received by the wireless receive unit 0701 of the transmitting-side wireless LAN apparatus. In this case, the wireless receive unit 0701 outputs the receive frame 0702 to the packet length control frame detecting unit 1001.

The packet length control frame detecting unit 1001, when judging that the receive frame 0702 to be input requests the packet length to be reduced, activates the packet-length request-to-reduce signal 1002. The adding/subtracting portion 1004, because the packet-length request-to-reduce signal 1002 is activated, changes the current packet length set in the packet length control signal 0122 from "4" to "3". The packet synthesizing unit 0102, according to the packet length set in the packet length control signal 0122, packetizes data 5, 6 and 7 and data 8, 9 and 10 to thereby create and output the transmit packet data 0106.

When a ninth data from the transmit data 0101 is input and the packet length control frame requesting the packet length to be extended is transmitted from the receiving-side wireless LAN apparatus, the packet length control frame is received by the wireless receive unit 0701 of the transmitting-side wireless LAN apparatus. The wireless receive unit 0701 outputs the receive frame 0702. The packet length control frame detecting unit 1001, when judging that the receive frame 0702 requests the packet length to be extended, activates the packet length request-to-extend signal 1003. The adding/subtracting portion 1004, because the packet length request-to-extend signal 1003 is activated, changes the current packet length control signal 0122 from "3" to "4". The packet synthesizing unit 0102 packetizes data 11, 12, 13 and 14 according to the packet length control signal 0122 to thereby create and output the transmit packet data 0106.

As described, according to this embodiment, the transmit packet length in the transmitting-side wireless LAN apparatus is adjusted based on the request from the receiving-side wireless LAN apparatus which received the transmit frame. This enables the packet length in the transmitting-side wireless LAN apparatus to comply with a buffer size of the receiving-side another wireless LAN apparatus. Accordingly, the buffer size of the receiving-side another wireless LAN apparatus can be advantageously reduced.

Embodiment 7

Figure 12:
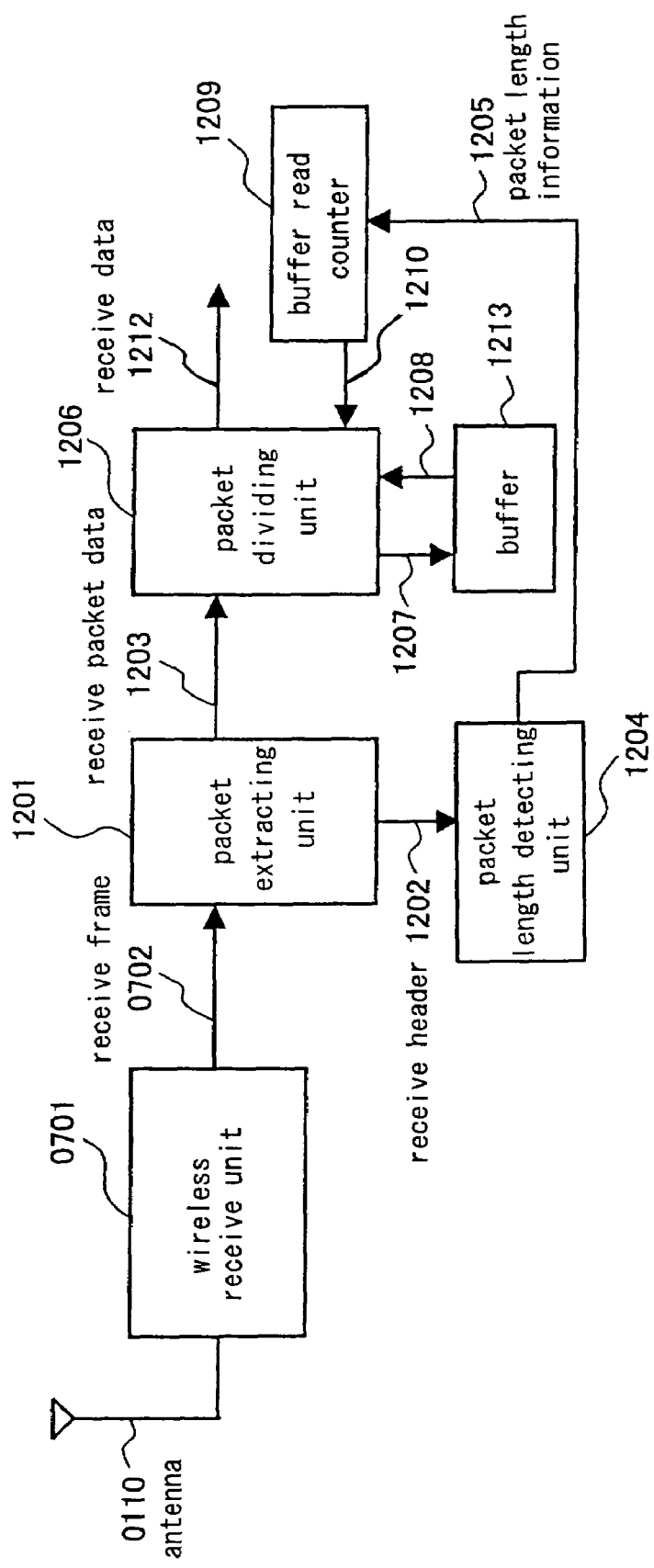
FIG. 12 is a block diagram illustrating the configuration of a wireless LAN apparatus according to an Embodiment 7 of the present invention.

FIG. 12 is a block diagram illustrating the receiving-side configuration of a wireless LAN apparatus according to an Embodiment 7 of the present invention. The wireless LAN apparatus according to this embodiment has a transmitting-side configuration identical to that of the Embodiment 1 of the present invention. The entire configuration of the wireless LAN apparatus according to this embodiment is comprised of the combination of the receiving-side configuration of the apparatus in FIG. 12 and the transmitting-side configuration of the apparatus in FIG. 1. Further, a transmitting-side configuration of a wireless LAN apparatus of the opposite party is the same as that of the wireless LAN apparatus of the Embodiment 1.

Referring to FIG. 12, numerals 0701 and 0702 respectively denote a wireless receive unit and receive frame, the same as those of the Embodiment 4. A reference numeral 1201 denotes a packet extracting unit for separating packet and header portions from the receive frame 0702. The packet extracting unit 1201 outputs a receive header 1202 and a receive packet data 1203. A reference numeral 1204 denotes a packet length detecting unit for detecting the number of packetized data in the receive header 1202. The packet length detecting unit 1204 outputs a packet-length information 1205 to a buffer read counter 1209. A reference numeral 1206 denotes a packet dividing unit. The packet dividing unit 1206 sets the receive packet data 1203 in a receive buffer write signal 1207 and writes the receive packet data 1203 in a buffer 1213. The packet dividing unit 1206 also reads the receive packet data 1203 written in a receive buffer read signal 1208 from the buffer 1213 according to a buffer read position 1210 output by the buffer read counter 1209. The packet dividing unit 1206 then writes the read receive packet data 1203 in a receive data 1212 and outputs the receive data 1212.

A wireless transmit unit 0109, as the transmitting-side configuration of the apparatus, synthesizes one or a plurality of transmit data in a transmit packet data. The wireless transmit unit 0109 then appends a packet-length information indicating the number of the transmit data synthesized in the transmit packet data to a header information of the synthesized transmit packet data and wirelessly transmits the information-appended transmit packet data as a transmit frame 0108.

Figure 13:
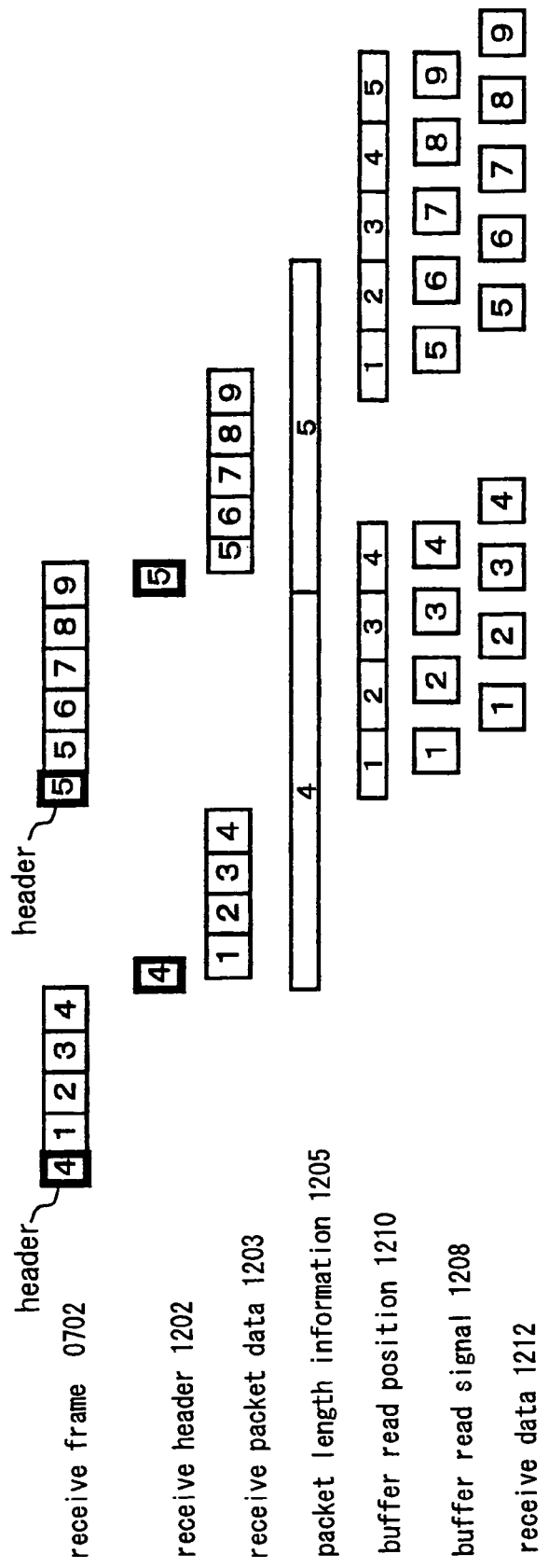
FIG. 13 is a timing chart illustrating the operation of the wireless LAN apparatus according to the Embodiment 7 of the present invention.

Next, the wireless LAN apparatus according to this embodiment configured in the foregoing manner is described in terms of the operation thereof referring to a timing chart of FIG. 13.

The wireless receive unit 0701 receives the transmit frame 0108 transmitted wirelessly by the transmitting-side wireless LAN apparatus. As a result, the receive frame 0702 is output by the wireless receive unit 0701. In this case, the packet-length information "4" is set in the header information of the receive frame 0702 created from the transmit frame 0108, and four data, 1, 2, 3 and 4 are packetized.

The packet extracting unit 1201 separates the receive data 0702 into the header information (packet-length information "4") and the packetized data 1, 2, 3 and 4. The packet extracting unit 1201 then outputs the receive header 1202 having the packet-length information "4" set therein and the receive packet data 1203 having the data (1, 2, 3 and 4) packetized therein. The packet length detecting unit 1204, because the packet-length information "4" is set in the receive header 1202, sets the packet length "4" in the packet-length information 1205 and outputs the packet-length information 1205. The buffer read counter 1209 counts up the buffer read position 1210 from "1", increasing by one, to "4" according to the packet-length information set in the packet-length information 1205. The packet dividing unit 1206 reads the data from the buffer 1213 according to the buffer read position 1210 and writes the read data in the receive data 1212 to thereby output the data-written receive data 1212.

As described, according to this embodiment, the receive packet data is divided based on the packet-length information detected in the header information of the receive frame 0702 to thereby enable data to be retrieved even from varying-length receive data with a header (packet-length information) separated therefrom. As a result, a precise handling can be implemented when data is transmitted in an adaptively-set variable packet length depending on the transmit-channel status, thereby enabling a transmission efficiency to be improved.

Embodiment 8

Figure 14:
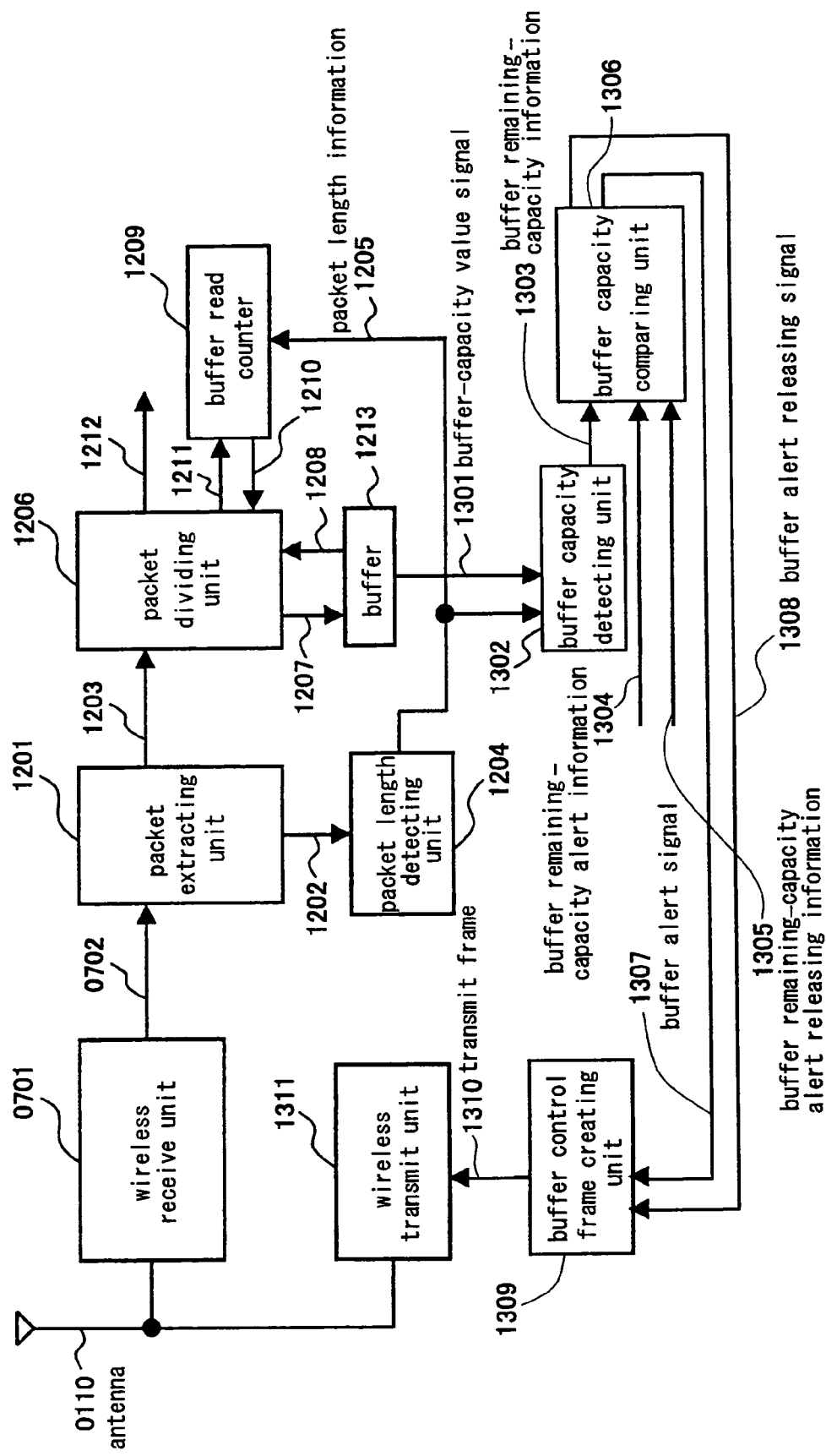
FIG. 14 is a block diagram illustrating the configuration of a wireless LAN apparatus according to an Embodiment 8 of the present invention.

FIG. 14 is a block diagram illustrating the configuration of a wireless LAN apparatus according to an Embodiment 8 of the present invention. In this embodiment, the wireless LAN apparatus of the Embodiment 7 further includes, as the receiving-side configuration of the apparatus, a buffer capacity detecting unit 1302,
the buffer capacity detecting unit 1302 calculating a remaining buffer capacity,
a buffer capacity comparing unit 1306,
the buffer capacity comparing unit 1306 monitoring the remaining buffer capacity,
a buffer control frame creating unit 1309,
the buffer control frame creating unit 1309 outputting a buffer limit frame and a buffer limit releasing frame, and
a wireless transmit unit 1311.

Moreover, as the transmitting-side configuration of the apparatus, a packet length controlling unit 0120 serves to control a packet length of transmit data based on the buffer limit frame or buffer limit releasing frame transmitted from another wireless LAN apparatus configured likewise.

To the buffer capacity detecting unit 1302 are input a buffer-capacity value signal 1301 indicating a buffer remaining capacity value from a buffer 1213 and further a packet-length information 1205 from a packet length detecting unit 1204. The buffer capacity detecting unit 1302 subtracts a value of the packet length detecting unit 1204 from a value of the buffer-capacity value signal 1301 to thereby calculate the remaining capacity of the buffer 1213. The buffer capacity detecting unit 1302 then outputs a calculated buffer remaining-capacity information 1303 to the buffer capacity comparing unit 1306.

To the buffer capacity comparing unit 1306 are input the buffer remaining-capacity information 1303 from the buffer capacity detecting unit 1302, a buffer remaining-capacity alert information 1304 indicating that the remaining capacity of the buffer is too small, and a buffer remaining-capacity alert releasing information 1305 indicating that there is a sufficient buffer remaining capacity. The buffer capacity comparing unit 1306 activates a buffer alert signal 1307 when the buffer remaining-capacity information 1303 equals to the buffer remaining-capacity alert information 1304. The buffer capacity comparing unit 1306, in contrast, activates a buffer alert releasing signal 1308 when the buffer remaining-capacity information 1303 equals to the buffer remaining-capacity alert releasing information 1305.

The buffer control frame creating unit 1309 outputs the buffer limit frame to a transmit frame 1310 when the buffer alert signal 1307 is activated, and outputs the buffer limit releasing frame to the transmit frame 1310 when the buffer alert releasing signal 1308 is activated.

The wireless transmit unit 1311 converts the transmit frame 1310 from the buffer control frame creating unit 1309 into radio waves and wirelessly transmits the radio waves via an antenna 0110.

Because any component other than the mentioned is the same as those shown in FIG. 12 of the Embodiment 7, the same reference numerals are attached thereto, thereby leaving them undescribed in this embodiment.

Figure 15:
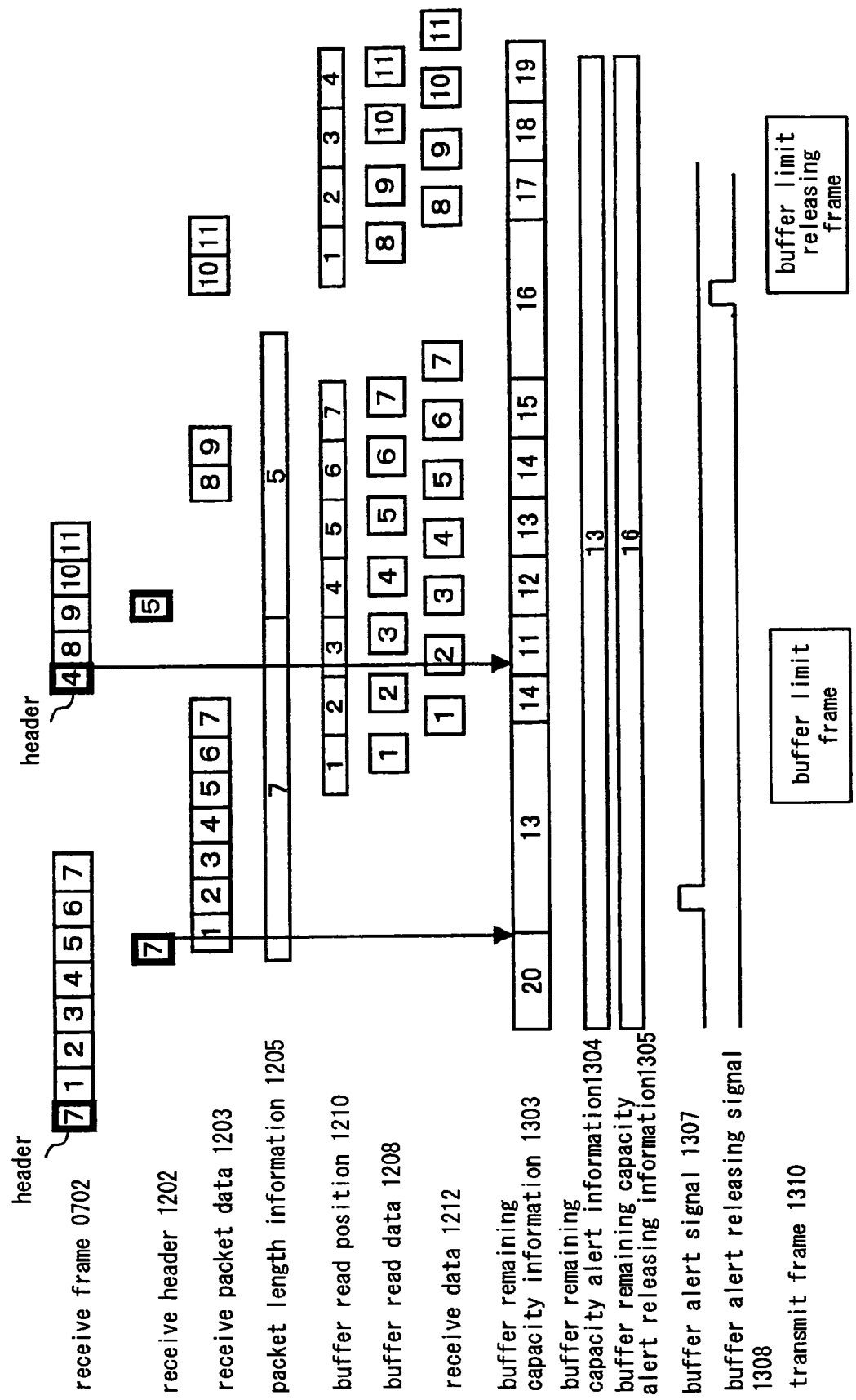
FIG. 15 is a timing chart illustrating the operation of the wireless LAN apparatus according to the Embodiment 8 of the present invention.

Next, the wireless LAN apparatus according to this embodiment configured in the foregoing manner is described in terms of the operation thereof referring to a timing chart of FIG. 15.

"13" is set for the buffer remaining-capacity alert information 1304, "16" is set for the buffer remaining-capacity alert releasing information 1305, and a current buffer-capacity value signal 1301 indicates "20".

A new frame transmitted by the transmitting-side wireless LAN apparatus is now received, and a frame data is output to a receive frame 0702. A packet-length information "7" is set in a receive header 1202, and "7" in the packet-length information 1205 is input to a buffer read counter 1209 and the buffer capacity detecting unit 1302.

In this case, the buffer capacity detecting unit 1302 subtracts the packet-length information "7" in the packet-length information 1205 from the set value "20" in the buffer-capacity value signal 1301 to thereby calculate a difference "13". The buffer capacity detecting unit 1302 then sets the difference "13" in the buffer remaining-capacity information 1303 and outputs the information 1303.

The buffer capacity comparing unit 1306 compares the buffer remaining-capacity information 1303 to the buffer remaining-capacity alert information 1304 and buffer remaining-capacity alert releasing information 1305. Then, it is known that a value of the buffer remaining-capacity information 1303 is equal to a value of the buffer remaining-capacity alert information 1304. Therefore, the buffer capacity comparing unit 1306 activates the buffer alert signal 1307. The buffer control frame creating unit 1309, in response to the activated buffer alert signal 1307, transmits the buffer limit frame.

Subsequently, a packet dividing unit 1206 reads the content of the buffer 1213 in the same manner as in the Embodiment 7, in consequence of which "16" is set for the buffer remaining-capacity information 1303. Then, the buffer capacity comparing unit 1306 detects that the values of the buffer remaining-capacity information 1303 and buffer remaining-capacity alert releasing information 1305 equal to each other and accordingly activates the buffer alert releasing signal 1308. The buffer control frame creating unit 1309, in response to the activated buffer alert releasing signal 1308, transmits the buffer limit releasing frame.

A packet length controlling unit 0120 of the transmitting-side another wireless LAN apparatus controls the packet length of the transmit data based on the buffer limit frame or buffer limit releasing frame transmitted by the receiving-side wireless LAN apparatus of the present invention.

As described, according to this embodiment, the buffer limit frame or buffer limit releasing frame is transmitted in response to the remaining capacity of the buffer, thus enabling the transmit packet length to comply with the remaining capacity of the receiving-side buffer. This achieves the reduction of the receive buffer in size.

Embodiment 9

Figure 16:
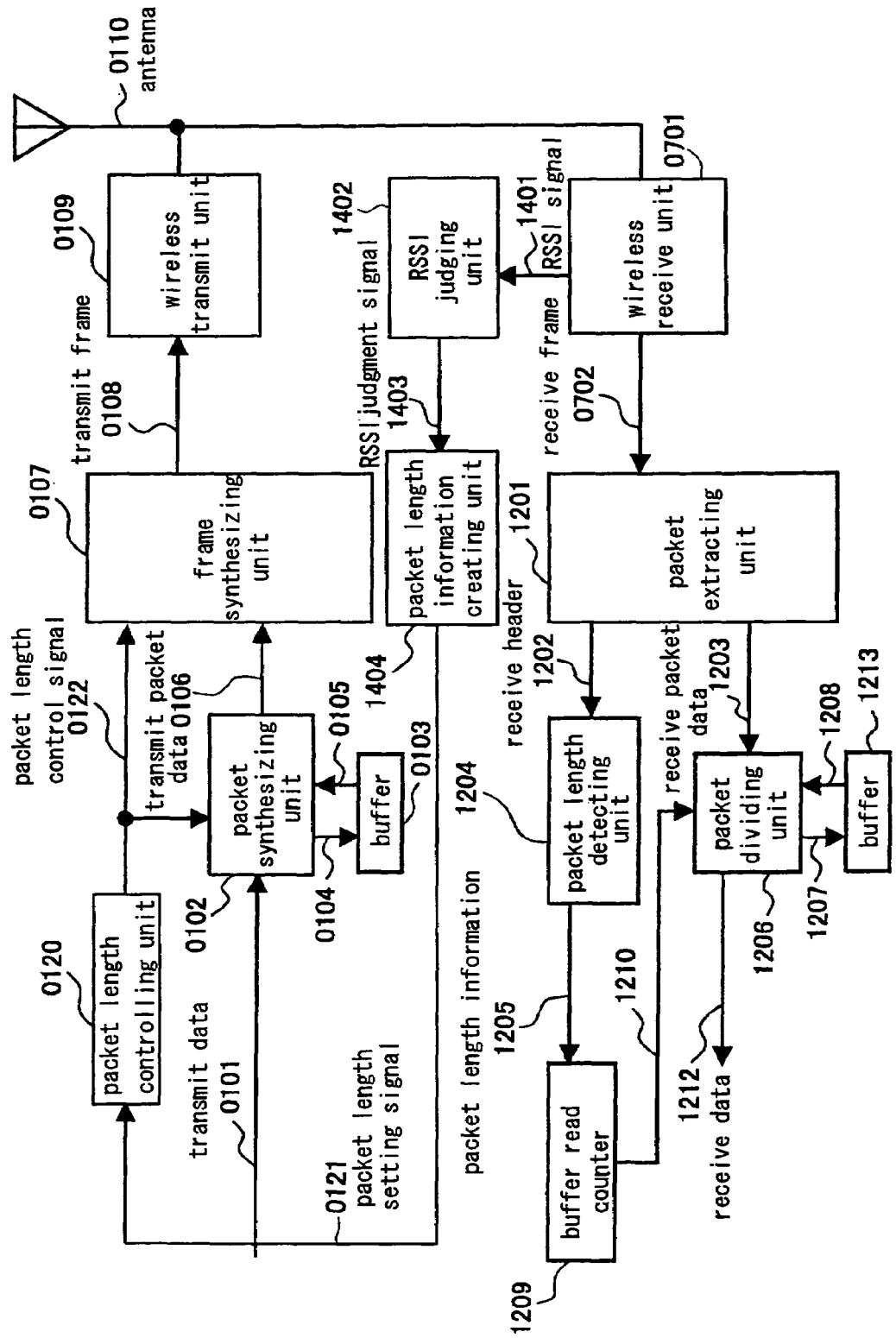
FIG. 16 is a block diagram illustrating the configuration of a wireless LAN apparatus according to an Embodiment 9 of the present invention.

FIG. 16 is a block diagram illustrating the configuration of a wireless LAN apparatus according to an Embodiment 9 of the present invention.

Transmit data 0101 is input to a packet synthesizing unit 0102. The packet synthesizing unit 0102 transmits the transmit data 0101 together with a buffer write signal 0104 to a buffer 0103 according to a packet length control signal 0122. The data in the buffer 0103 is read together with a buffer read signal 0105 by the packet synthesizing unit 0102 according to the packet length control signal 0122. A frame synthesizing unit 0107 appends the packet length control signal 0122 to a read transmit packet data 0106 to thereby create a transmit frame 0108 and outputs the transmit frame 0108. The output transmit frame 0108 is sent to a wireless transmit unit 0109, wherefrom the transmit frame 0108 is transmitted as a wireless transmit signal via an antenna 0110.

A packet length controlling unit 0120 outputs the packet length control signal 0122 indicating the packet-length information (the number of packetized transmit data) to the packet synthesizing unit 0102 and frame synthesizing unit 0107.

A wireless receive unit 0701, as the receiving-side configuration of the apparatus, receives a wireless receive signal via radio waves and outputs a receive frame 0702 and a RSSI signal (Receiver Signal Strength Indicator) 1401, which is information on a transmit-channel distortion. A reference numeral 1201 denotes a packet extracting unit for separating a packet portion and a header portion from the receive frame 0702. The packet extracting unit 1201, as the receiving-side configuration of the apparatus, outputs a receive header 1202 and receive packet data 1203. A reference numeral 1204 denotes a packet length detecting unit for detecting the number of packetized data in the receive header 1202. The packet length detecting unit 1204, as the receiving-side configuration of the apparatus, outputs a packet-length information 1205 to a buffer read counter 1209. A reference numeral 1206 denotes a packet dividing unit. The packet dividing unit 1206, as the receiving-side configuration of the apparatus, outputs the receive packet data 1203 to a receive buffer write signal 1207 to thereby write the receive packet data 1203 in a buffer 1213. The packet dividing unit 1206 also reads the receive packet data 1203 written in a receive buffer read signal 1208 from the buffer 1213 according to a buffer read position 1210 output by the buffer read counter 1209. The packet dividing unit 1206 then writes the read receive packet data 1203 in a receive data 1212 and outputs the receive data 1212.

The RSSI signal 1401 is input to a RSSI judging unit 1402, which is the transmitting-side configuration of the apparatus. The RSSI judging unit 1402 outputs a RSSI judgment signal 1403 based on the RSSI signal 1401. The RSSI judgment signal 1403 is input to a packet-length information creating unit 1404. The packet-length information creating unit 1404 creates a packet length setting signal 0121 based on the RSSI judgment signal 1403 and outputs the packet length setting signal 0121 to the packet length controlling unit 0120. The packet length controlling unit

0120 controls a packet length of the transmit data based on the packet length setting signal 0121.

The wireless LAN apparatus according to this embodiment configured in the foregoing manner is described in terms of the operation thereof.

Except for the wireless receive unit 0701, RSSI judging unit 1402, and packet-length information creating unit 1404, the operation of the apparatus in data transmission is the same as described in the Embodiment 1, and the operation in data receipt is the same as described in the Embodiment 8. Therefore, the operation of the apparatus according to this embodiment is not described here.

Figure 17:
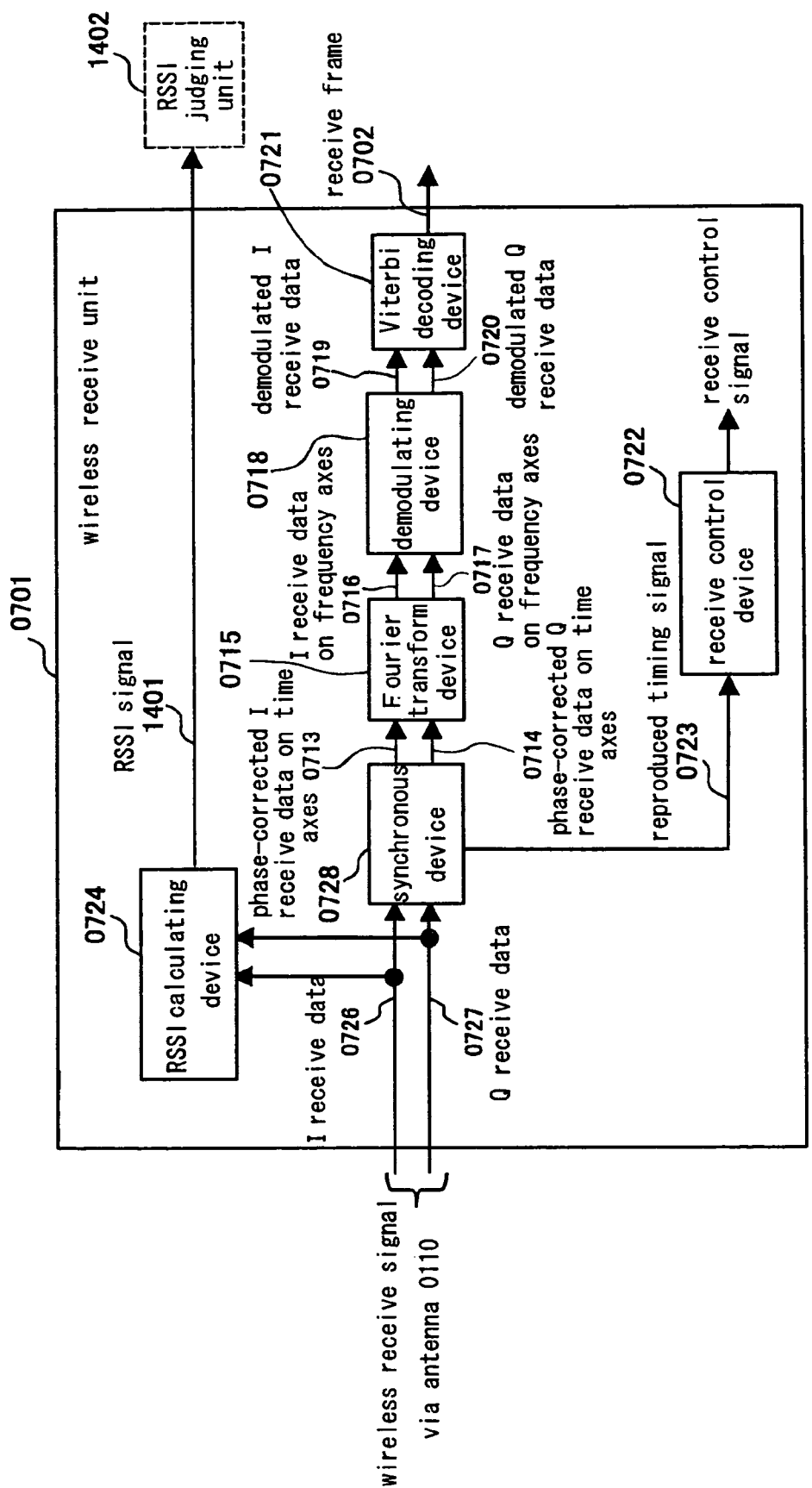
FIG. 17 is a block diagram illustrating the configuration of a wireless receive unit of the wireless LAN apparatus according to the Embodiment 9 of the present invention.

FIG. 17 is a block diagram illustrating the specific configuration of the wireless receive unit 0701 of the wireless LAN apparatus. Referring to FIG. 17, wireless receive signals 0726 and 0727 on both axes (I/Q) via an antenna 0110 are input to a synchronous device 0728. The synchronous device 0728 reproduces a timing of transmission from the wireless receive signals 0726 and 0727, and based on the transmission timing, creates and outputs a reproduced timing signal 0723 and phase-corrected receive data 0713 and 0714 on time axes (I/Q).

The receive data 0713 and 0714 on the time axes (I/Q) are input to a Fourier transform device 0715. The Fourier transform device 0715 implements the Fourier transform to the receive data 0713 and 0714 to thereby create and output receive data 0716 and 0717 on frequency axes (I/Q).

The receive data 0716 and 0717 on the frequency axes (I/Q) are input to a demodulating device 0718. The demodulating device 0718 judges an amplitude and phase of each carrier wave on a complex plane from the receive data 0716 and 0717. The demodulating device 0718, based on the judgment result, converts the receive data 0716 and 0717 into complex data to thereby create and output demodulated data 0719 and 0720 on the both axes (I/Q) in a constellation diagram.

The demodulated data 0719 and 0729 on the both axes (I/Q) are input to a Viterbi decoding device 0721. The Veterbi decoding device 0721 corrects errors in the demodulating data 0719 and 0720 to thereby create and output the receive frame 0702.

The reproduced timing signal 0723 is input to a receive control device 0722 from the synchronous device 0728. The receive control device 0722 creates a receive control signal based on the reproduced timing signal 0723 and outputs the receive control signal to the respective devices.

The wireless receive signals 0726 and 0727 on the both axes (I/Q) via the antenna 0110 are input to a RSSI calculating device 0724. The RSSI calculating device 0724 calculates RSSI values indicating electric power based on the wireless receive signals 0726 and 0727 to thereby output the RSSI signal 1401.

The operation of the wireless receive unit 0701 is as follows. The RSSI calculating device 0724 calculates the electric power of the wireless receive signal received from another wireless LAN apparatus of the opposite party configured likewise, whereby the RSSI signal 1401 is created. The RSSI judging unit 1402 judges, from the RSSI signal 1401, the status of transmission channel built between the wireless LAN apparatus of the present invention and the another wireless LAN apparatus and outputs the judgment result as the RSSI judgment signal 1403. When the RSSI signal is, for example, larger than a threshold value, the distance between the mutually-communicating wireless LAN apparatuses is small, thereby judging the status of transmission channel is good. When the RSSI signal is, on the other hand, smaller than the threshold value, the distance between the mutually-communicating wireless LAN apparatuses is large, thereby judging the status of transmission channel is bad. The RSSI judging unit 1402 writes the judgment result in the RSSI judgment signal 1403 and outputs the RSSI judgment signal 1403. The judgment can be made step wise at different stages.

The packet-length information creating unit 1404, when it is judged that the status of transmission channel is good based on the RSSI judgment signal 1403, writes an information instructing a current packet length to be extended in the packet length setting signal 0121 and outputs the packet length setting signal 0121. On the contrary, the packet-length information creating unit 1404, when it is judged that the status of transmission channel is bad based on the RSSI judgment signal 1403, writes an information instructing the current packet length to be reduced in the packet length setting signal 0121 and outputs the packet length setting signal 0121. The packet length controlling unit 0120 controls the transmit packet length based on the packet length setting signal 0121. The control can be implemented step wise at different stages.

As described, according to this embodiment, the status of transmission channel is judged based on the volume of the electric power of the wireless receive signal so that an optimum packet length is set in response to the transmit-channel status, thereby enabling the transmission efficiency to be significantly improved.

Embodiment 10

Figure 18:
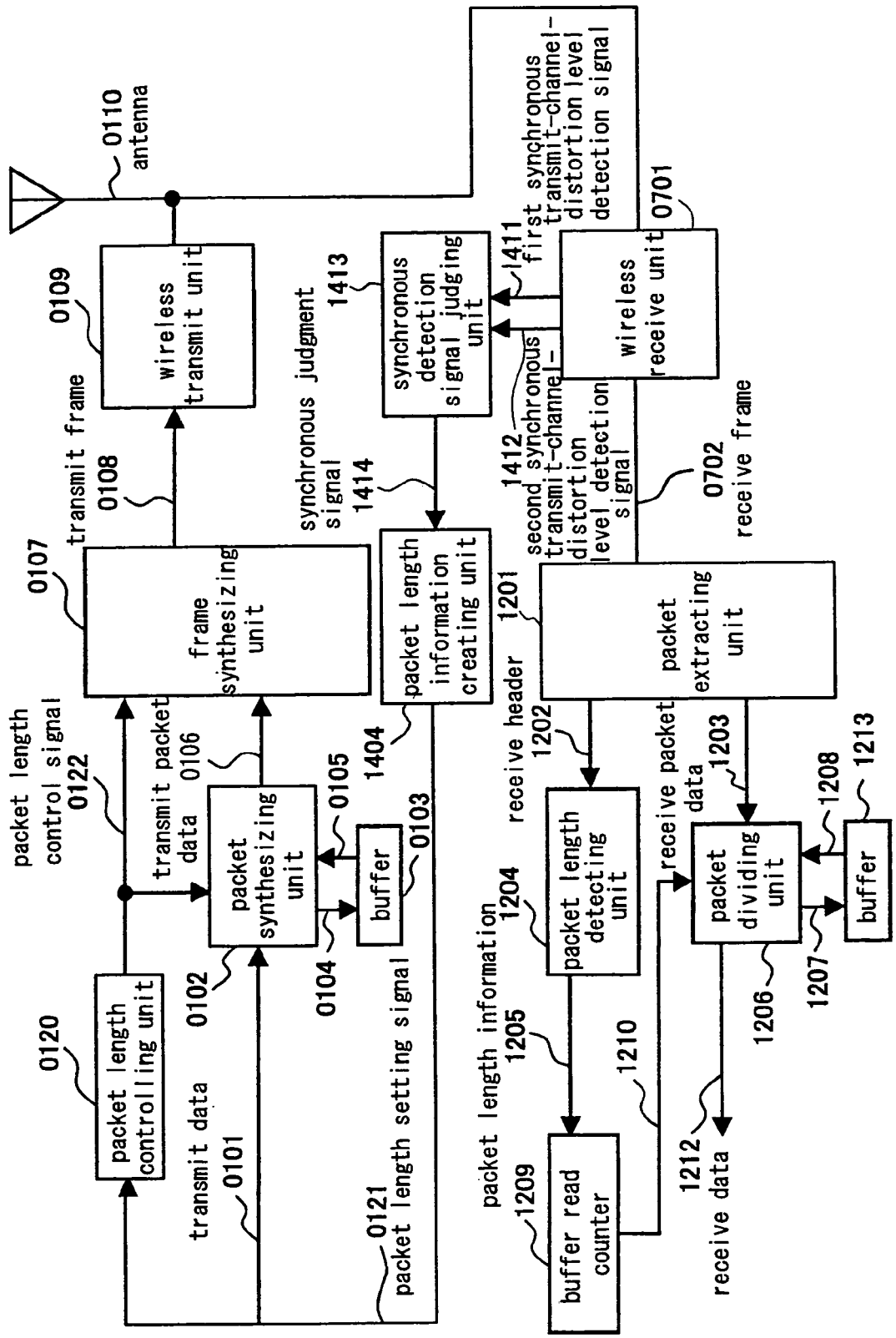
FIG. 18 is a block diagram illustrating the configuration of a wireless LAN apparatus according to an Embodiment 10 of the present invention.
Figure 19:
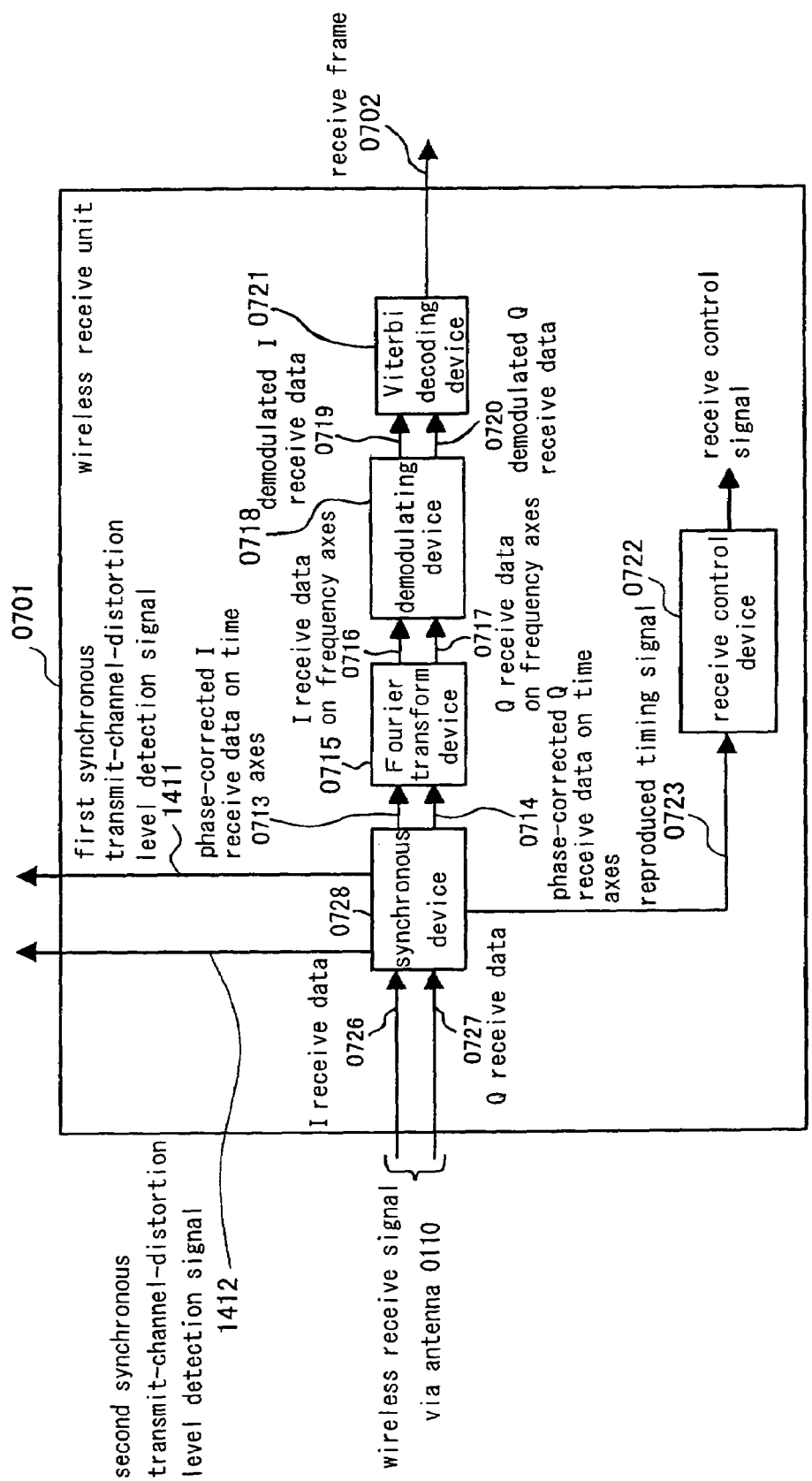
FIG. 19 is a block diagram illustrating the configuration of a wireless receive unit of the wireless LAN apparatus according to the Embodiment 10 of the present invention.

FIG. 18 is a block diagram illustrating the configuration of a wireless LAN apparatus according to an Embodiment 10 of the present invention. FIG. 19 is a block diagram illustrating the specific configuration of a wireless receive unit of the wireless LAN apparatus. Any component other than a wireless receive unit 0701, synchronous detection signal judging unit 1413 and synchronous device 0728, is the same as described in the Embodiment 9, the same reference numerals are attached thereto, thereby leaving them undescribed in this embodiment Wireless receive signals 0726 and 0727 on both axes (I/Q) via an antenna 0110 are input to the synchronous device 0728. The synchronous device 0728 reproduces a timing of transmission from the wireless receive signals 0726 and 0727. The synchronous device 0728 then creates and outputs a reproduced timing signal 0723, phase-corrected receive data 0713 and 0714 on time axes (I/Q), and first and second synchronous transmit-channel-distortion level detection signals 1411 and 1412.

Figure 20:
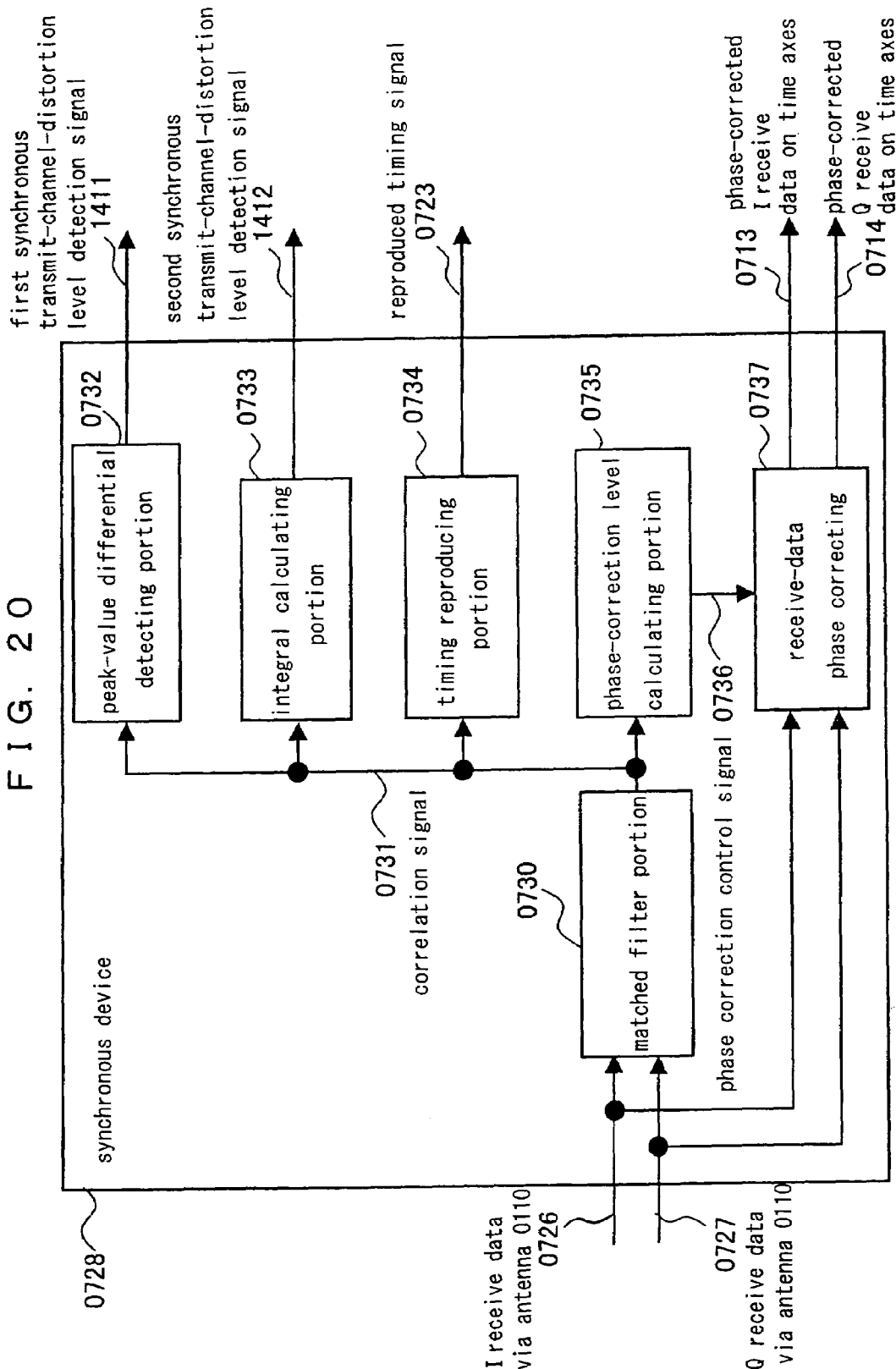
FIG. 20 is a block diagram illustrating the configuration of a synchronous device of the wireless LAN apparatus according to the Embodiment 10 of the present invention.
Figure 22:
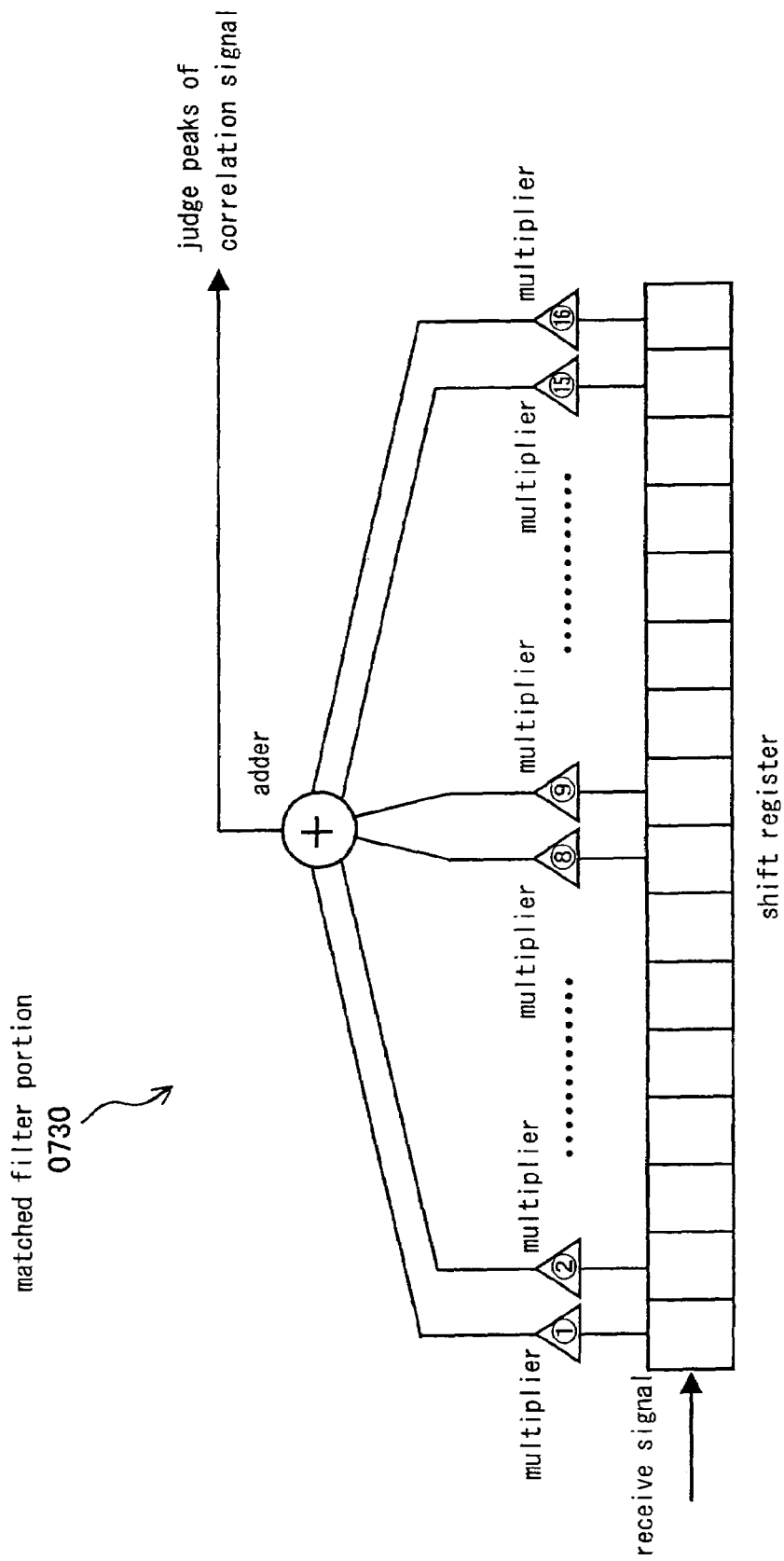
FIG. 22 is a circuit diagram illustrating the configuration of the matched filter portion of the wireless LAN apparatus according to the Embodiment 10 of the present invention.

FIG. 20 is a block diagram illustrating the specific configuration of the synchronous device 0728. Referring to FIG. 20, wireless receive signals 0726 and 0727 on the time axes (I/Q) are input to a matched filter portion 0730. The matched filter portion 0730 creates a correlation signal 0731 based on the wireless receive signals 0726 and 0727 and outputs the correlation signal 0731. The matched filter portion 0730 can be feasibly configured in the manner illustrated in a circuit diagram of FIG. 22. More specifically, the matched filter portion 0730 is comprised of a shift register and a plurality of multipliers and adders. Circled numbers shown in the multipliers respectively denote multiplier coefficients different to one another.

The correlation signal 0731 is input to a peak-value differential detecting portion 0732. The peak-value differential detecting portion 0732 creates the first synchronous transmit-channel-distortion level detection signal 1411 based on the correlation signal 0731 and outputs the signal 1411 to the synchronous detection signal judging unit 1413.

The correlation signal 0731 is input to an integral calculating portion 0733. The integral calculating portion 0733 creates the second synchronous transmit-channel-distortion level detection signal 1412 based on the correlation signal 0731 and outputs the signal 1412 to the synchronous detection signal judging unit 1413.

The correlation signal 0731 is input to a timing reproducing portion 0734. The timing reproducing portion 0734 creates the reproduced timing signal 0723 based on the correlation signal 0731 and outputs the signal 0723 to the receive control device 0722.

The correlation signal 0731 is input to a phase-correction level calculating portion 0735. The phase-correction level calculating portion 0735 creates a phase correction control signal 0736 based on the correlation signal 0731 and outputs the phase correction control signal 0736 to a receive-data phase correcting portion 0737.

The phase correction control signal 0736 and wireless receive signals 0726 and 0727 on the time axes (I/Q) are input to the receive-data phase correcting portion 0737. The receive-data phase correcting portion 0737 creates the phase-corrected receive data 0713 and 0714 on the time axes (I/Q) based on the phase correction control signal 0736 and wireless receive signals 0726 and 0727 and outputs the receive data 0713 and 0714 to a Fourier transform device 0715.

Because any component other than the mentioned is the same as those shown in FIGS. 16 and 17 of the Embodiment 9, the same reference numerals are attached thereto, thereby leaving them undescribed in this embodiment.

Next, the operation of the apparatus according to this embodiment configured in the foregoing manner is described.

The wireless LAN apparatus receives a wireless signal (transmit frame) transmitted by a transmitting-side wireless LAN apparatus configured likewise. The matched filter portion 0730 of the synchronous device 0728 detects synchronous reference symbols appended to the wireless receive signals 0726 and 0727 on the time axes (I/Q) and outputs the detected synchronous reference symbols as the correlation signal 0731 to the peak-value differential detecting portion 0732, integral calculating portion 0733, timing reproducing portion 0734 and phase-correction level calculating portion 0735. Correlation values in connection with the correlation signal 0731 output by the matched filter portion 0730 are presented in succession. As a result, there is certainly at least a point at which a correlation value is remarkably high indicating a peak level in only a period of pattern. The timing reproducing portion 0734 reproduces the timing of transmission based on the peak value.

The phase-correction level calculating portion 0735 calculates phase-error levels of the wireless receive signals 0726 and 0727 on the both axes (I/Q) based on the peak value of the correlation signal 0731 and outputs the calculated phase correction control signal 0736 to the receive-data phase correcting portion 0737. The receive-data phase correcting portion 0737 phase-corrects the wireless receive signals 0726 and 0727 on the both axes (I/Q) based on the phase correction control signal 0736 and outputs the phase-corrected receive data 0713 and 0714 on the time axes (I/Q) to the Fourier transform device 0715.

When an ideal synchronous reference symbol free of any transmit-channel distortion is received, a waveform showing a distinct peak therein, as shown in FIG. 21A, is obtained. When a synchronous reference symbol appended by the transmit-channel distortion is received, the waveform shows, other than the peak value, some distortion-caused mountain portions, as shown in FIG. 21B. As shown in A and B of FIG. 21, the smaller a difference between the peak value and the highest non-peak mountain portion in the waveform (margin for transmit-channel distortion) is, the larger the transmit-channel distortion is. The larger the difference is, the smaller the transmit-channel distortion is. The peak-value differential detecting portion 0732 detects the difference between the peak value and the highest non-peak mountain portion in the waveform (margin for transmit-channel distortion) to thereby create the first synchronous transmit-channel-distortion level detection signal 1411 and output the signal 1411 to the synchronous detection signal judging unit 1413.

The integral calculating portion 0733 integrates the correlation signal 0731. When the ideal distortion-free synchronous reference symbol of 16 samples is received, an integral width is proven to be equivalent to the 16 samples, as shown in FIG. 23A. When the synchronous reference symbol appended by the transmit-channel distortion is received, an integral width is proven to be equivalent to the 16 samples or more, as shown in FIG. 23B. As shown in FIGS. 23A and B, the larger the integral width is, the larger the transmit-channel distortion is. The smaller the integral width is, the smaller the transmit-channel distortion is.

Figure 24:
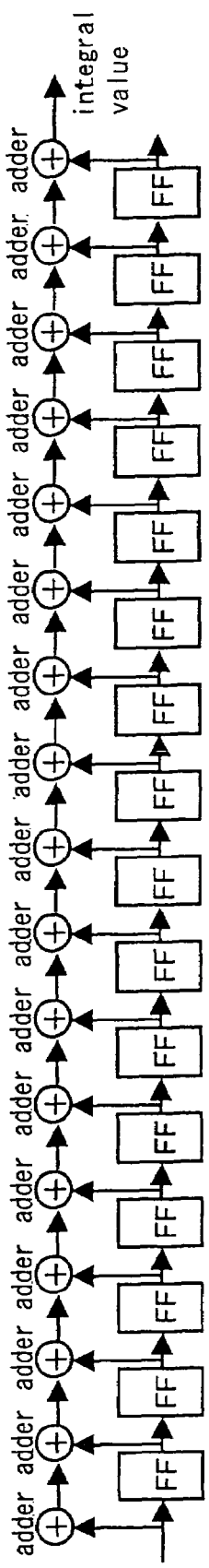
FIG. 24 is a circuit diagram illustrating the moving integral in the wireless LAN apparatus according to the Embodiment 10 of the present invention.

The integral calculating portion 0733 detects the integral width to thereby create the second synchronous transmit-channel-distortion level detection signal 1412 and output the signal 1412 to the synchronous detection signal judging unit 1413. The integral calculating portion 0733 is, for example, comprised of a plurality of registers (flip-flop) and a plurality of adders, as shown in FIG. 24.

The first and second synchronous transmit-channel-distortion level detection signals 1411 and 1412, which are output by the wireless receive unit 0701, are input to the synchronous detection signal judging unit 1413.

The synchronous detection signal judging unit 1413 judges the status of transmission channel from the first and second synchronous transmit-channel-distortion level detection signals 1411 and 1412, and outputs a synchronous judgment signal 1414 as the judgment result.

For example, when the first synchronous transmit-channel-distortion level detection signal 1411 is larger than a threshold value and the second synchronous transmit-channel-distortion level detection signal 1412 is smaller than the threshold value, the status of transmission channel between two mutually-communicating wireless LAN apparatuses is judged to be good. On the contrary, when the first synchronous transmit-channel-distortion level detection signal 1411 is smaller than a threshold value and the second synchronous transmit-channel-distortion level detection signal 1412 is larger than the threshold value, the status of transmission channel between two mutually-communicating wireless LAN apparatuses is judged to be bad. Further, under any circumstances other than the previously-described, the status of transmission channel is at an intermediate level between "good" and "bad". The synchronous detection signal judging unit 1413 writes the judgment result in the synchronous judgment signal 1414 and outputs the synchronous judgment signal 1414. The judgment can be made stepwise at different stages.

A packet-length information creating unit 1404, when it is judged the status of transmission channel is good based on the synchronous judgment signal 1414, writes an information instructing a current packet length to be extended in a packet length setting signal 1201 and outputs the packet length setting signal 1201. The packet-length information creating unit 1404, when it is judged that the status of transmission channel is bad based on the synchronous judgment signal 1414, writes an information instructing a current packet length to be reduced in the packet length setting signal 1201 and outputs the packet length setting signal 1201. A packet length controlling unit 0120 controls the transmit packet length based on the packet length setting signal 0121. The control can be implemented stepwise at different stages.

As described, in this embodiment, the status of transmission channel is judged according to the difference level between the peak value and non-peak mountain portion of the correlation signal in connection with the synchronous reference symbol of the wireless receive signal or the integral-width level of the correlation signal. The packet length is set based on the judgment for the status of transmission channel, thereby achieving a significant improvement in the transmission efficiency.

Embodiment 11

Figure 25:
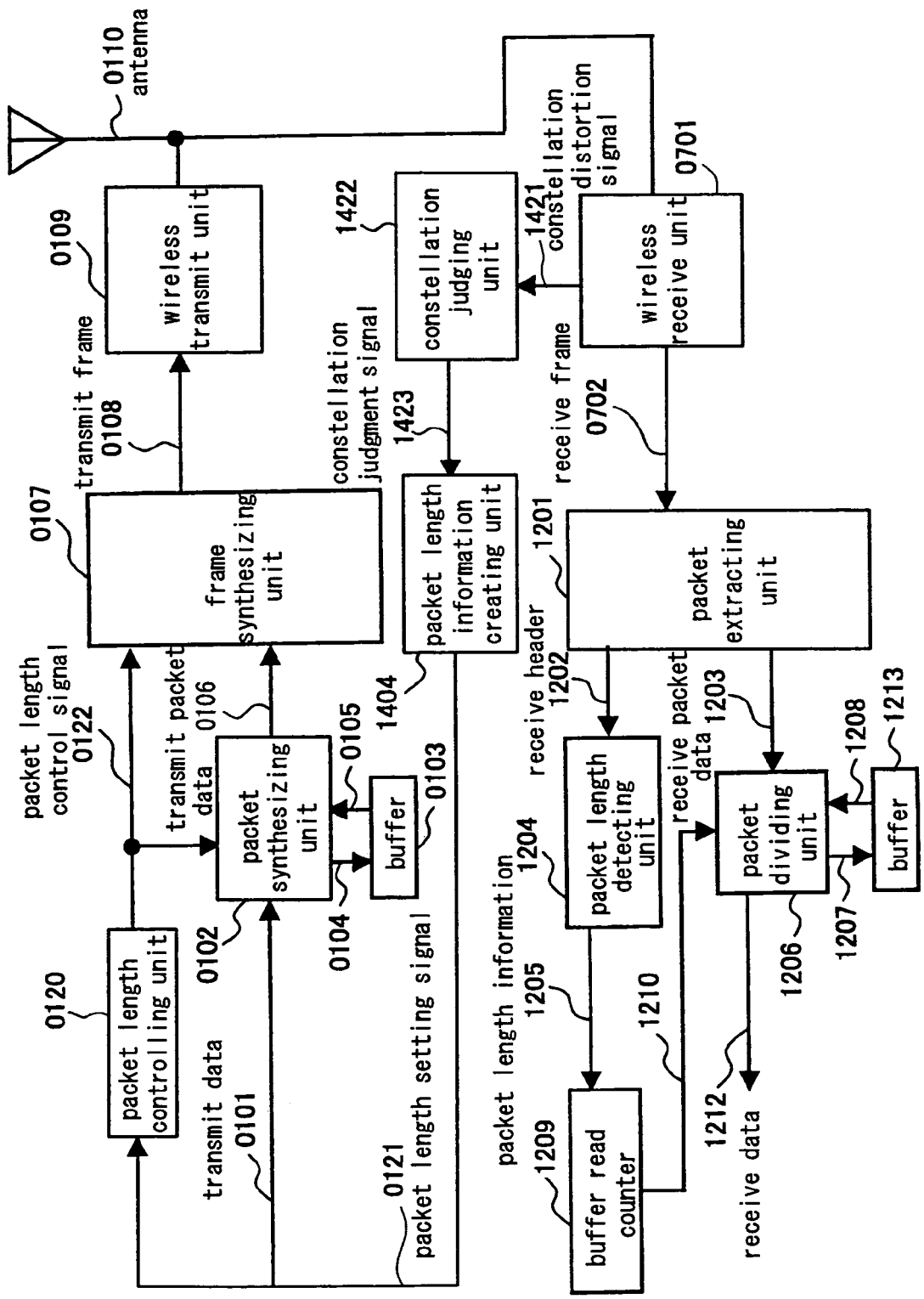
FIG. 25 is a block diagram illustrating the configuration of a wireless LAN apparatus according to an Embodiment 11 of the present invention.
Figure 26:
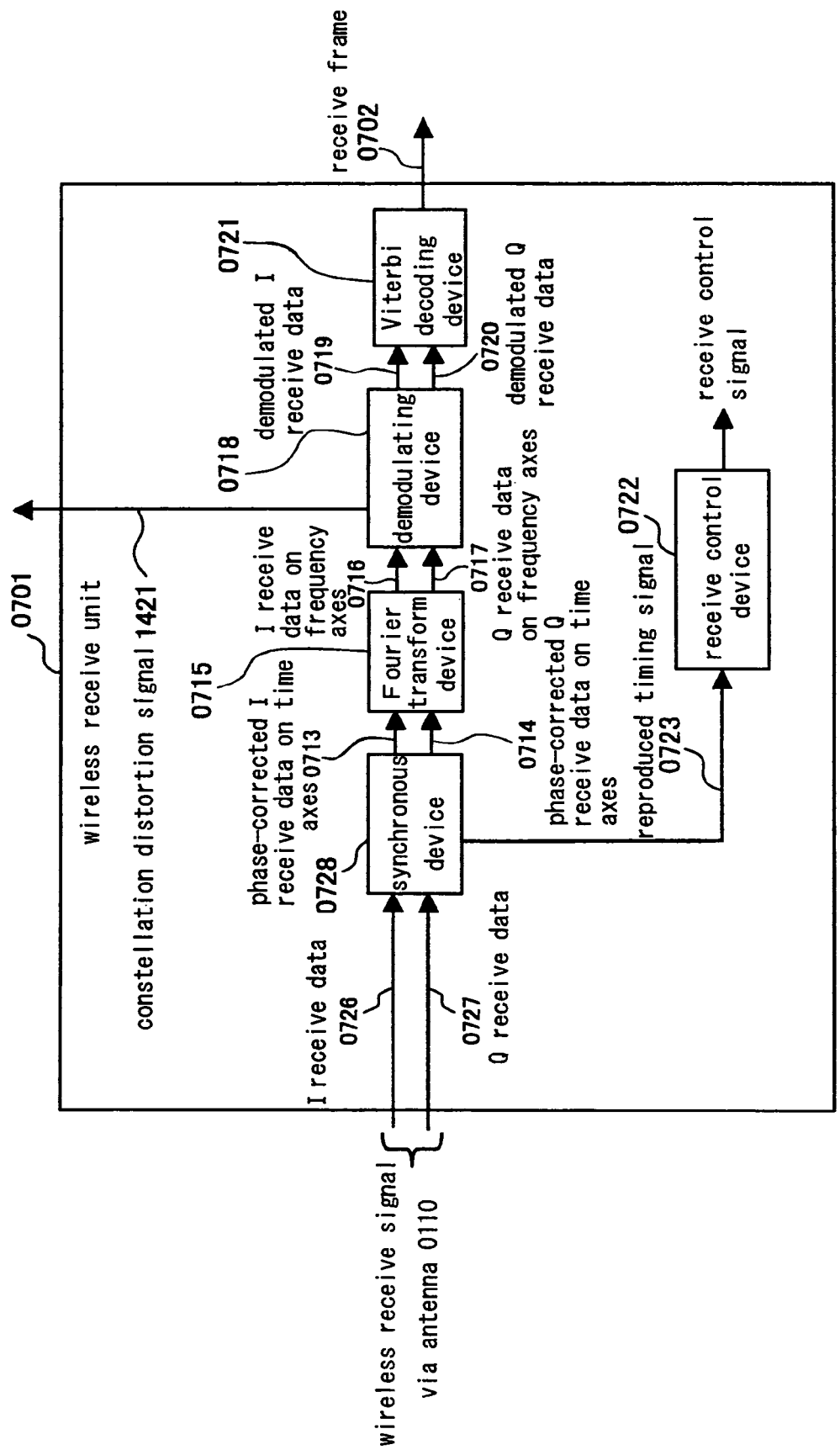
FIG. 26 is a block diagram illustrating a wireless receive unit of the wireless LAN apparatus according to the Embodiment 11 of the present invention.

FIG. 25 is a block diagram illustrating the configuration of a wireless LAN apparatus according to an Embodiment 11 of the present invention. FIG. 26 is a block diagram illustrating the specific configuration of a wireless receive unit of the wireless LAN apparatus. Any component other than a wireless receive unit 0701, constellation judging unit 1422, and demodulating device 0718, is the same as described in the Embodiment 9 and therefore not described in this embodiment.

Figure 27:
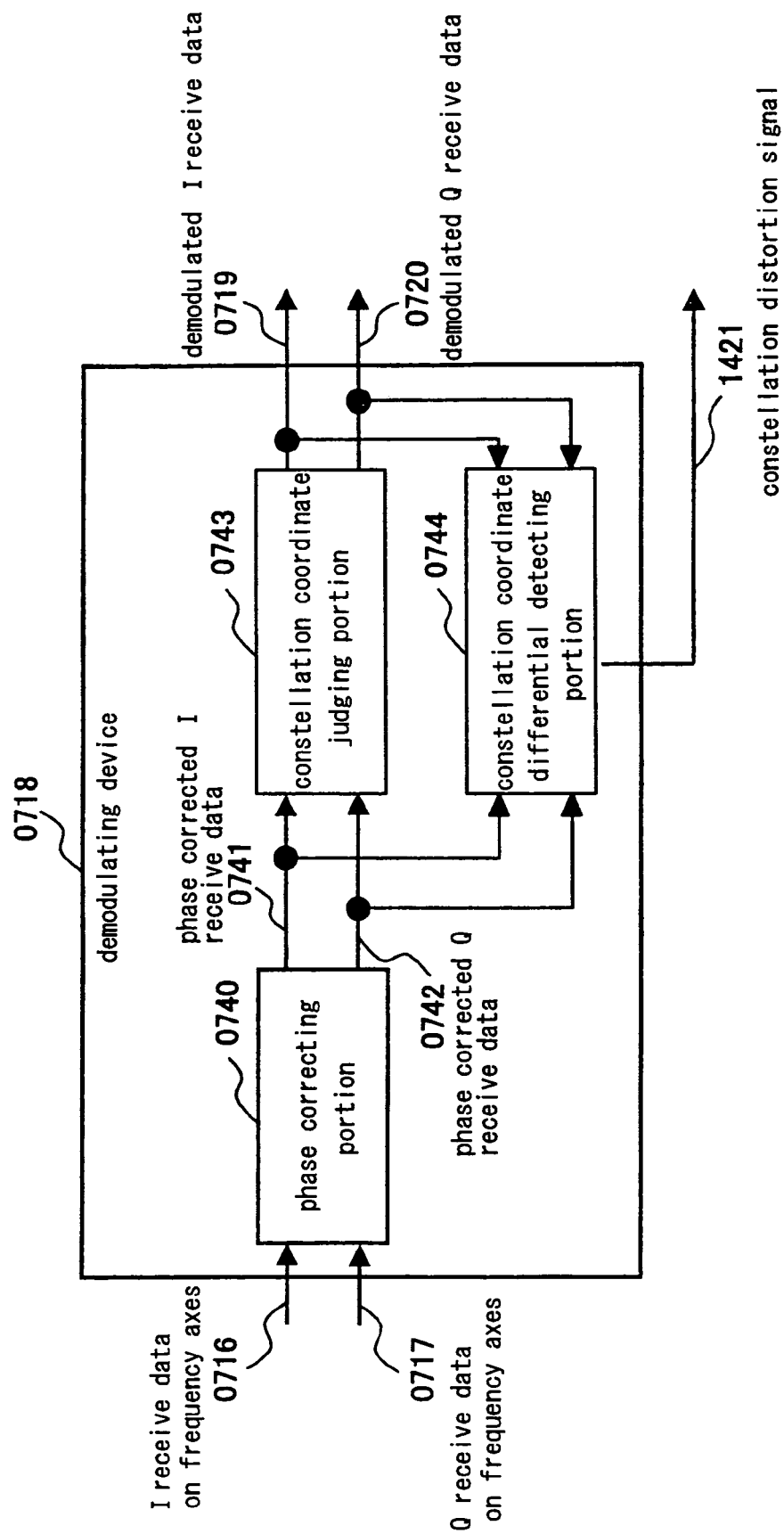
FIG. 27 is a block diagram illustrating the configuration of a demodulating device of the wireless LAN apparatus according to the Embodiment 11 of the present invention.

FIG. 27 is a block diagram illustrating the specific configuration of the demodulating device 0718 of the wireless LAN apparatus. Receive data 0716 and 0717 on frequency axes (I/Q) are input to the demodulating device 0718. The demodulating device 0718 judges an amplitude and phase of each carrier wave on a complex plane from the receive data 0716 and 0717, and based on the judgment result, converts the receive data 0716 and 0717 into complex data. The demodulating device 0718 thereby creates and outputs demodulated data 0719 and 0720 on both axes (I/Q) in a constellation diagram and a constellation distortion signal 1421.

Because any component other than the mentioned is the same as those shown in FIGS. 16 and 17 of the Embodiment 9, the same reference numerals are attached thereto, thereby leaving them undescribed in this embodiment.

Next, the operation of the wireless LAN apparatus configured in the foregoing manner according to this embodiment is described, in particular, with a focus on the operation of the demodulating device 0718, which is an important distinction in this embodiment. A phase correcting portion 0740 of the demodulating device 0718 phase-corrects the receive data 0716 and 0717 on the box axes (I/Q) and outputs phase-corrected wireless receive data 0741 and 0742 on the box axes (I/Q). A constellation coordinate judging portion 0743 implements the following processing. When, for example, a data transmitted according to a 16QAM (Quadrature Amplitude Modulation) is received, the constellation coordinate judging portion 0743 disposes, according to a threshold, the phase-corrected wireless receive data 0741 and 0742 on the box axes (I/Q) at ● points on constellation coordinates, as shown in FIG. 28.

Figure 28:
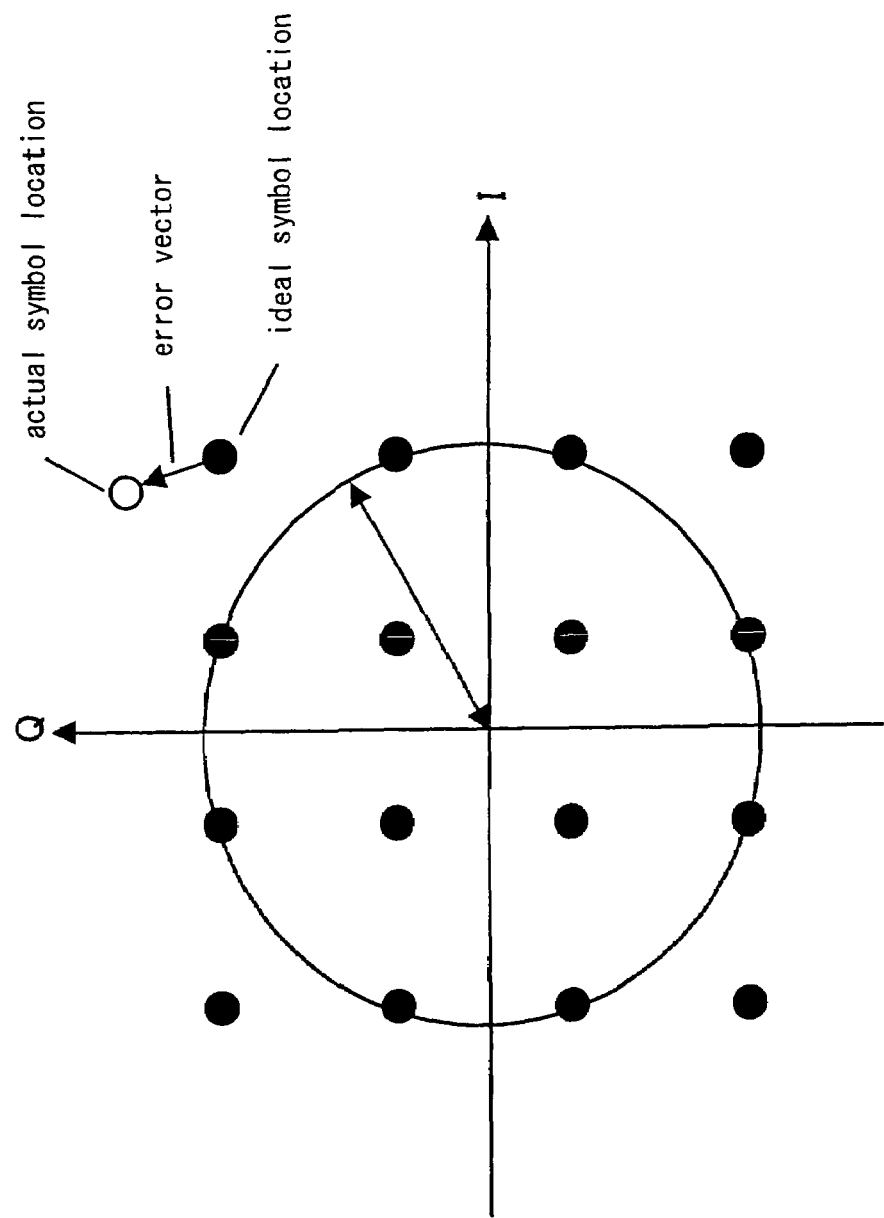
FIG. 28 is a descriptive diagram of a 16 QAM constellation error in the wireless LAN apparatus according to the Embodiment 11 of the present invention.

A constellation coordinates differential detecting portion 0744 figures out a difference between the phase-corrected receive data 0741 and 0742 on the both axes (I/Q) corresponding to an actual symbol location (○ point) and the demodulated receive data 0719 and 0720 on the both axes (I/Q) corresponding to an ideal symbol location (● point), as shown in FIG. 28, to thereby output the constellation distortion signal 1421.

A constellation judging unit 1422 judges the status of transmission channel from the constellation distortion signal 1421 output by the wireless receive unit 0701 and writes the judgment result in a constellation judgment signal 1423 to thereby output the constellation judgment signal 1423. For example, when the constellation distortion signal 1421 is smaller than a threshold value, the status of transmission channel between two mutually-communicating wireless LAN apparatuses is judged to be good. When the constellation distortion signal 1421 is larger than the threshold value, the status of transmission channel between the two mutually-communicating wireless LAN apparatuses is judged to be bad. The constellation judging unit 1422 writes the described judgment result in the constellation judgment signal 1423 and outputs the constellation judgment signal 1423. The judgment can be made stepwise at different stages.

A packet-length information creating unit 1404, when it is judged that the status of transmission channel is good based on the constellation judgment signal 1423, writes an information instructing a current packet length to be extended in a packet length setting signal 0121 and outputs the packet length setting signal 0121. The packet-length information creating unit 1404, when it is judged that the status of transmission channel is bad based on the constellation judgment signal 1423, writes an information instructing the current packet length to be reduced in the packet length setting signal 0121 and outputs the packet length setting signal 0121.

A packet length controlling unit 0120 controls the transmit packet length according to the packet length setting signal 0121. The control can be implemented stepwise at different stages.

As described, according to this embodiment, an optimum packet length is set depending on the status of transmission channel extracted by the wireless receive unit, thereby achieving a significant improvement in the transmission efficiency.

Embodiment 12

Figure 29:
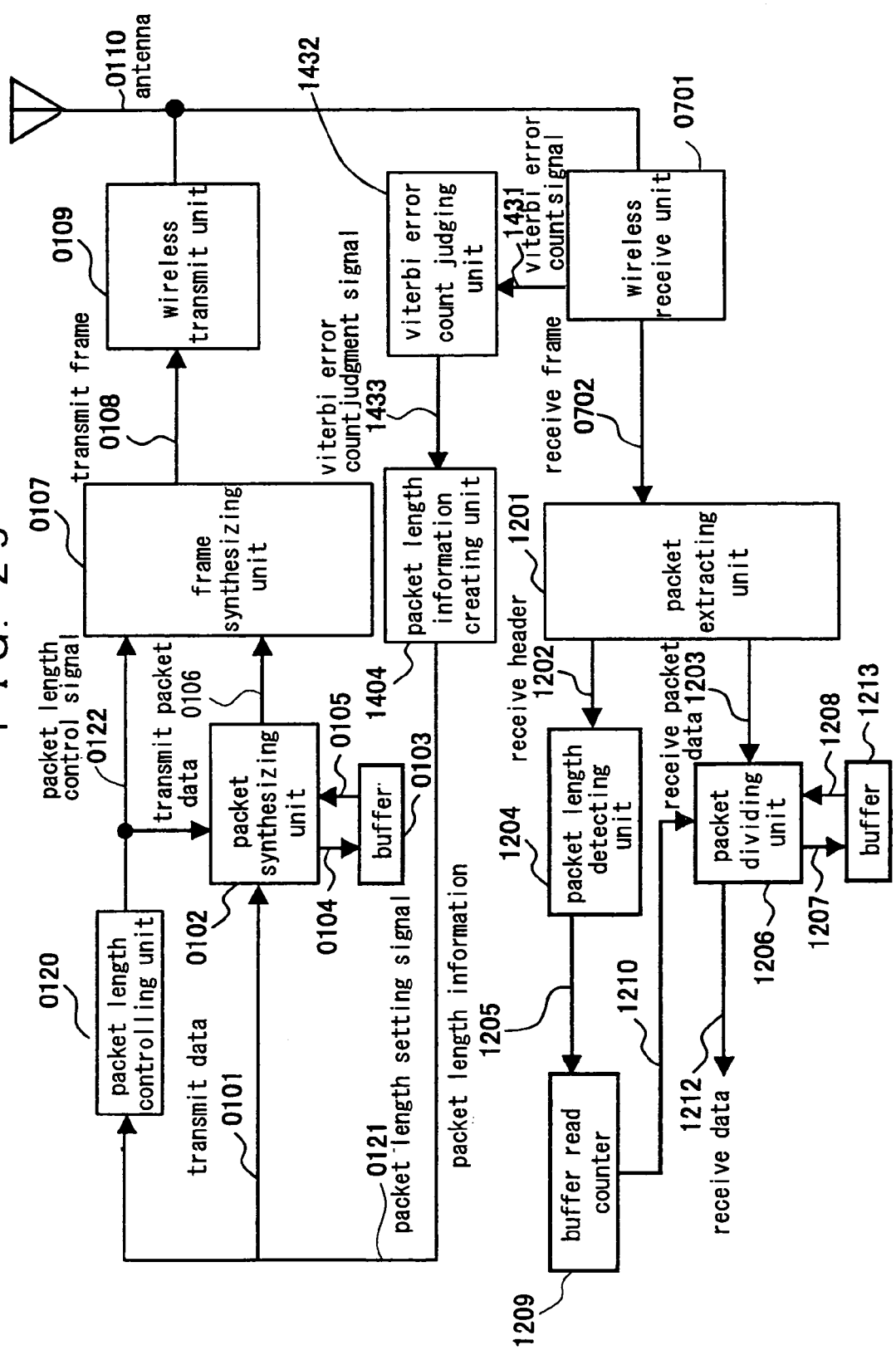
FIG. 29 is a block diagram illustrating the configuration of a wireless LAN apparatus according to an Embodiment 12 of the present invention.

FIG. 29 is a block diagram illustrating the configuration of a wireless LAN apparatus according to an Embodiment 12 of the present invention. FIG. 30 is a block diagram illustrating the specific configuration of a wireless receive unit of the wireless LAN apparatus. Any component other than a wireless receive unit 0701, Viterbi error count judging unit 1432 and Viterbi decoding device 0721, is the same as described in the Embodiment 9, and therefore is not described in this embodiment.

FIG. 30 is the block diagram illustrating the specific configuration of the wireless receive unit 0701. Referring to FIG. 30, the Viterbi decoding device 0721 corrects errors in demodulated receive data 0719 and 0720 on both axes (I/Q) and thereby demodulates the data at an optimum level. The Viterbi decoding device 0721 then creates and outputs a bit-stream receive frame 0702. The errors in the receive data 0719 and 0720 are generated by a distortion in a transmission channel.

Figure 31:
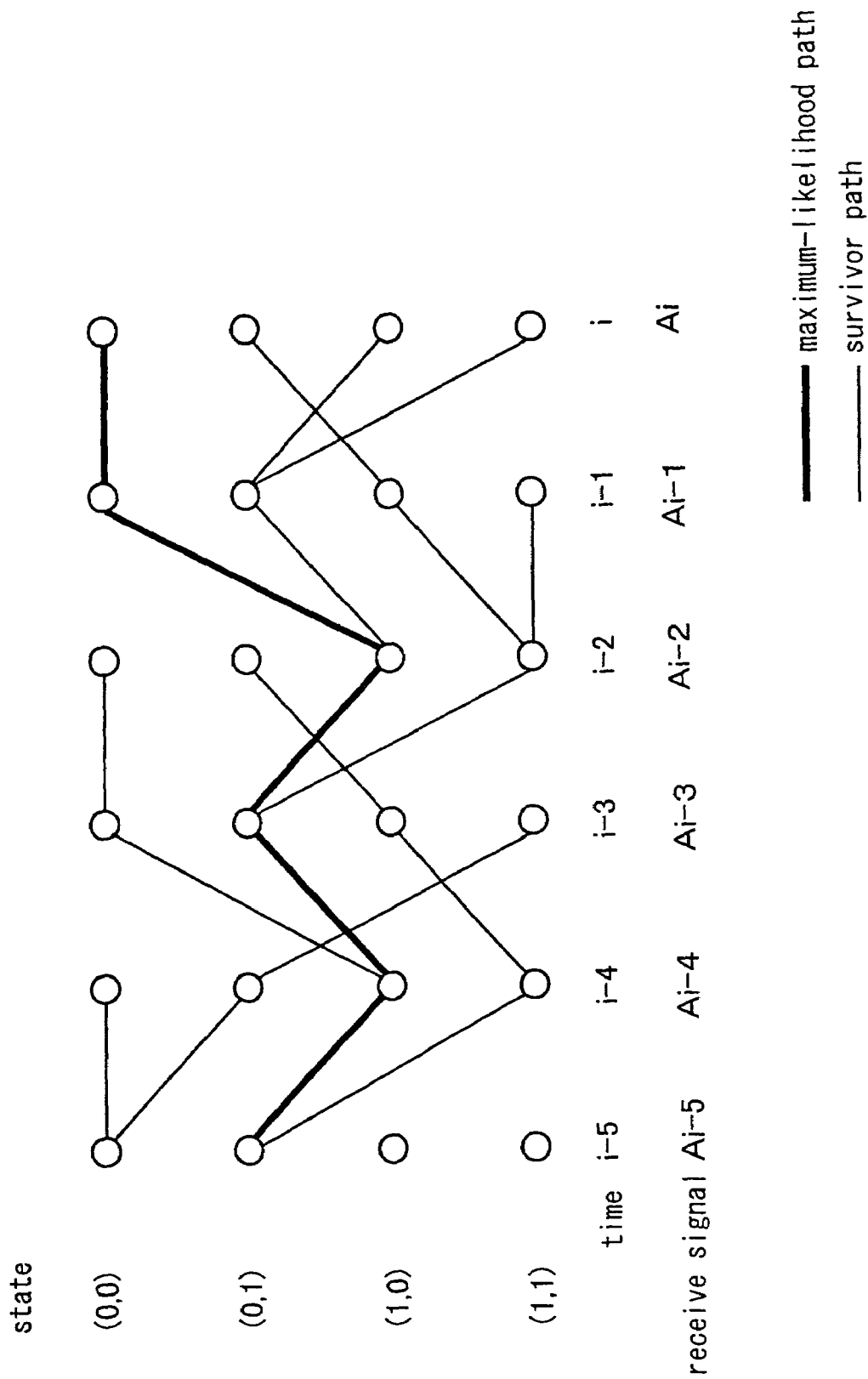
FIG. 31 is a descriptive diagram of a Viterbi-error-count detection in the wireless LAN apparatus according to the Embodiment 12 of the present invention.

Referring to FIG. 31, Viterbi algorithm is described in detail exemplifying the case of decoding data after the data is converted into two-bit parallel data.

Two-bit codes develops four states of (0,0), (0,1), (1,0) and (1,1). Therefore, when transmit data is monitored during a certain period, a state transition thereof occurs according to the combination of the above four states.

The Viterbi decoding device (maximum-likelihood sequence estimator) 0721 reserves receive signals deteriorated through different transmission channels for a certain time period. The Viterbi decoding device 0721 then estimates, out of all the possible state transitions developed by the receive signals as transmit codes, a code sequence of the most-probably-transmitted transmit code according to the reserved receive signals to thereby decode a receive data based on the estimation. The maximum-likelihood sequence estimator for implementing the foregoing processing uses the known art, "Viterbi algorithm" therein, to thereby achieve an efficient estimation.

A complex processing of the receive data when the Viterbi algorithm is used is shown in FIG. 31. More specifically, when "L" denotes a retaining volume of the receive data having a symbol length subject to a delayed-wave influence, the receive data is judged and determined by retracing a maximum likelihood path at a time "i" (path, wherein a path metric is minimum at the time "i", out of the survivor paths as many as the state number at the time "i") by a time corresponding to a retaining volume of the receive data "L". The determination is based on a value of the branch metric, which is explained below.

First, a difference in respective branch metrics of a path of the smallest branch-metric value (maximum likelihood path) and a path of the second smallest branch-metric value (survivor path) is calculated. Then, it is detected how much time is retraced from the time when the calculated difference is larger than an optional threshold value. The level of transmit-channel distortion is detected based on the foregoing detection result. The shorter the retraced time is, the less the transmit-channel distortion is. The Viterbi decoding device (maximum-likelihood sequence estimator) 0721 creates a Viterbi error count signal 1431 indicating the level of transmit-channel distortion according to the Viterbi decoding based on the detected retraced time and outputs the Viterbi error count signal 1431.

Because any component other than the mentioned is the same as those shown in FIGS. 16 and 17 of the Embodiment 9, the same reference numerals are attached thereto, thereby leaving them undescribed in this embodiment.

The operation of the conventional wireless LAN apparatus of this embodiment configured in the foregoing manner is described.

The Viterbi error count signal 1431 is input to the Viterbi error count judging unit 1432 from the wireless receive unit 0701. The Viterbi error count judging unit 1432 judges the status of transmission channel based on the Viterbi error count signal 1431 and writes the judgment result in a Viterbi error-count judgment signal 1433 to thereby output the Viterbi error-count judgment signal 1433. For example, when the Viterbi error count signal 1431 is smaller than a threshold value, the status of transmission channel between two mutually-communicating wireless LAN apparatuses is judged to be good. On the contrary, when the Viterbi error count signal 1431 is larger than the threshold value, the status of transmission channel between the two mutually-communicating wireless LAN apparatuses is judged to be bad. The Viterbi error count judging unit 1432 writes the judgment result in the Viterbi error-count judgment signal 1433 and outputs the signal 1433. The judgment can be made stepwise at different stages.

A packet-length information creating unit 1404, when it is judged that the transmit-channel status is good based on the Viterbi error-count judgment signal 1433, writes an information instructing a current packet length to be extended in the packet length setting signal 0121 and outputs the packet length setting signal 0121. The packet-length information creating unit 1404, when it is judged that the transmit-channel status is bad based on the Viterbi error-count judgment signal 1433, writes an information instructing the current packet length to be reduced in the packet length setting signal 0121 and outputs the packet length setting signal 0121.

A packet length controlling unit 0120 controls the transmit packet length according to the packet length setting signal 0121. The control can be implemented stepwise at different stages.

As described, according to this embodiment, the status of transmission channel is judged from the Viterbi error count in the wireless receive signal. An optimum packet length can be thereby set based on the status of transmission channel. This achieves a significant improvement in the transmission efficiency.

Embodiment 13

Figure 32:
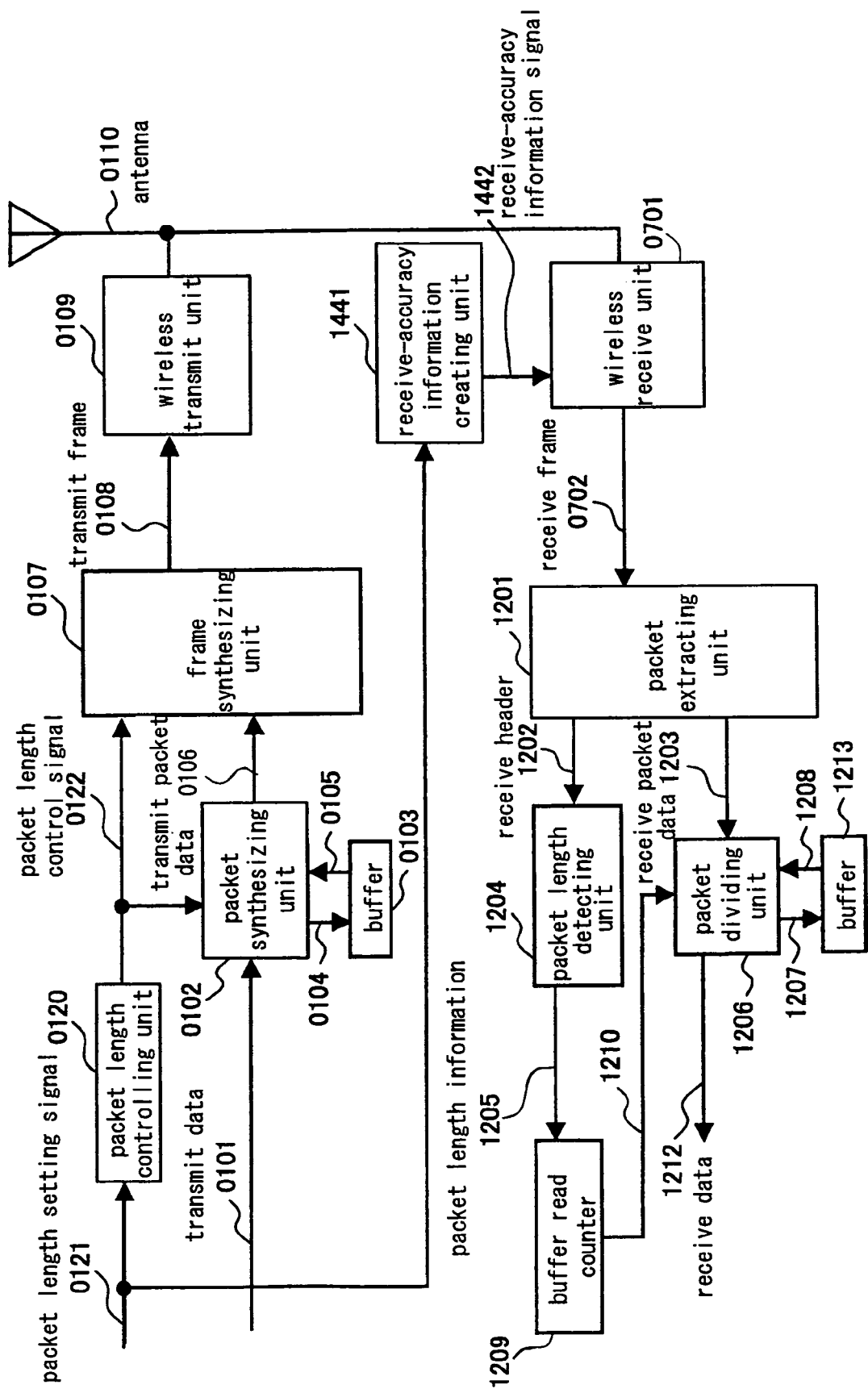
FIG. 32 is a block diagram illustrating the configuration of a wireless LAN apparatus according to an Embodiment 13 of the present invention.
Figure 33:
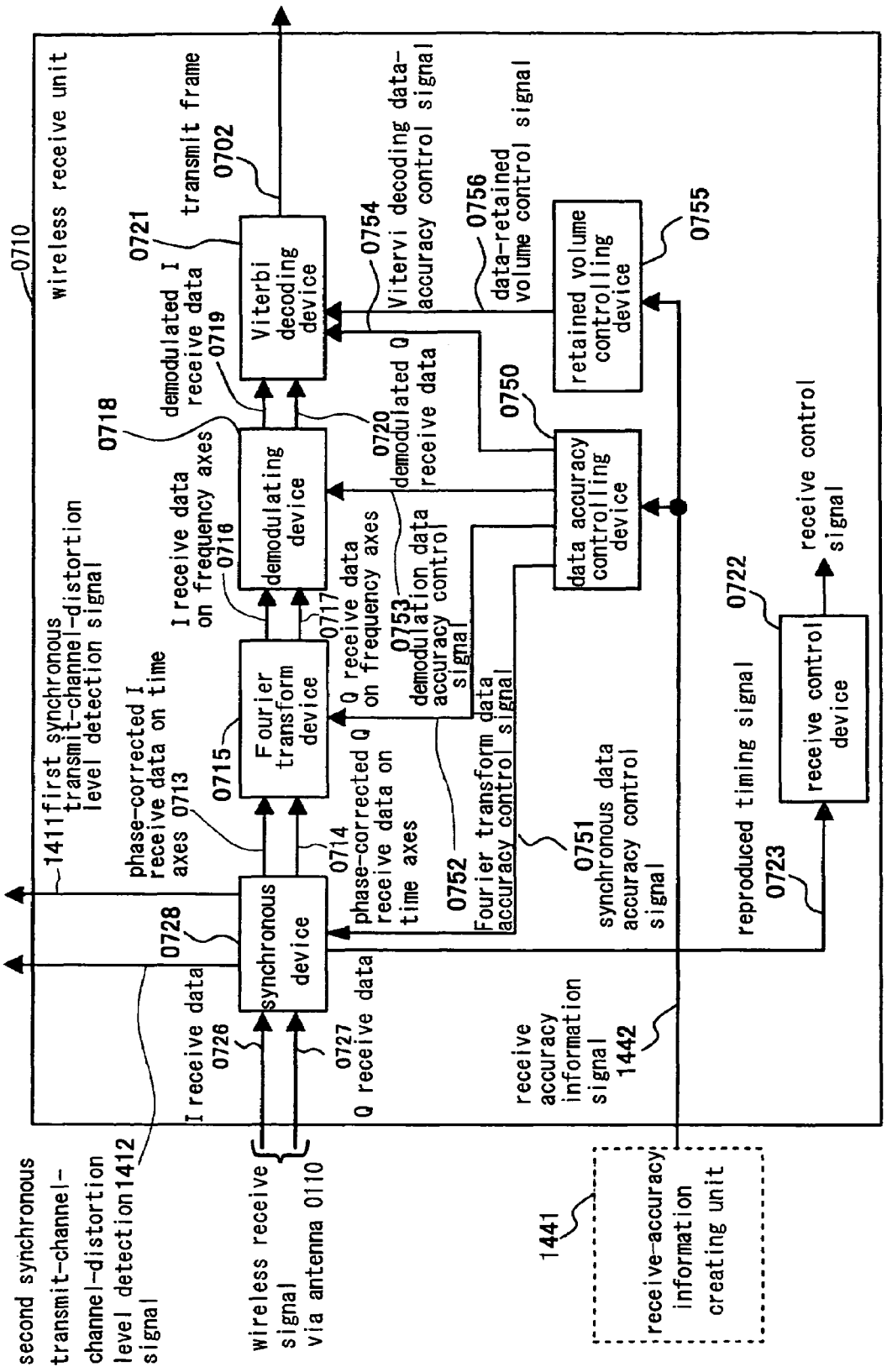
FIG. 33 is a block diagram illustrating the configuration of a wireless receive unit of the wireless LAN apparatus according to the Embodiment 13 of the present invention.

FIG. 32 is a block diagram illustrating the configuration of a wireless LAN apparatus according to an Embodiment 13 of the present invention. FIG. 33 is a block diagram illustrating the specific configuration of a wireless receive unit of the wireless LAN apparatus. Any component other than a wireless receive unit 0701, receive-accuracy information creating unit 1441, data accuracy controlling device 0750, and retained volume controlling device 0755, is the same as described in the Embodiment 9 and therefore not described in this embodiment.

A packet length setting signal 0121, which is also input to a packet length controlling unit 0120, is input to the receive-accuracy information creating unit 1441. The receive-accuracy information creating unit 1441 creates a receive-accuracy information signal 1442 for controlling an accuracy for receive processing based on the packet length setting signal 0121 and outputs the receive-accuracy information signal 1442 to a data accuracy controlling device 0750 and retained volume controlling device 0755 of the wireless receive unit 0701. On the grounds how the receive-processing accuracy should be controlled based on the packet length setting signal 0121, registers are provided inside of the data accuracy controlling device 0750 and retained volume controlling device 0755 so that the accuracy can be optionally controlled.

The data accuracy controlling device 0750, based on the input receive-accuracy information signal 1442, creates a synchronous data accuracy control signal 0751 for controlling bit widths for arithmetic processing respectively suitable for a synchronous device 0728, Fourier transform device 0715, demodulating device 0718 and Viterbi decoding device 0721, Fourier-transform data accuracy control signal 0752, demodulation data accuracy control signal 0753 and Viterbi-decoding data accuracy control signal 0754.

On the grounds how the synchronous data accuracy control signal 0751, Fourier-transform data accuracy control signal 0752, demodulation-data accuracy control signal 0753 and Viterbi-decoding data accuracy control signal 0754 should be respectively controlled based on the receive-accuracy information signal 1442, a register is provided inside of the data accuracy controlling device 0750 so that the control can be optionally implemented.

The retained volume controlling device 0755 creates a receive-data retained volume control signal 0756 based on the receive-accuracy information signal 1442 and outputs the signal 0756 to the Viterbi decoding device 0721. This enables the receive-data retained volume of the Viterbi decoding device 0721 for time retracing to be controlled.

The register may control any component other than the previously mentioned.

As to the methods of controlling a bit width for receive-data processing, an optional bit width for the receive data is fixed at "0" to thereby enable an accuracy for receive-data processing to be automatically changed; and a clock of the optional bit width for the receive data is terminated to thereby enable the accuracy for receive-data processing to be changed. The former method is chosen for controlling the bit width at a higher speed. The latter method is chosen for controlling the bit width in a more electricity-saving manner.

Any component and the configuration thereof other than the mentioned is the same as described in FIGS. 16 and 17 of the Embodiment 9 and therefore is not described in this embodiment.

As described, according to this embodiment, an optimum accuracy for receive processing can be set according the packet length to thereby enjoy both a significant improvement in the transmission efficiency and a lower electricity consumption.

While there has been described what is at present considered to be preferred embodiments of this invention, it will be understood that various modifications maybe made therein, and it is intended to cover in the appended claims all such modifications as fall within the true spirit and scope of this invention.

What is claimed is:

1. A wireless LAN apparatus comprising:
as a transmitting-side configuration thereof,
   a packet length controlling unit, the packet length controlling unit controlling a packet length of transmit data;
   a packet synthesizing unit, the packet synthesizing unit synthesizing the number of the transmit data corresponding to the packet length controlled by the packet length controlling unit into a packet transmit data and outputting the transmit packet data;
   a frame synthesizing unit, the frame synthesizing unit appending the packet-length information to a header information of the transmit packet data synthesized by the packet synthesizing unit and outputting the transmit packet data as a transmit frame; and
   a wireless transmit unit, the wireless transmit unit transmitting transmit frame output by the frame synthesizing unit,
wherein the wireless LAN apparatus further comprises:
as a receiving-side configuration thereof,
   a wireless receive unit, the wireless receive unit receiving the transmit frame transmitted wirelessly by another wireless LAN apparatus configured likewise; and
   an error detecting unit, the error detecting unit judging whether transmit frame is normally received, wherein
as the receiving-side configuration of the apparatus,
the wireless transmit unit wirelessly transmits a receive data indicating the judgment result with respect to the wireless receive unit to the another wireless LAN apparatus, and the wireless LAN apparatus further comprises,
as the transmitting-side configuration thereof,
   a retransmit controlling unit, the retransmit controlling unit requesting the wireless transmit unit to retransmit the same transmit frame when it is judged that an transmission error occurred from the receive data, wherein
as the transmitting-side configuration of the apparatus,
the packet length controlling unit further comprises:
   a retransmit counting device, the retransmit counting device counting the number of the requests for retransmission from the retransmit controlling unit;
   a retransmit-count upper limit register, the retransmit-count upper limit register setting a count upper-limit value of the retransmit counting device; and
   a retransmit-packet length controlling device maintaining a value of the packet-length information when the number of the retransmission requests counted by the retransmit counting device is smaller than the count upper-limit value set by the retransmit-count upper limit register and decreasing the value of the packet-length information and when the number of the retransmission requests counted by the retransmit counting device agrees with the count upper-limit value set by the retransmit-count upper limit register.

2. A wireless LAN apparatus comprising:
as a transmitting-side configuration thereof,
   a packet length controlling unit, the packet length controlling unit controlling a packet length of transmit data;
   a packet synthesizing unit, the packet synthesizing unit synthesizing the number of the transmit data corresponding to the packet length controlled by the packet length controlling unit into a packet transmit data and outputting the transmit packet data;
   a frame synthesizing unit, the frame synthesizing unit appending the packet-length information to a header information of the transmit packet data synthesized by the packet synthesizing unit and outputting the transmit packet data as a transmit frame; and
   a wireless transmit unit, the wireless transmit unit transmitting wirelessly the transmit frame output by the frame synthesizing unit,
wherein the wireless LAN apparatus further comprises:
as a receiving-side configuration thereof,
   a wireless receive unit, the wireless receive unit receiving the transmit frame transmitted wirelessly by another wireless LAN apparatus configured likewise; and
   an error detecting unit, the error detecting unit judging whether transmit frame is normally received, wherein
as the receiving-side configuration of the apparatus, the wireless transmit unit wirelessly transmits a receive data indicating the judgment result with respect to the wireless receive unit to the another transmitting-side wireless LAN apparatus, and
the wireless LAN apparatus further comprises,
as the transmitting-side configuration thereof,
   a retransmit controlling unit, the retransmit controlling unit requesting the wireless transmit unit to retransmit the same transmit frame as a most-recently-transmitted transmit frame when it is judged that an transmission error occurred based on the receive data and judging whether or not the retransmission is successful, wherein
as the transmitting-side configuration of the apparatus, the packet length controlling unit further comprises:
a retransmit counting device, the retransmit counting device counting the number of the retransmission requests from the retransmit controlling unit;
a retransmit count averaging device, the retransmit count averaging device calculating an average value of the number of the retransmission requests when it is judged that the retransmission is successful;
a retransmit-count upper limit register, the retransmit-count upper limit register setting a count upper-limit value of the retransmit counting device; and
a retransmit-packet length controlling device maintaining a value of a pack length according to the most-recently-transmitted transmit frame as the packet length of the transmit data to be retransmitted when the average value calculated by the retransmit count averaging device is smaller than the count upper-limit value set by the retransmit-count upper limit register and setting a decreased value of the packet length of the most-recently-transmitted transmit frame as the packet length of the transmit data to be retransmitted when the average value calculated by the retransmit count averaging device agrees with the count upper-limit value set by the retransmit-count upper limit register.

3. A wireless LAN apparatus comprising:
as a transmitting-side configuration thereof,
a packet length controlling unit, the packet length controlling unit controlling a packet length of transmit data;
a packet synthesizing unit, the packet synthesizing unit synthesizing the number of the transmit data corresponding to the packet length controlled by the packet length controlling unit into a packet transmit data and outputting the transmit packet data;
a frame synthesizing unit, the frame synthesizing unit appending the packet-length information to a header information of the transmit packet data synthesized by the packet synthesizing unit and outputting the transmit packet data as a transmit frame;
a wireless transmit unit, the wireless transmit unit transmitting wirelessly the transmit frame output by the frame synthesizing unit, wherein
the packet length controlling unit comprises a packet length register, the packet length register capable of externally controlling the packet-length information;
a RSSI judging unit, the RSSI judging unit judging an electric power of the received transmit frame based on the transmit-channel-distortion information detected in the transmit frame by the wireless receive unit serving to receive the transmit frame transmitted wirelessly by another wireless LAN apparatus configured likewise; and
a packet-length information creating unit, the packet-length information creating unit creating a packet length setting signal for the transmit frame transmitted wirelessly by the wireless LAN apparatus according to the present invention based on the judgment result by the RSSI judging unit and outputting the packet length setting signal to the packet length controlling unit, wherein
as the transmitting-side configuration of the apparatus, the packet length controlling unit controls the packet length of the transmit data based on the packet length setting signal; and as a receiving-side configuration thereof,
a wireless receive unit, the wireless receive unit receiving the transmit frame transmitted wirelessly by another wireless LAN apparatus configured likewise and detecting a transmit-channel-distortion information in the received transmit frame;
a packet extracting unit, the packet extracting unit separating the received transmit frame into the transmit packet data and the header information;
a packet length detecting unit, the packet length detecting unit detecting the packet-length information included in the transmit frame in the header information separated from the transmit frame by the packet extracting unit; and
a packet dividing unit, the packet dividing unit dividing the transmit packet data separated from the transmit frame by the packet extracting unit based on the packet-length information detected by the packet length detecting unit and outputting the divided transmit packet data, wherein
as the transmitting-side configuration of the apparatus, the racket length controlling unit controls the packet length of the transmit data based on the transmit-channel-distortion information detected by the wireless receive unit.

4. A wireless LAN apparatus as claimed in claim 3, wherein
as the receiving-side configuration thereof,
the wireless receive unit outputs an integral width of a correlation signal in connection with a synchronous reference symbol of the transmit frame received from another wireless LAN apparatus configured likewise, further comprises:
as the receiving-side configuration thereof,
a synchronous detection signal judging unit, the synchronous detection signal judging unit judging the status of transmission channel for transmitting wirelessly the transmit frame based on the integral width; and
a packet-length information creating unit, the packet-length information creating unit creating a packet-length setting information for the transmit data based on the judgment result by the synchronous detection signal judging unit and outputting the packet-length setting information to the packet length controlling unit, wherein
as the transmitting-side configuration of the apparatus, the packet length controlling unit controls the packet length of the transmit data based on the packet-length setting information.

5. A wireless LAN apparatus as claimed in claim 3, wherein
as the receiving-side configuration thereof,
the wireless receive unit outputs a constellation distortion signal based on a difference between an actual mapping value and an ideal mapping value of the transmit frame received from another wireless LAN apparatus configured likewise, further comprises:
as the receiving-side configuration thereof,
a synchronous detection signal judging unit, the synchronous detection signal judging unit detecting the status of transmission channel for transmitting wirelessly the transmit frame based on the constellation distortion signal; and
a packet-length information creating unit, the packet-length information creating unit creating a packet-length setting information for the transmit data based on the judgment result by the synchronous detection signal judging unit and outputting the packet-length setting information to the packet length controlling unit, wherein as the transmitting-side configuration of the apparatus, the packet length controlling unit controls the packet length of the transmit data based on the packet-length setting information.

6. A wireless LAN apparatus as claimed in claim 3, wherein as the receiving-side configuration thereof, the wireless receive unit outputs a Viterbi error count signal based on a difference between a branch metric according to a maximum-likelihood path and a branch metric according to other than the maximum-likelihood path, further comprises:

as the receiving-side configuration thereof, a synchronous detection signal judging unit, the synchronous detection signal judging unit judging the status of transmission channel for transmitting wirelessly the transmit frame based on the Viterbi error count signal; and a packet-length information creating unit, the packet-length information creating unit creating a packet-length setting information for the transmit data based on the judgment result by the synchronous detection signal judging unit and outputting the packet-length setting information to the packet length controlling unit, wherein as the transmitting-side configuration of the apparatus, the packet length controlling unit controls the packet length of the transmit data based on the packet-length setting information.

7. A wireless LAN apparatus as claimed in claim 3 further comprises:

as the receiving-side configuration thereof, a receive-accuracy information creating unit, the receive-accuracy creating unit creating a receive-accuracy information signal based on the packet length setting signal used for controlling the packet length in the packet length controlling unit, wherein as the transmitting-side configuration of the apparatus, the wireless receive unit controls a bit width for receive processing and an accuracy for processing a retained volume of receive data based on processing and an accuracy for processing a receive-data retained volume based on the receive-accuracy information signal.

* * * * *